US007848969B2

(12) United States Patent
Murray

(10) Patent No.: US 7,848,969 B2
(45) Date of Patent: Dec. 7, 2010

(54) ACCOUNTING SYSTEM

(75) Inventor: Peter Noel Murray, Caboolture (AU)

(73) Assignee: PN & AJ Murray Pty Ltd., Queensland (AU)

( * ) Notice: Subject to any disclaimer, the term of this patent is extended or adjusted under 35 U.S.C. 154(b) by 1170 days.

(21) Appl. No.: 10/519,149

(22) PCT Filed: Jun. 27, 2003

(86) PCT No.: PCT/AU03/00818

§ 371 (c)(1),
(2), (4) Date: Dec. 27, 2004

(87) PCT Pub. No.: WO2004/003796

PCT Pub. Date: Jan. 8, 2004

(65) Prior Publication Data

US 2005/0246250 A1 Nov. 3, 2005

(30) Foreign Application Priority Data

Jun. 27, 2002 (AU) .................................... PS3222

(51) Int. Cl.
*G06F 17/60* (2006.01)
(52) U.S. Cl. ............................. 705/30; 705/1; 705/34; 707/102
(58) Field of Classification Search ................ 705/1, 705/34, 30; 707/102
See application file for complete search history.

(56) References Cited

U.S. PATENT DOCUMENTS 5,517,406 A * 5/1996 Harris et al. .................. 705/30
5,875,435 A * 2/1999 Brown .......................... 705/30
7,263,527 B1 * 8/2007 Malcolm ..................... 707/102
2003/0061132 A1 * 3/2003 Yu et al. ....................... 705/30

FOREIGN PATENT DOCUMENTS

WO  WO 01/16850  3/2001

OTHER PUBLICATIONS

GST Transitional Assistant Workbook for MYOB Accounting v10 (MYOB Australia Pty Ltd) Nov. 9, 2001 (www.myob.com.au in web.archive.org).
MYOB & GST Seminar Notes v3 for MYOB Accounting v10 (MYOB Australia Pty Ltd) Feb. 3, 2002 (www.myob.com.au in web.archive.org).
Cashbook Complete Manual (Acclaim Software Ltd) Jun. 3, 2002 (www.acclaimsoftware com in web.archive.org).

* cited by examiner

*Primary Examiner*—Vanel Frenel
(74) *Attorney, Agent, or Firm*—Young & Thompson

(57) ABSTRACT

An accounting system includes client modules pre-configured for client use, which can be used without client configuration. Each client module has interface forms for entering transaction records. Pre-assigned transaction category codes are stored on a storage medium. Code selectors are entered through use of the transaction entry forms. A client chart of accounts allows selection of an account for association with transaction records. Accounts are predetermined by the clients or in accordance with accounts of trading types prenominated by the clients. Each account includes a unique account identification and description prescribed by the client or generally adopted by traders in the trading type. Each category code is pre-specified as taxed/non-taxed, and as expenditure/income. The system can obtain information on tax liabilities of the transaction records through prompts associated with transaction category codes that have tax liabilities, and extracts the entered information for tax liabilities of the transaction.

21 Claims, 61 Drawing Sheets

Script Manager – Add/Delete

The resulting data in the transaction table:

| RecordID | Payment | Total | TranHead | EntryTran | PayeeName | PayType | PayMeDetails | PaidTo | PaidFor | PayeeNo | SCPayment | Locked | AccMethod | Overwrite |
|---|---|---|---|---|---|---|---|---|---|---|---|---|---|---|
| 40 | $35.00 | | | 1 | Insurer | Cash | | | Payee Name/Details | Insurer | | Bank working account | 0 | CASH | 0 |
| 40 | $0.00 | | | 0 | | | | | | | | Bank working account | 0 | CASH | 0 |
| 40 | $0.00 | | | 0 | Insurer | Cash | | | Payee Name/Details | Insurer | | Bank working account | 0 | CASH | 0 |
| 40 | $0.00 | | | 0 | | | | | | | | Bank working account | 0 | CASH | 0 |

| BankBR | BankDEP | Branch | Department | EntryDate | Period | Type | Amount | Description | Taxed | Other | NoGST | NonGST | Reportable | GST |
|---|---|---|---|---|---|---|---|---|---|---|---|---|---|---|
| 1 | 2 | 1 | 1 | 01-Sep-02 | 3 | PAYMENT | $20.00 | Insurance general | $11.00 | $4.00 | | | $5.00 | $1.00 |
| 1 | 2 | 1 | 1 | 01-Sep-02 | 3 | PAYMENT | $1.00 | GST Paid | $0.00 | $0.00 | | | $0.00 | $0.00 |
| 1 | 2 | 1 | 1 | 01-Sep-02 | 3 | PAYMENT | $15.00 | Insurance general | $9.00 | $2.00 | | | $4.00 | $0.81 |
| 1 | 2 | 1 | 1 | 01-Sep-02 | 3 | PAYMENT | $0.81 | GST Paid | $0.00 | $0.00 | | | $0.00 | $0.00 |

| GLAmount | Account | AccountHeader | Outstanding | LoanCode | PrivateUseOnly |
|---|---|---|---|---|---|
| $19.00 | 2860.7000 | 2860.0000 | Y | E05 | 0 |
| $1.00 | 7025.0002 | 7025.0000 | N | NA | 1 |
| $14.19 | 2860.7000 | 2860.0000 | Y | E05 | 0 |
| $0.81 | 7025.0002 | 7025.0000 | N | NA | 1 |

Fig. 4C

Step 1 (General Information)

Fig. 5D

Step 2 (Branches & Departments)

Fig. 5E

Step 3 (Client Entity)

Entity Details:
- ☐ Club or Association
- ☐ Company
- ☐ Consolidation Adjustment
- ☐ Manufacturing Account
- ☐ Partnership
- ☑ Sole Trader
- ☐ Superannuation Fund
- ☑ Trading Account
- ☐ Trust Discretionary
- ☐ Trust Unit

Fig. 5F

Step 4 (Bank Accounts)

Bank Account Selection List:

| BR | DEP. | Account ID | Description |
|---|---|---|---|
| ☐ 1 | 1 | 6001 1000 | Bank working account |
| ☑ 1 | 2 | 6001 1000 | Bank working account |
| ☐ 2 | 1 | 6001.1000 | Bank working account |
| ☐ 1 | 1 | 6001.1100 | Bank savings account |
| ☑ 1 | 2 | 6001.1100 | Bank savings account |
| ☐ 2 | 1 | 6001.1100 | Bank savings account |
| ☐ 2 | 1 | 6001.1200 | Bank account # three |
| ☐ 1 | 1 | 6001.1200 | Bank account # three |
| ☐ 1 | 2 | 6001.1200 | Bank account # three |
| ☐ 1 | 2 | 6001.1300 | Bank account # four |
| ☐ 2 | 1 | 6001.1300 | Bank account # four |
| ☐ 1 | 1 | 6001.1300 | Bank account # four |
| ☐ 1 | 2 | 6001.1400 | Bank account # five |
| ☐ 1 | 1 | 6001.1400 | Bank account # five |
| ☐ 2 | 1 | 6001.1400 | Bank account # five |
| ☐ 1 | 1 | 6001.1500 | Bank account # six |
| ☐ 2 | 1 | 6001.1500 | Bank account # six |

Fig. 5G

Step 5 (Account Selection)

| BR | DEP | Account ID | Description |
|---|---|---|---|
| ☐ 1 | 1 | 1100.1000 | Sale of goods to customers |
| ☐ 2 | 1 | 1100.1000 | Sale of goods to customers |
| ☐ 1 | 2 | 1100.1000 | Sale of goods to customers |
| ☑ 1 | 1 | 1100.1001 | Sales to Australian customers |
| ☑ 2 | 1 | 1100.1001 | Sales to Australian customers |
| ☐ 1 | 2 | 1100.1001 | Sales to Australian customers |
| ☐ 1 | 1 | 1100.2000 | Sale second hand goods |
| ☐ 2 | 1 | 1100.2000 | Sale second hand goods |
| ☐ 1 | 2 | 1100.2000 | Sale second hand goods |
| ☐ 1 | 2 | 1100.2001 | Sale of new goods |
| ☐ 1 | 1 | 1100.2001 | Sale of new goods |
| ☐ 2 | 1 | 1100.2001 | Sale of new goods |
| ☐ 2 | 1 | 1100.2002 | Sale 2nd hand goods costing over $300 |
| ☐ 1 | 2 | 1100.2002 | Sale 2nd hand goods costing over $300 |
| ☐ 1 | 1 | 1100.2002 | Sale 2nd hand goods costing over $300 |
| ☐ 1 | 1 | 1100.2003 | Sale 2nd hand goods costing under $300 |
| ☐ 2 | 1 | 1100.2003 | Sale 2nd hand goods costing under $300 |

Fig. 5H

Step 6 (Questionnaire – Reconciliation Details)

| Account | | Description |
|---|---|---|
| Bank working account | [1/2/6001.1000] | Bank Statement |
| Bank working account | [1/2/6001.1000] | Outstanding Cheque |
| Bank working account | [1/2/6001.1000] | Outstanding Deposit |

Fig. 5I

Step 6 (Questionnaire – New Account Details)

Fig. 5J

Step 6 (Questionnaire – Account Setup)

Fig. 5K

Step 7 (Opening Balances)

| BR | DEP | ID | Account Description | DR Total | CR Total |
|---|---|---|---|---|---|
| 1 | 2 | 6001.1000 | Bank working account | $200.00 | $0.00 |
| 1 | 2 | 6001.1100 | Bank savings account | $268.59 | $0.00 |
| 1 | 2 | 6005.1000 | Income NOT banked | $0.00 | $0.00 |
| 2 | 1 | 6005.2000 | Payments from income NOT banked | $0.00 | $0.00 |
| 1 | 2 | 6005.9000 | Unlisted source | $0.00 | $0.00 |
| 1 | 1 | 6300.2000 | GST Prepaid | $0.00 | $0.00 |
| 1 | 2 | 6300.2000 | GST Prepaid | $0.00 | $0.00 |
| 2 | 1 | 6300.2000 | GST Prepaid | $0.00 | $0.00 |
| 2 | 1 | 6300.2001 | GST Prepaid via Accruals | $0.00 | $0.00 |
| 1 | 1 | 6300.2001 | GST Prepaid via Accruals | $0.00 | $0.00 |
| 1 | 2 | 6300.2001 | GST Prepaid via Accruals | $0.00 | $0.00 |
| 2 | 1 | 6380.0001 | Inventory Opening Balance | $0.00 | $0.00 |
| 1 | 1 | 6380.0001 | Inventory Opening Balance | $0.00 | $0.00 |
| 1 | 2 | 6440.1000 | Transfer of funds to other sources | $0.00 | $0.00 |
| 1 | 1 | 6440.1000 | Transfer of funds to other sources | $0.00 | $0.00 |
| 2 | 1 | 6440.1000 | Transfer of funds to other sources | $0.00 | $0.00 |
| 1 | 1 | 6440.2000 | Transfer funds from other sources | $0.00 | $0.00 |

New Account Debit: $0.00   New Account Credit: $0.00
Debit Balance: $468.59   Credit Balance: $468.59
Final Balance: $0.00

Everything Operational: Standing By

Fig. 5L

Step 8 (Additional Notes)

Notes

1) Sales are always subject to GST

2) Business begain operation in December 2002

Everything Operational: Standing By

Fig. 5M

Step 9 (Submission)

Account Editing Interface

Private Split Portions

[Screenshot: Private Split Portions for Fuel Pte vehicle # (1/2/8004.1000)]
```
80 | Drawings for private use............(1/2/8004.6000)
```
Total Portion Percentage: 80.00%

Fig. 5P

Accounts Setup Form

[Two screenshots side by side: Select Account Details]

Left shows Cost Price: 0.00, Luxury Car Limit: 57009.00
Right shows Cost Price: 0.00, Luxury Car Limit: 57009.00

NON Hire Purchase                                                Hire Purchase

Fig. 5Q

Available Accounts Report

```
Available Accounts [Headers Only]
Project: Joe Blogg

Account ID    Account Name
1100.0000     Sales
1150.0000     Export Sales
1200.0000     Sales - Livestock
1300.0000     Sales - Produce
1510.0000     Opening Stock - Goods for Sale
1520.0000     Opening Stock - Livestock
1530.0000     Opening Stock - Produce
1540.0000     Opening Stock Trading Shares
1620.0000     Trading Purchases
1630.0000     Packaging and Wrapping
1650.0000     Cost of Goods Sold
```

Fig. 5R

Selected Accounts Report

Selected Accounts
Project: Joe Blogg

| Account ID | Branch | Dep | Private X | Account Name | Type |
|---|---|---|---|---|---|
| 1100.1001 | 1 | 1 | 0.00% | Sales to Australian customers | General |
| 1100.1001 | 2 | 1 | 0.00% | Sales to Australian customers | General |
| 1510.1000 | 1 | 1 | 0.00% | Goods held for sale at start of period | Not Available To Client |
| 1510.1000 | 2 | 1 | 0.00% | Goods held for sale at start of period | Not Available To Client |
| 1620.1000 | 1 | 1 | 0.00% | Goods purchased for sale | General |
| 1620.1000 | 2 | 1 | 0.00% | Goods purchased for sale | General |
| 1620.2005 | 1 | 1 | 0.00% | GST on 2nd hand goods sold | Not Available To Client |
| 1620.2005 | 1 | 2 | 0.00% | GST on 2nd hand goods sold | Not Available To Client |
| 1620.2005 | 2 | 1 | 0.00% | GST on 2nd hand goods sold | Not Available To Client |
| 1910.1000 | 1 | 1 | 0.00% | Goods held for sale at close of period | Not Available To Client |
| 1910.1000 | 2 | 1 | 0.00% | Goods held for sale at close of period | Not Available To Client |
| 2185.1000 | 2 | 1 | 0.00% | Interest received from Working Account | GST Free Supply |
| 2185.1001 | 2 | 1 | 0.00% | Interest received from Savings Account | GST Free Supply |
| 2310.1000 | 1 | 1 | 0.00% | Rent predominant LTCA | Predominant LTCA (Input T |
| 2510.1000 | 1 | 2 | 0.00% | Fees paid to accountant | General |
| 2520.2000 | 1 | 2 | 0.00% | Yellow pages (gst on invoice) | GST Paid Up Front |
| 2555.1000 | 1 | 2 | 0.00% | Bank charges (No GST) | GST Free Acquisition |
| 2555.2000 | 1 | 2 | 0.00% | Bank debits tax | Non Reportable Expense |
| 2555.3000 | 1 | 2 | 0.00% | Bank fee (With GST) | Always Taxed Acquisition |
| 2650.2000 | 1 | 1 | 0.00% | Voluntary agreement | Voluntary Agreement Payme |
| 2675.2000 | 1 | 2 | 0.00% | Depreciation plant & equipment | Not Available To Client |
| 2725.1000 | 1 | 1 | 0.00% | Electricity business | General |
| 2725.1000 | 2 | 1 | 0.00% | Electricity business | General |
| 2745.2000 | 1 | 2 | 0.00% | Government fees | General |
| 2860.7000 | 1 | 1 | 0.00% | Insurance general | Includes Stamp Duty |
| 2860.7000 | 2 | 1 | 0.00% | Insurance general | Includes Stamp Duty |

Fig. 5S

Setup – Project Details

Tools – Check Database

View – Additional Info

Receipt Base Questions

Amount withheld for failing to provide ABN

Amount withheld for failing to provide a Tax File Number

Tax Information

| | |
|---|---|
| How Much is Taxable Supply | $20.00 |
| How Much is PRE 1/7/2000 | $10.00 |
| How Much is Export Supply | $30.00 |
| How Much is GST Free Supply | $50.00 |
| How much is Input Taxed | $90.00 |
| Amt Withheld for Failing to provide ABN | $0.00 |
| Calculated Total | $200.00 |
| Original Total | $200.00 |

Fig. 8F

Long term Commercial Accommodation

| | |
|---|---|
| How much from guests who have stayed less than 28 days | $0.00 |
| Original Total | $200.00 |

Fig. 8Fa

Payment Base Questions

Required Questions for the payment of $000.00

Required Details - Select which applies to this payment

- [ ] Payment supported by a GST Inclusive Tax Invoice?
- [ ] Does GST apply to all of the acquisition?
- [ ] To pay a PRE 1/7/2000?
- [ ] Payment for a Taxed Acquisition?
  - [ ] Value of Acquisition less than $55.00 ???
  - [ ] Have you or will you retain a compliant Tax Invoice?
  - [ ] Has an amount been withheld for failure to obtain ABN?
- [ ] Has an amount been withheld for failure to obtain ABN?

✓ Confirm Details     ✗ Cancel

Status: System Operational with no problems detected

Fig. 8G

Amount Withheld

| Amount Withheld | |
|---|---|
| What is the amount withheld | $50.00 |
| Calculated Total | $850.00 |

Fig. 8H

Vehicle Details

| Vehicle Details | |
|---|---|
| How much is Third Party | $300.00 |
| How much is registration | $500.00 |
| Calculated Total | $800.00 |

Fig. 8I

Payment Including Stamp Duty

| Payment including Stamp Duty | |
|---|---|
| How much is Stamp Duty | $100.00 |
| How much is Taxed Acquisition | $500.00 |
| How much is GST Free | $200.00 |
| Calculated Total | $800.00 |

Fig. 8J

Airfare Expenses

| Airfare Expenses | |
|---|---|
| How much is Airfare Tax | $700.00 |
| How much is Taxed Acquisition | $80.00 |
| How much is GST Free | $20.00 |
| Calculated Total | $800.00 |

Fig. 8K

Taxed Acquisition

| | |
|---|---|
| How Much is Taxed Acquisition | $400.00 |
| How much is Non-Taxed Acquisition | $200.00 |
| How much is PRE 1/7/2000 | $100.00 |
| How much is other | $100.00 |
| Original Amount | $800.00 |
| Calculated Total | $800.00 |

Fig. 8L

Loan Details

| | |
|---|---|
| How much is Interest | $150.00 |
| How much is Principal | $600.00 |
| How much is Stamp Duty | $50.00 |
| Calculated Total | $800.00 |

Fig. 8M

Hire Purchase Details

| | |
|---|---|
| How much is Interest | $60.00 |
| How much is Principal | $710.00 |
| How much is Stamp Duty | $30.00 |
| Calculated Total | $800.00 |

Fig. 8N

Gross Wage

| | |
|---|---|
| What is the amount of Tax Withheld | $40.00 |
| What is the amount of other withholdings | $32.00 |
| Calculated Total | $872.00 |

Fig. 8O

Voluntary Agreement

| | |
|---|---|
| How much Tax withheld | $60.00 |
| Calculated Total | $860.00 |

Fig. 8P

Instalment with all GST Paid up Front

| | |
|---|---|
| How much is Stamp Duty | $60.00 |
| How much is GST | $500.00 |
| Instalment Amount | $240.00 |
| Calculated Total | $800.00 |

Fig. 8Q

Bank Reconciliation Entry Form

Bank Reconciliation Entry

Account and Period
Select Account: Bank working account................[1/2/6001.1000]
Current Account: Bank working account
Branch Name: Brisbane
Department Name: Administration
Date Range From: 01-07-2002 TO 31-08-2002
Closing Bank Statement Balance: $8951.44
Opening Bank Statement Balance: $205.59
Opening Ledger Balance: $200.00

Uncheck all entries that are no longer outstanding

| O/S | Payment | Receipt | Date | Reference | ID |
|---|---|---|---|---|---|
| ☐ | $0.00 | $15.00 | 30/06/02 | * - | 2 |
| ☐ | $20.59 | $0.00 | 30/06/02 | * 559 | 1 |
| ☐ | $6,568.58 | $0.00 | 10/07/02 | Cash [-] | 18 |
| ☐ | $680.00 | $0.00 | 10/07/02 | Cheque [56] | 2 |
| ☐ | $0.00 | $102.52 | 25/07/02 | Electronic Transfer [-] | 3 |
| ☐ | $0.00 | $6,568.00 | 25/07/02 | Deposit Slip to Bank [-] | 12 |
| ☐ | $0.00 | $16,869.00 | 25/08/02 | Deposit Slip to Bank [-] | 13 |
| ☐ | $4,856.00 | $0.00 | 28/08/02 | Cash [-] | 19 |
| ☑ | $25.00 | $0.00 | 30/08/02 | Cheque [-] | 21 |
| ☐ | $2,683.50 | $0.00 | 30/08/02 | Cash [-] | 20 |

Closing Balances
Ledger: $8,926.44    Running Balance: $8951.44
Credits: $25.00    O/S Balance: $25.00
Debits: $0.00

Action
☑ Display Unpresented if applicable
Store Reconciliation    Generate/Preview Report    X Cancel

Fig. 8R

Reports – PAYG Report

PAYG Report @ 12/06/03
Joe Blogg

Listing Periods FROM July 2002 TO July 2003

All Branches
All Departments

PAYG Tax Withheld

| | | |
|---|---|---|
| W1 | Total Salary, Wages and other payments : | $0 |
| W2 | Amount Withheld from payments shown at W1 : | $0 |
| W4 | Amount Withheld where no ABN was quoted : | $0 |
| W3 | Other Amounts withheld ( excluding any amount shown at W2 or W4 ) : | $0 |
| W5 | Total Amounts withheld (W2 + W3 + W4) : | $0 |

PAYG Income Tax Instalment

| | | |
|---|---|---|
| T1 | PAYG Instalment Income : | $148,270 |
| T2 | ATO Instalment Rate : | 0.00 % Percent |
| T11 | T1 x T2 ( or T3 ) : | $0 |

Summary
Amounts you owe the ATO

| | | |
|---|---|---|
| 1A | GST on Sales or on GST instalment : | $14,779 |
| 4 | PAYG Tax Withheld : | $0 |
| 5A | PAYG Income Tax Instalment : | $0 |
| 6A | Fringe Benefits Tax instalment : | $0 |
| 7 | Deferred Company / Fund Instalment : | $0 |
| 8A | 1A + 4 + 5A + 6A + 7 : | $14,779 |

Amounts the ATO owe you

| | | |
|---|---|---|
| 1B | GST on Purchases : | $4,122 |
| 5B | Credit arising from reduced PAYG instalments : | $0 |
| 6B | Credit arising from reduced Fringe Benefits tax instalment : | $0 |
| 8B | 1B + 5B + 6B : | $4,122 |
| 9 | Amount to be paid to ATO : | $10,657 |

Fig. 8U

Reports — Summary Report

```
SUMMARY REPORT
Joe Blogg
Listing Periods From July 2002 To July 2003
Summarised Accounts All Branches
All Departments
```

| Account Name | Account | Receipt | Payment |
|---|---|---|---|
| ATO Payment | 7025.8001 | | $4204.00 |
| Bank charges (No GST) | 2855.1000 | | $100.00 |
| DONT KNOW OR NOT LISTED RECEIPT | 9999.2000 | $102.62 | |
| Drawings for private use | 8004.6000 | | $1565.00 |
| Electricity business | 2725.1000 | | $3260.47 |
| Fees paid to Accountant | 2810.1000 | | $518.19 |
| Goods purchased for sale | 1620.1000 | | $33560.87 |
| GST Collected | 7025.0001 | $14770.20 | |
| GST Paid | 7025.0002 | | $4122.66 |
| Insurance general | 2860.7000 | | $3251.83 |
| Interest received from Working Account | 2195.1000 | $168.00 | |
| Printing and stationery for business | 3120.1000 | | $616.37 |
| Sales to Australian customers | 1100.1001 | $147702.80 | |
| | | $163143.52 | $55412.19 |
| Second Hand Goods Sold: | | | $0.00 |
| | | $163143.52 | $55412.19 |

Summary for Payments
- Taxed Acquisition : $45,350.19
- Input Tax : $0.00
- Private : $0.00
- NO GST : $100.00
- Non GST Reportable : $9,962.00
- GST Suspense : $0.00

Total Expenses : $55,412.19

Summary for Receipts
- Tax Supply : $162,473.00
- Export Supply : $0.00
- Input Tax Sales : $0.00
- GST Free : $568.00
- Non GST Reportable : $0.00
- PRE 1/7/2000 : $0.00
- GST Suspense : $102.52

Total Income : $163,143.52

Fig. 8V

Reports – Cashbook GST Audit Report

```
Cashbook GST Audit Report @ 12/06/03
Joe Blogg
Listing for Payments Only
FROM July 2002 TO July 2003
All Branches
All Departments
```

| ID | entry | Reference | Capital | Taxed Acquisition | Input Tax | No GST | Private non deductable | Non reportable | GST Suspense |
|---|---|---|---|---|---|---|---|---|---|
| 1 / 2 2 | Fees paid to accountant cheque $480.00 $6 | | $0.00 | 10/07/02 $680.00 | $0.00 | $0.00 | $0.00 | $0.00 | $0.00 |
| 1 / 1 18 | Goods purchased for sale cash $3,505.26 | | $0.00 | 10/07/02 $3,505.26 | $0.00 | $0.00 | $0.00 | $0.00 | $0.00 |
| 2 / 1 18 | Goods purchased for sale cash $3,063.32 | | $0.00 | 10/07/02 $3,063.32 | $0.00 | $0.00 | $0.00 | $0.00 | $0.00 |
| 1 / 1 19 | Goods purchased for sale cash $2,486.00 | | $0.00 | 28/08/02 $2,486.00 | $0.00 | $0.00 | $0.00 | $0.00 | $0.00 |
| 2 / 1 19 | Goods purchased for sale cash $2,370.00 | | $0.00 | 28/08/02 $2,370.00 | $0.00 | $0.00 | $0.00 | $0.00 | $0.00 |
| 1 / 1 20 | Electricity business cash $1,856.25 | | $0.00 | 30/08/02 $1,856.25 | $0.00 | $0.00 | $0.00 | $0.00 | $0.00 |

Fig. 8W

Reports – BAS Statement Report

```
BAS Statement Report @ 12/06/03
Reporting Method : Cash
Listing Periods FROM July 2002 TO July 2003
All Branches
All Departments Joe Blogg Amount you owe the ATO from Sales
G1                          Total Sales ( Including any GST ) : $163,041
G2                                           Export Sales : $0
G3                                    Other GST-Free Sales : $568
G4                                       Input Taxed Sales : $0
G5                                         G2 + G3 + G4 : $568
G6                     Total Sales Subject to GST (G1 minus G5) : $162,473
G7                                             Adjustments : $0
G8         Total Sales Subject to GST after Adjustments (G6 + G7) : $162,473
G9/1A                                          GST on Sales : $14,770

Amount the ATO Owe you from Purchases
G10                      Capital Purchases (including any GST) : $0
G11                  Non-Capital purchases (including any GST) : $45,347
G12                                          G10 + G11 : $45,347
G13               Purchases for making input taxed sales : $0
G14                                      GST Free Purchases : $100
G15  Estimated purchases for private use or not income tax deductible : $0
G16                                       G13 + G14 + G15 : $100
G17             Total purchases subject to GST (G12 minus G16) : $45,247
G18                                             Adjustments : $0
G19    Total purchases subject to GST after adjustments (G17 + G18) : $45,247
G20/1B                                     GST on Purchases : $4,113

BAS Summary
1A                                             GST on Sales : $14,770
1B                                         GST on Purchases : $4,113
                                        Amount you Owe the ATO : $10,657
```

Fig. 8X

Accountant Reports – Balance Sheet

```
Joe Blogg
Trial Balance Report as @ 31/07/02
Listing Periods From July 2002 To July 2002
All Branches
All Departments
                                        DEBIT        CREDIT       BALANCE
1 /1 /1100.0000 . Sales
    1100.1001  Sales to Australian customers         $2444.55
                                                                  ( $2444.55 )

1 /1 /1620.0000 . Trading Purchases
    1620.1000  Goods purchased for sale  $3186.60
                                                                  $3186.60

1 /1 /7025.0000 . Clearing Accounts
    7025.0001  GST Collected             $7909.42
    7025.0002  GST Paid                               $1771.97
                                                                  $6138.45

1 /2 /2510.0000 . Accountancy
    2110.1000  Fees paid to accountant   $524.99
                                                                  $524.99

1 /2 /6001.1000 . Bank working account                $376.06
                                                                  ( $376.06 )

1 /2 /6001.1100 . Bank savings account   $268.59
                                                                  $268.59

1 /2 /6550.0000 . Plant and Equipment (WDV)
    6550.3000  Plant and equipment       $26833.00
    6550.3001  Plant and equipment depreciated to date  $12061.00
                                                                  $14766.00
.........

TRIAL BALANCE
   TOTAL DEBITS :   $47873.66
   TOTAL CREDITS :  $47873.66
   Trial Balance :  $0.00
```

Fig. 8Y

Main Interface

Fig. 9A

General Journal Audit Report

Fig. 9D

General Journal GST Audit Report

| Date | Record ID | Total Debits | Total Credits | Reference | | | | | | | | | | |
|---|---|---|---|---|---|---|---|---|---|---|---|---|---|---|
| | | | | Dr/Bnk Account | Capital | Taxed Acq | Input Taxed Acq | No GST Acquisition | Private Non Deductable | Non Reportable Paid | Taxable Supply | Export Supply | GST Free Supply | Input Taxed Supply | Non Reportable Received | GST Suspense |
| 01/07/02 | 10 | $27301.59 | $27301.59 | | | | | | | | | | | | | |
| | 1/1 | | | Opening Balance | $0.00 | $0.00 | $0.00 | $0.00 | $0.00 | $0.00 | $0.00 | $0.00 | $0.00 | $0.00 | $0.00 | $0.00 |
| | 1/2 | | | Plant and equipment | $0.00 | $0.00 | $0.00 | $0.00 | $0.00 | $0.00 | $0.00 | $0.00 | $0.00 | $0.00 | $0.00 | $0.00 |
| | 1/2 | | | Plant and equipment depreciated | $0.00 | $0.00 | $0.00 | $0.00 | $0.00 | $0.00 | $0.00 | $0.00 | $0.00 | $0.00 | $0.00 | $0.00 |
| | 1/2 | | | Escoda HP 1 | $0.00 | $0.00 | $0.00 | $0.00 | $0.00 | $0.00 | $0.00 | $0.00 | $0.00 | $0.00 | $0.00 | $0.00 |
| | 1/2 | | | Equity Opening Balance | $0.00 | $0.00 | $0.00 | $0.00 | $0.00 | $0.00 | $0.00 | $0.00 | $0.00 | $0.00 | $0.00 | $0.00 |
| | 1/2 | | | Opening Balance | $0.00 | $0.00 | $0.00 | $0.00 | $0.00 | $0.00 | $0.00 | $0.00 | $0.00 | $0.00 | $0.00 | $0.00 |
| 30/06/02 | 13 | $102.52 | $102.52 | Remove items from suspense | | | | | | | | | | | | |
| | 1/1 | | | Govt know or not listed payment | $0.00 | $0.00 | $0.00 | $0.00 | $0.00 | $0.00 | $0.00 | $0.00 | $0.00 | $0.00 | $0.00 | -$102.52 |
| | 1/2 | | | Fees paid to accountant | $0.00 | -$102.52 | $0.00 | $0.00 | $0.00 | $0.00 | $0.00 | $0.00 | $0.00 | $0.00 | $0.00 | $0.00 |
| 30/06/03 | 14 | $1256.00 | $1256.00 | Depreciation | | | | | | | | | | | | |
| | 1/1 | | | Depreciation plant & equipment | $0.00 | $0.00 | $0.00 | $0.00 | $0.00 | $1,256.00 | $0.00 | $0.00 | $0.00 | $0.00 | $0.00 | $0.00 |
| | 1/2 | | | Plant and equipment depreciated | $0.00 | $0.00 | $0.00 | $0.00 | $0.00 | -$1,256.00 | $0.00 | $0.00 | $0.00 | $0.00 | $0.00 | $0.00 |
| 30/06/02 | 16 | $14779.52 | $14779.52 | GST | | | | | | | | | | | | |
| | 1/1 | | | GST Collected | $0.00 | $0.00 | $0.00 | $0.00 | $0.00 | $5,162.87 | $0.00 | $0.00 | $0.00 | $0.00 | $0.00 | $0.00 |
| | 1/1 | | | GST Paid | $0.00 | $0.00 | $0.00 | $0.00 | $0.00 | -$2,090.63 | $0.00 | $0.00 | $0.00 | $0.00 | $0.00 | $0.00 |
| | 1/1 | | | GST Collected | $0.00 | $0.00 | $0.00 | $0.00 | $0.00 | $6,417.13 | $0.00 | $0.00 | $0.00 | $0.00 | $0.00 | $0.00 |
| | 1/1 | | | GST Paid | $0.00 | $0.00 | $0.00 | $0.00 | $0.00 | -$1,916.59 | $0.00 | $0.00 | $0.00 | $0.00 | $0.00 | $0.00 |
| | 1/1 | | | ATO Payment | $0.00 | $0.00 | $0.00 | $0.00 | $0.00 | -$4,204.09 | $0.00 | $0.00 | $0.00 | $0.00 | $0.00 | $0.00 |
| | 1/1 | | | GST Paid | $0.00 | $0.00 | $0.00 | $0.00 | $0.00 | -$113.44 | $0.00 | $0.00 | $0.00 | $0.00 | $0.00 | $0.00 |
| | 1/1 | | | GST Prepaid | $0.00 | $0.00 | $0.00 | $0.00 | $0.00 | -$6,432.85 | $0.00 | $0.00 | $0.00 | $0.00 | $0.00 | $0.00 |
| | 1/2 | | | GST Paid via Journal | $0.00 | $0.00 | $0.00 | $0.00 | $0.00 | $9.32 | $0.00 | $0.00 | $0.00 | $0.00 | $0.00 | $0.00 |
| | | $43469.63 | $43469.63 | | $0.00 | $102.52 | $0.00 | $0.00 | $0.00 | $0.00 | $0.00 | $0.00 | $0.00 | $0.00 | $0.00 | -$102.52 |

Fig. 9E

Prefixed Opening Balances Report

```
Joe Blogg
Prefixed Opening Balances

Account ID                  Account Description                            Opening Balance 1 / 2 /    Bank working account
6001.1000         (-) DEBIT      Opening Balance                                      $200.00
1 / 2 /    Bank savings account
6001.1100         (-) DEBIT      Opening Balance                                      $260.69
1 / 2 /    Plant and equipment
6510.3000         (-) DEBIT      Plant and equipment                              $26833.00
1 / 2 /    Plant and equipment depreciated to date
6510.3001         (-) CREDIT     Plant and equipment depreciated to date        ( $12066.00 )
1 / 2 /    ESANDA HP $
7600.2000         (-) CREDIT     ESANDA HP $                                      ( $359.00 )
1 / 2 /    Equity Opening Balance
6001.1000         (-) CREDIT     Equity Opening Balance                         ( $14677.69 )
```

Fig. 9F

SERVER INTERACTION PROCESS

STANDARD COST PROCESS

Debtor Payment

Debtor Credit Note

ACCOUNTING SYSTEM

TECHNICAL FIELD OF THE INVENTION

THIS INVENTION relates to an accounting system for processing transactions.

BACKGROUND OF THE INVENTION

For many years, operators of small and medium enterprises (SME) have been performing manual bookkeeping work for transaction records. The books containing the transaction records are then given to the operators' accountants for preparing accounts statements and tax returns.

Recent changes in taxation law, especially the introduction of the Goods and Services Tax (GST) which requires businesses to collect GST in any transaction that attracts this tax and to submit periodic Business Activities Statements (BAS), have made manual bookkeeping tasks extremely complex. Consequently, SME operators, in general, have resorted to use a computerised accounting system to enter transaction records so that the records can be processed for generating reports for their accountants and the tax authority.

To use the computerised accounting system effectively and to produce accounts reports that are acceptable to accountants and the tax authority, the operators not only have to learn basic computer skills, but also accounting terms and procedures employed in their accounting application software and taxation liabilities appropriate for their businesses.

The application software must also be configured to suit accounting practices of individual SME operators. That means the operators must acquire the necessary knowledge in accounting practice and tax law in order to configure the application software to use the accounting procedures and tax liability options that suit their businesses.

The application software is intended for general use and employs common accounting terms for transactions. Consequently, the SME operators can no longer use the transaction item descriptions they have adopted for their manual bookkeeping system. This represents a major disadvantage for most of the SME operators who now must spend time familiarising with new accounting terms that they are unfamiliar of. Transaction entry errors often occurs when using unfamiliar terms to enter transaction records. The errors can be very difficult to trace and correct.

With the introduction of Goods and Services Tax (GST), the computerised accounting system has become more complicated for the SME operators as they must now act as collection agents for the GST. To set up the accounting system for generating BAS, SME operators must configure the application software with appropriate tax liabilities of goods and services that attract GST and other taxes. These requirements place heavy burdens on SME operators. In addition, many of them do not have sufficient knowledge to determine which transaction items attract GST and which do not. They also do not have the necessary knowledge to allocate transactions in order to correctly report the GST, Pay As You Go (PAYG) Withholding and PAYG Installments in the BAS.

Periodically, the entered transaction records need to be reconciled with bank records. The reconciliation process is not generally understood by SME operators, and is time consuming.

The known computerised accounting system is for processing accounts reports only. It would be desirable to use information obtainable from transaction records to perform management related functions.

OBJECT OF THE INVENTION

It is an object of the present invention to alleviate or to reduce to a certain level one or more of the aforementioned prior art disadvantages.

SUMMARY OF THE INVENTION

In one aspect therefore the present invention resides in an accounting system including at least one client module for use by a client. The at least one client module has transaction entry means for entering transaction records, pre-assigned transaction category codes being stored on a storage medium, means for selecting a pre-assigned category code to associate with a transaction record to be entered through the transaction entry means, and a client chart of accounts for selection of an account to which the transaction record is to be associated, the accounts being predetermined by the client or in accordance with accounts of at least one trading type prenominated by the client. Each of said accounts include a pre-allocated unique account identification and an account description which is prescribed by the client or generally adopted by traders in said at least one trading type, and each of said category codes is pre-specified as a taxed or non-taxed, and as an expenditure or income transaction type.

In another aspect therefore the present invention resides in an accounting system including at least one client module for use by a client. The at least one client module has transaction entry means for entering transaction records, and means for obtaining information relevant to tax liabilities of the transaction records. Said information obtaining means has one or more prompts associated with each of a plurality transaction category codes that have tax liabilities, and is arranged to present the associated one or more prompts for entering information relevant to tax liabilities when one of said category code is nominated for a transaction to be entered, and to extract the entered information for allocating tax liabilities of the transaction.

Preferably, said one or more prompts are in the form of one or more leading questions for the client to enter said relevant tax liability information in a designated location(s), and the at least one client module is arranged to extract the entered information at said designated location(s) and apply a tax liability determination procedure which is specific for the or each extracted information from said designated location(s).

It is preferred that the at least one client module has report generating means arranged to access the entered transaction records for generating accounting reports. More preferably, the report generating means includes a report selection arrangement for selecting any one of a number of accounting reports for generation.

In preference, at least one of said taxed category codes is pre-allocated to taxation segments for a taxation report, being one of the accounting reports. More preferably, said taxation report is a Business Activity Statement (BAS) that complies with the Goods and Services Tax (GST). Where a taxed category code having a variable taxation allocation is entered, it is preferred that a window with appropriate prompts for specifying amounts to be allocated is presented entering the amounts.

Said at least one trading type may include trading activities involving the provision of goods and/or services relating to any class of business. Examples of the business classes are accountancy, hardware retail and wholesale, electrical goods and repair services, plumbing supplies and services, health care goods and services, mechanical repair services, transportation goods, etc.

It is further preferred that the category codes include a category for wages and the wage category is associated with a wage account in said client chart of accounts. Accordingly, the system according to the present invention also functions as payroll package.

The system may have storage means for storing the transaction records and is arranged for accessing bank statement records over a communications network. The at least one client module may have reconciliation means for reconciling said stored transaction records with the bank statement records.

Preferably, the system includes at least one adviser module having report generating means being arranged to access transaction records transferred from the at least one client module for generating accounting reports and management reports. More preferably, the report generating means includes a report selection arrangement for selecting any one of a number of accounting and management reports for generation.

The system may also include an administration module for administering said at least one client module, and the administration module and the at least one client module are arranged for communication over a communications network, The administration module has a master chart of accounts from which the client chart of accounts is extracted, and chart generating means for generating said master chart of accounts in accordance with a user's determination. It is preferred that the client chart of accounts is locked so that the account identifications and the account descriptions therein can not be altered.

It is further preferred that the administration module has a transaction code generating means for generating the transaction codes as specified by the user.

The system may have a number of client modules in communication with the administration module. Each of the client modules has a unique client reference and is adapted to transfer sales orders and/or purchase orders through the administration module. Each of said sales orders and/or purchase orders including a client reference of a purchasing client module and a client reference of a supplier client module. The administration module may have a coordination unit arranged to use the client references to transfer a purchase order from the purchasing client module to the supplier client module and to transfer a subsequently received invoice from the supplier client module to the purchasing client module. It is preferred that payment of the invoice is also transfer through the administration module so that the coordination unit has a record that the invoice has been settled.

Accordingly, the system of the present invention can store transaction information between suppliers and purchasers. The coordination unit can thus be arranged to automate purchase orders when stocks for transactions are below predetermined levels.

Preferably, the or each said client module is associated with an adviser module which is also arranged to be in communication with the administration module so that the transaction records of the associated client(s) can be accessed remotely.

The at least one client module may be a cash book module or an accrual module or a combined cash book and accrual module, or a payroll module or a point of sale module, or any combination of two or more of said modules.

BRIEF DESCRIPTION OF THE DRAWINGS

In order that the present invention can be readily understood and put into practical effect the description will hereinafter refer to the accompanying drawings which illustrate non limiting embodiments of the present invention and wherein:

FIGS. 4 to 4B are interface forms for entering payment and receipt; FIG. 4C shows an example of a transaction table with transaction information entered in the interface forms shown in FIGS. 4 to 4B;

FIGS. 6B to 6F are some interfaces for the steps shown in FIG. 6;

FIG. 9A in an example of the main interface for the general ledger;

FIGS. 9D to 9F are examples of some of the general ledger reports;

DETAILED DESCRIPTION OF THE DRAWINGS

Figure 1:
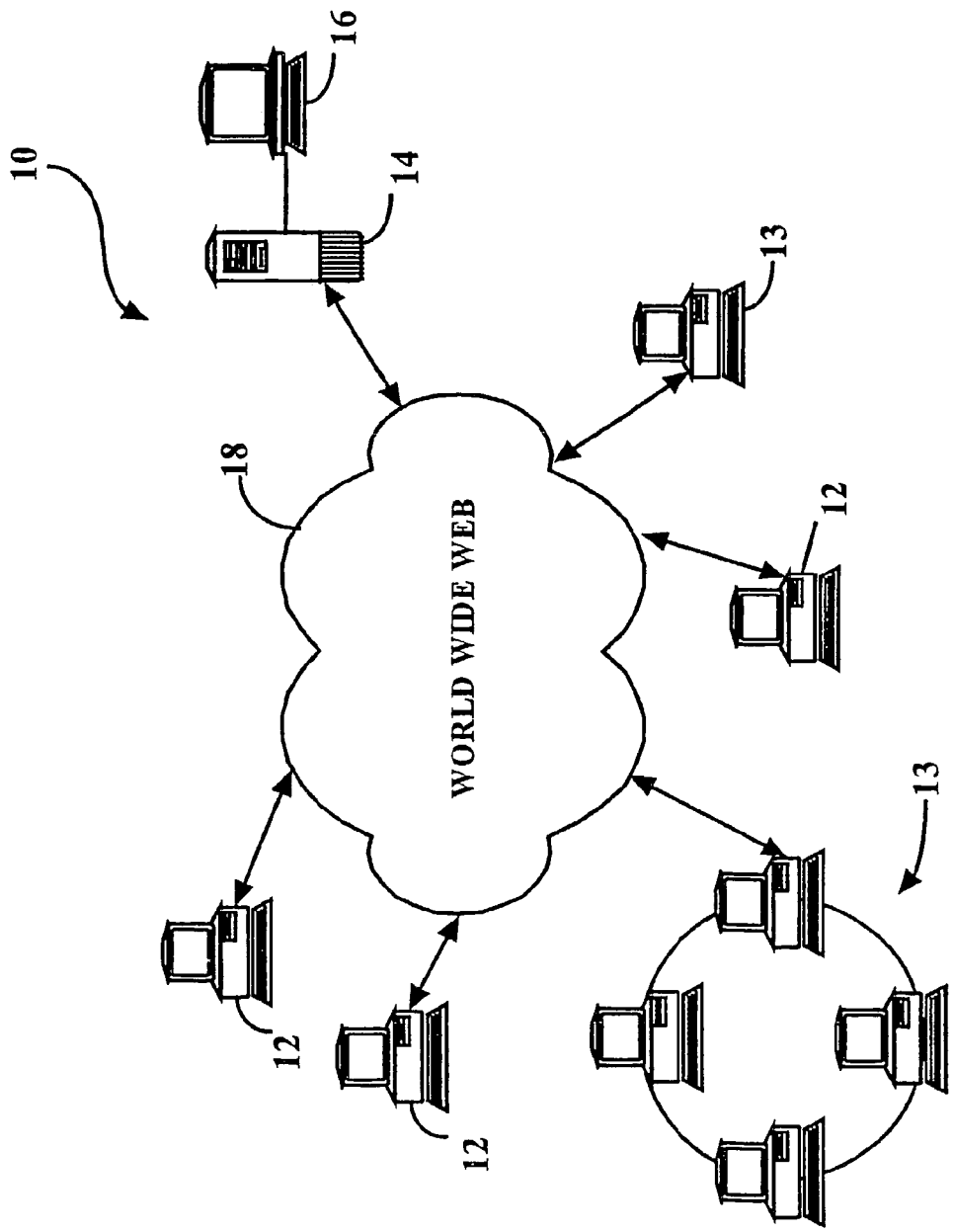
FIG. 1 is a schematic diagram showing an embodiment of the accounting system according to the present invention.

Referring to the drawings and initially to FIG. 1 there is shown an accounting system 10 according to an embodiment of the present invention. The system 10 has a number of client modules 12 operating on computers, a number of advisor modules 13, and an administration module 14 operating on a server computer system 14 which may be arranged as shown in FIG. 33. The server system 14 and an administrator unit 16 are connected in a local area network. The client module 12 is connected to the server system 14 through the World Wide Web including the Internet 18. As can be seen some of the advisor module 13 can be formed of a group of networked computers.

The adviser modules 13 can access the server system 14 to transfer information to the server system 14 for configuring the client module 12 and to retrieve transaction information of the associated client module 12.

Typically, each of the client modules 12 include a cashbook module, and the advisor module 13 of a client module 12 is managed by a professional accountant who advises the accounting procedures and tax liability options that are appropriate to the client. Each of the advisor modules 13 would also be provided with account descriptions that the client is familiar with. To request the administration module 14 to configure or edit a client module 12, the accountant can use the adviser module 13 to transfer the client's account requirements to the administration module 14. The information provided to set up the master chart of accounts would include any private percentage to be applied to an account and if so which ledger account the private portions are to be allocated. The accountant would also advise the following where applicable:

Cash or Accrual BAS reporting
Small food retailer percentage
Predominant Long Term Commercial Accommodation
New Motor Vehicles purchased before 23 May 2001
Hire purchase start before 1 Jul. 2000
Hire purchase new motor vehicle before 23 May 2001
Particulars of predetermined GST status (eg Property lease)
Bank reconciliation The account requirements provided by the accountant are used to set up a master chart of accounts for the client. From the master chart of accounts, the accounts for use by the client are identified for generating a user chart of accounts.

If the client does not use an accountant he/she can either provide the required information for configuring a user chart of accounts or simply nominate a trading type of his/her business-activities and the administration module 14 would automatically configure a default user chart of accounts based the known account configurations of most businesses in the same trading type.

Figure 2A:
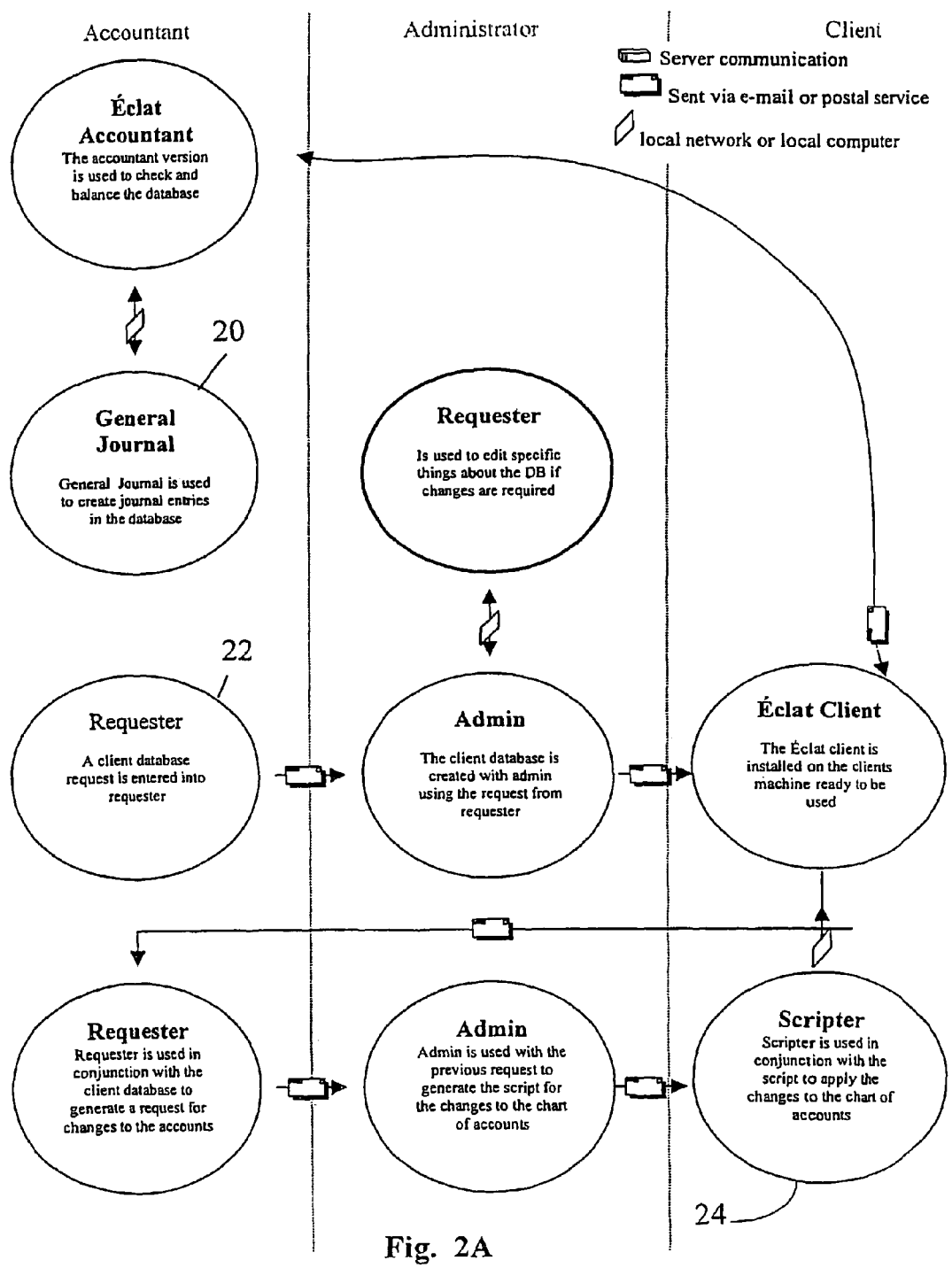
FIGS. 2A and 2B are flow diagrams showing steps in configuring a cashbook module for the system of FIG. 1.

FIG. 2A shows the flow of information between a client who wishes to configure a client module 12, an advisor (accountant in this case) module 13 and the administration module 16. As can be seen, the client and the accountant exchange information regarding the client's account requirements and the accountant accordingly uses a journal maintenance unit 20 to create a general journal for this client. In this respect, the client can provide his/her own descriptions of accounts that are familiar to him/her by using the requester 22 and/or scripter 24.

The accountant then uses a requester unit 22 of the advisor module 13 to select the appropriate accounts from a master chart of account to be configured for a client chart of accounts having the account descriptions that are familiar to the client. The administration module 14 on receiving the request from the account creates a client database for the client chart of accounts and configures a client module 12 using the client chart of accounts having the account descriptions that are familiar to the client. Accordingly, when delivered the client can simply install and use the client module 12 without the labourious and error prone tasks of configuring the client module 12 and determining tax liabilities of the accounts. The client module 12 is also set up to communicate with the administration module 14 over a communications network such as the World Wide Web (WWW) 18.

The client module 12 has a scripter unit 24 for initiating a request to edit the description of any account in the client chart of accounts. The request to edit is either transferred directly to the administration module 14 (where an advisor module 13 is not linked to a client module 12) or to the advisor module 13 for registering at the advisor module 13 before forwarding to the administration module 14 for editing the account.

Figure 2B:
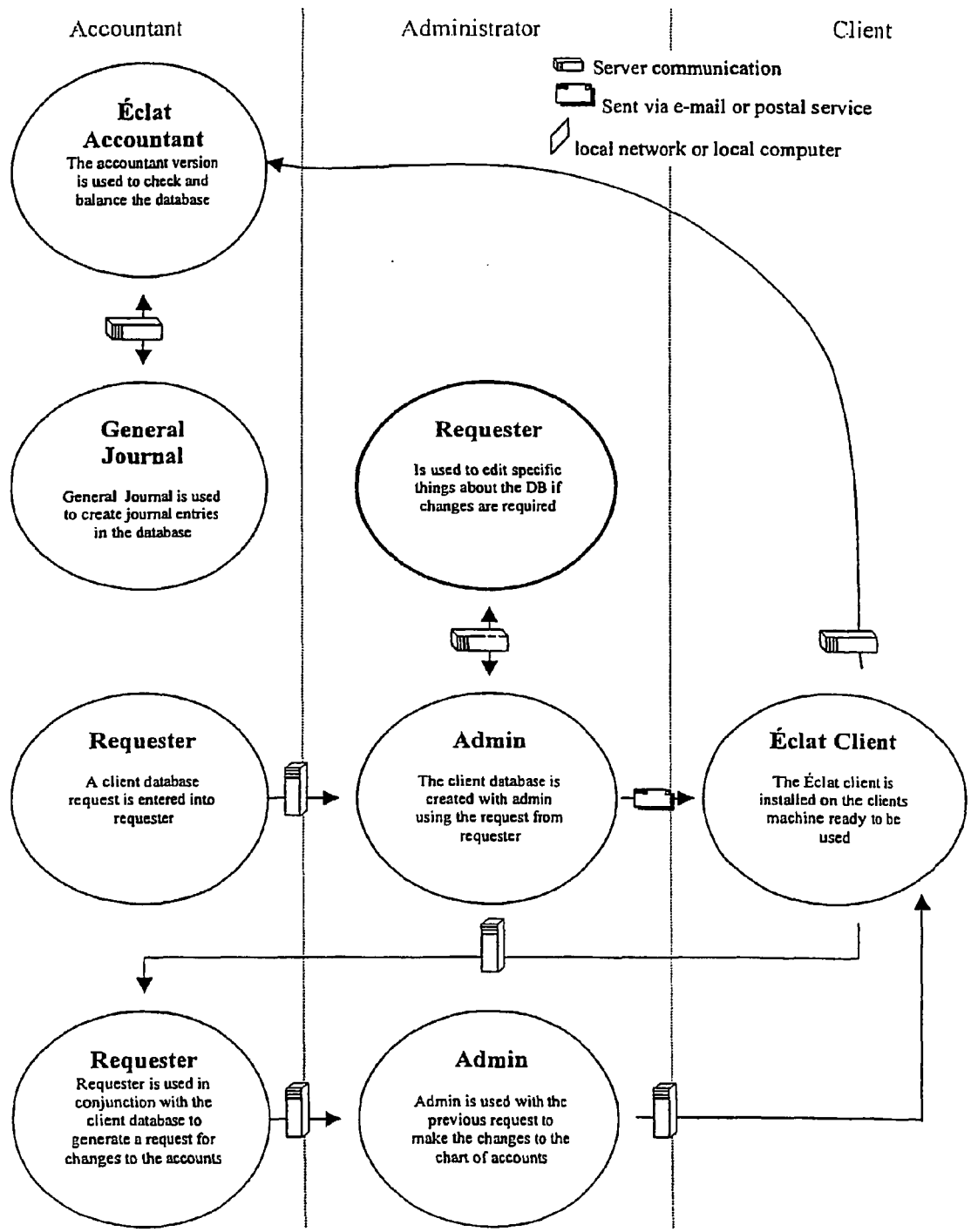

In FIG. 2B, the client module 12, the advisor module and the administration module 14 are arranged to communicate over a communications network including the WWW 18 so that the administration module 14 is directly responsive to any request from the client module 12 or the advisor module 13.

Figure 3A:
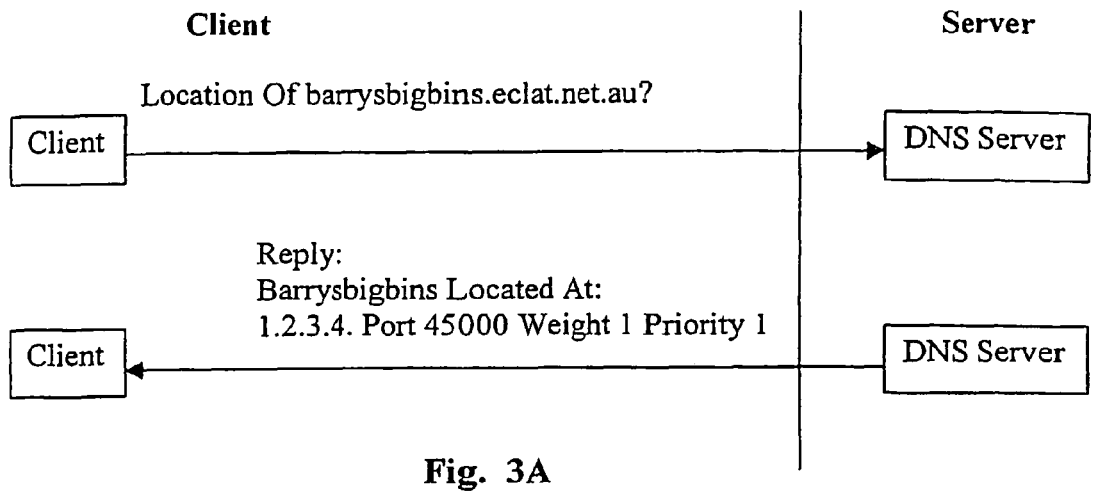
FIGS. 3A and 3B schematically show the procedure in locating client databases in the system of FIG. 1.

FIG. 3A shows the procedure for a client module 12 to locate the server computer of the administration module 14 where its accounts records are stored. The system 10 uses a communications service which allows its networked modules 12 and 13 to make remote procedure calls (RPC) to the server computer of the administration module 14. Uses of the RPC may include enumerating Users and Databases, and accessing other information not available via the client database, including information from the administration module 14 and/or the administration database. In addition, RPC allows potentially sensitive database or other operations onto the server and away from the client modules 12 and the advisor modules 13, such that sensitive information is never sent over the network.

RPC uses HTTP or HTTP over SSL for communication and uses an obscure port for its Server endpoint. Clients can determine the address and port of this endpoint by using DNS SRV (Service Location) lookups for _eclatrpc._tcp.eclat.net.au.

To locate its accounts records on the administration module 14, a client module 12 do the followings:

1. Enter the client module name (for Example, Barry's Big Bins might be barrysbigbins). This will be referred to as the IDB Name.

2. Append The IDB Name to system Domain Name. (ie barrysbigbins.eclat.net.au. This will be referred to as an IDB DNS Name.

3. Using RFC, the system 10 attempts to determine a list of possible servers to connect to. In particular, a record such as _database._tcp.barrysbigbins.eclat.net.au should return 1 or more Address Records specifying valid Accounting Servers, as shown in FIG. 3A.

4. The client can then select and connect to a Database Server to access its records using the IDB Name.

At this point, the client module 12 has all the information required to make a connection to the administration module 14 to locate its accounts records. The client can make a connection to the server of the administration module 14 in the following way:

5. The client retrieves the Hostnames, IP Addresses, and Ports of Suitable Servers (This information is returned from DNS SRV Queries—Above)

6. Check weighting and priority from the SRV reply. Select the server with the lowest Priority and Weighting. If multiple servers are returned with the same Priority and Weighting (ie a Cluster) randomly select one of these records. If only one record is returned we must use it.

7. The client makes a suitable connection to an IP Address/Port pair.

8. Once the connection is established, the client MUST authenticate using their SYSTEM credentials.

An advisor module 13 such as that of an account may have permission to control 1 or more Client Databases. As a consequence, the module 13 should enumerate all databases to which they have access, and allow the account to select a particular database.

The following set of procedure steps describes how the account can enumerate the client databases:

1. Using RFC and the DNS Name: _eclatrpc._tcp.eclat.net.au, a list of potential RPC Servers can be found.

2. Client randomly selects 1 server from the list of RPC Servers. This selection may be prioritized or weighted.

3. Client Makes a request to an RPC server (ie/_eclat_bin/catalbgList/?)

4. RPC Backend Server processes the request and builds a response

Figure 3B:
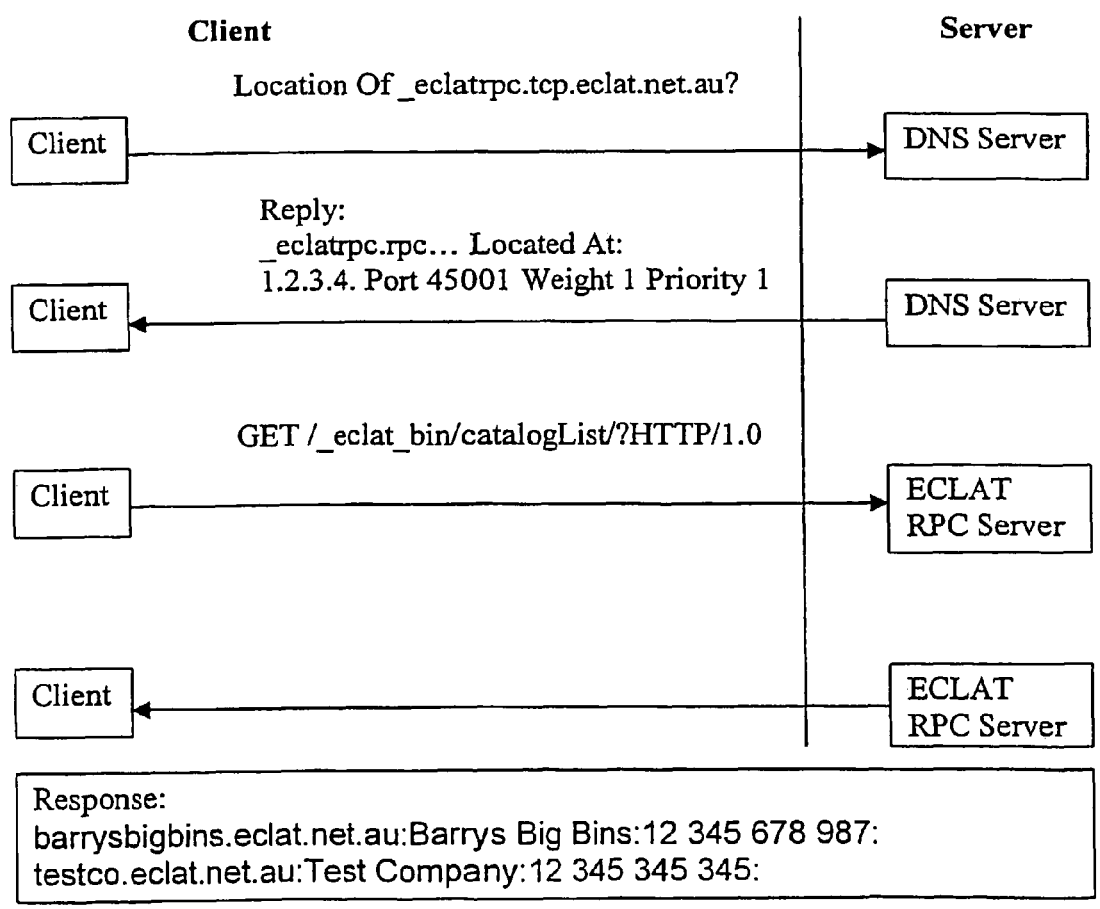

5. Client receives the response, and can now process or parse the response, as shown in FIG. 3B.

Each client module 12 a transaction database with the following transaction fields:

| Field | Description |
| --- | --- |
| Record ID | A unique identifier for an entire transaction |
| Client ID | The client ID for which this transaction occurred (optional) |
| Trading type | ID of types of normal business activities of client |
| Product ID | The product ID for this row in the transaction (optional) |
| Invoice ID | The invoice ID for this row in the transaction (optional) |
| Quantity | The quantity of items sold (optional) |
| SPU | (reserved for later use) |
| Original Invoice Total | The original amount on the invoice (optional) |
| Amount Owing | The amount left owing on the invoice (optional) |
| Payment Total | The total amount for this transaction |
| Tran Head Entry | Is this row the header row for the transaction |
| Payee Name | The payee name for the transaction |
| Payment Type | The payment method |
| Payment Type Details | Any extra details about the payment method, i.e. Cheque number |
| Paid To | Describes the payee info field |
| Payee Info | Describes the payee |
| Source Payment | The source accounts description |
| Reference | Extra information on the payment method |
| Receipt To | What module does the payment/receipt go to |
| Receipt Details | Extra information about the receipt |
| Locked | Has this transaction been reconciled? |
| Accounting Method | Which module does the transaction belong to? |
| Overwrite | (reserved for later use) |
| Bank Branch | The branch number for the bank account |
| Bank Department | The department number for the bank account |
| Branch | The branch number for the destination account |
| Department | The department number for the destination account |
| Entry Date | The date of the transaction |
| Age | How old is the transaction? |
| Period | Which period (financial month) does the transaction belong? |
| Type | Is this a payment, a receipt or a general journal entry |
| Amount | What was the amount of the row for |
| Description | The destination accounts description |
| Amount Withheld | The amount that was withheld |
| Interest | The amount of interest |
| Principal | The amount of principal |
| Stamp Duty | The amount of stamp duty |
| Voluntary Agreement | The amount that was due to a voluntary agreement |
| Instalment Amount | The instalment amount |
| GST Amount | The amount of GST |
| Items Sold | The amount that was due to items sold |
| GST Paid | The amount of GST that was paid |
| Pre 28 | The amount that was attained before 28 May 2000 |
| TFN Amount Withheld | The amount withheld from the tax file number |
| AW Amount Withheld | (reserved) |
| Margin Amount | The margin amount for this account |
| Capital | The amount of capital gains tax |
| Taxed Other | The amount of taxed other |
| Input Taxed | The amount of input tax |
| Input Tax Sales | The amount of input tax due to sales |
| No GST | The amount of no GST |
| Private | The amount that was private |
| Non GST Reportable | The amount that is NON GST Reportable |
| GST | The amount of GST |
| GST Suspense | The amount of GST in suspense |
| Wage Clearing | The amount of PAYG Withholding |
| Wage Clearing (2) | The amount of other withholdings |
| ABN Withhold | The amount withholding from the ABN |
| GL Amount | The general ledger amount |
| Export Supply | The export supply amount |
| GST Free | The GST free amount |
| GST Pre | The amount of pre GST |
| Tax Supply | The amount of tax supply |
| Instalment Income | The amount of instalment income |
| Account ID | The destination account ID |
| Account Header ID | The destination account header ID |
| Outstanding | Is the row outstanding? |
| Tran Code | What was the Code of the destination account? |
| Private Use Only | Is this row a sub row that is used for GST balancing purposes |
| Suspense Moved | Has the suspense been moved to NON GST reportable |

Each client module 12 also has a client chart of accounts with the following accounts fields:

| Field | Description |
| --- | --- |
| Branch | The branch number for this account |
| Department | The department number for this account |
| COY | The company number (reserved) |
| Account ID | The account id of this account in the form of XXXX.XXXX |
| Account Description | A 40 character description for the account |
| Debit/Credit | Is this account a DEBIT or CREDIT account |
| Post | Is this account a posting account |
| End Of Year | This field determines what is done with the data after the financial year |
| Comments | Any comments for this account |
| GST Split | The private portion percentage for this account |
| Group ID | The entity ID that this account belongs to (0 = all) |
| SP Status | Is this account a bank account |
| Retention | The retention account ID |
| Code | The E or I code that applies to this account |
| Extended Code | An extended code for miscellaneous account options i.e. CA = Capital |
| Open Status | Is this account an open status account |
| Credit Total | The opening credit on this account |
| Debit Total | The opening debit on this account |
| Saved Total | Used to temporarily store current balances for each account |

-continued

| Field | Description |
|---|---|
| Must Select | This field is 1 if this account must be selected when its entity is selected |
| Selected | Is this account selected for use |
| Taxed Acquisition % | The taxed acquisition percentage that applies to this account |
| Source | Is this account identified as a source account in requester |
| New Account ID | If this account is a new account from requester what is its ID |

The system 10 uses account category codes for identifying transaction categories. In this embodiment, the following category codes are employed.

| Code | Description | Type |
|---|---|---|
| E01 | General | Expense |
| E02 | Wages | Expense |
| E03 | Non-Reportable | Expense |
| E04 | GST Paid Up Front | Expense |
| E05 | Included Stamp Duty | Expense |
| E06 | Loan | Expense |
| E07 | Hire Purchase - [ACCRUALS] | Expense |
| E08 | Hire Purchase - [CASH] | Expense |
| E09 | Motor Vehicle Registrations | Expense |
| E10 | GST Free | Expense |
| E11 | Voluntary Agreement | Expense |
| E12 | Input Taxed | Expense |
| E13 | Private NON Deductible | Expense |
| E14 | Airfare Tax | Expense |
| E15 | Taxed Acquisition | Expense |
| E16 | (reserved) | Expense |
| E17 | (reserved) | Expense |
| E18 | GST Suspense | Expense |
| E19 | (reserved) | Expense |
| E20 | (reserved) | Expense |
| I01 | General | Income |
| I02 | Small Food Retailer | Income |
| I03 | NON Reportable | Income |
| I04 | Export Supply | Income |
| I05 | Input Taxed | Income |
| I06 | Tax Supply | Income |
| I07 | Pre Jan. 7, 2000 | Income |
| I08 | GST Free | Income |
| I09 | Long-term Accommodation | Income |
| I10 | Predominately LTCA | Income |
| I11 | Margin Scheme | Income |
| I12 | TFN Withholding | Income |
| I13 | (reserved) | Income |
| I14 | GST Suspense | Income |
| I15 | LTCA Input Taxed | Income |
| I16 | Cost of Goods Sold | Income |
| I17 | (reserved) | Income |
| I18 | (reserved) | Income |
| I19 | (reserved) | Income |
| I20 | (reserved) | Income |

Shown below are examples of some accounts in a master chart of accounts and a client chart of accounts for a butcher:

Master chart for accounts for Sales trade

| Account ID | Acc Descript | Description |
|---|---|---|
| 1100.0000 | Sales | Header |
| 1100.1000 | Sale of goods to customers | General with Instalment Income |
| 1100.1001 | Sales to Australian customers | General with Instalment Income |
| 1100.2000 | Sale second hand goods | Tax Supply with Cost of Good Sold |
| 1100.2001 | Sale of new goods | General with Instalment Income |
| 1100.2002 | Sale 2nd hand goods costing over $300 | Tax Supply with Cost of Good Sold |
| 1100.2003 | Sale 2nd hand goods costing under $300 | Tax Supply with Instalment Income |
| 1100.2004 | Sale 2nd hand goods from global pool | GST Suspense with Instalment income |
| 1100.3000 | Sale of goods on consignment | General with Instalment Income |
| 1100.3001 | Sale of new goods on consignment | General with Instalment Income |
| 1100.3002 | Sale 2nd hand goods on consignment | Tax Supply with Cost of Goods Sold |
| 1100.4000 | Small food retailer sales | Small Food Retailer with Instalment Income |
| 1100.4001 | Sale of pet food | Tax Supply |
| 1100.4003 | Sale of fresh meat | GST Free |

Client chart of accounts for a Butcher—Sales Trade

| Account ID | Acc Descript | Description |
|---|---|---|
| 1100.0000 | Sales | Header |
| 1100.4001 | Sale of pet food | Tax Supply |
| 1100.4003 | Sale of fresh meat | GST Free |

Figures 4, 6E:
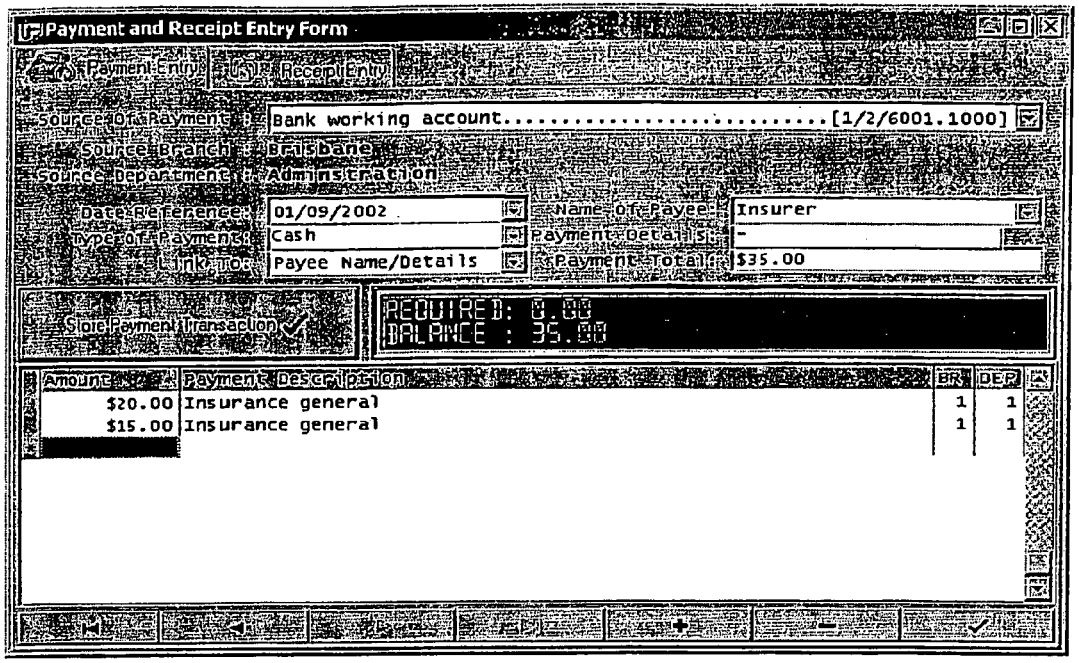
Figures 4A, 4B:
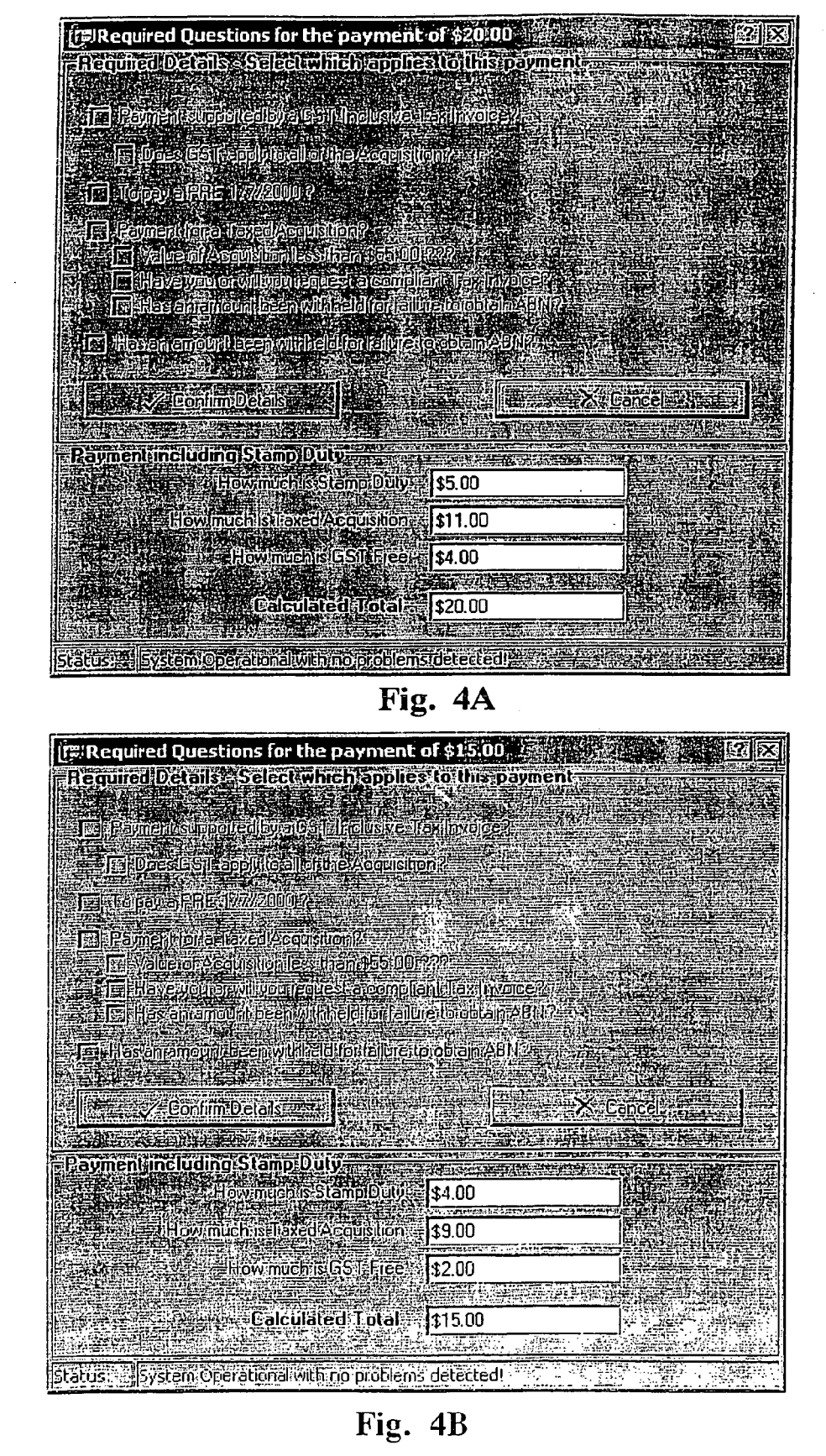

FIG. 4 shows an example of using a client's description of an account (insurance general in this case) for an E05 category code transaction. When the first row in the Amount field is selected, the client module 12 retrieves and shows details of the relevant transaction as shown in FIG. 4A. FIG. 4B shows the details of the Amount in the second row.

Each client module 12 applies an appropriate tax formula to calculate tax liabilities of a transaction. The following table lists some of the tax formulae:

| Field | Formula |
|---|---|
| GST | GSTFromInclusive(CalcExPerc(txtsdTaxedAcq.Value, GSTSplit), GSTMargin) |
| TaxedOther | CalcExPerc(txtsdTaxedAcq.Value, GSTSplit) |
| No GST | CalcExPerc(txtsdGSTFree.Value, GSTSplit) |
| Private | CalcPerc(txtsdTaxedAcq.Value, GSTSplit) + CalcPerc(txtsdGSTFree.Value, GSTSplit) + CalcPerc(txtsdStampduty.Value, GSTSplit), |
| GL Amount | iOrigAmount − (CalcPerc(txtsdTaxedAcq.Value, GSTSplit) + CalcPerc (txtsdGSTFree.Value, GSTSplit) + CalcPerc(txtsdStampduty.Value, GSTSplit)) |
| Non GST Reportable | txtsdStampDuty.Value |

Each client module 12 is arranged to generate transaction reports of selected transactions. Using the FIG. 4 transactions, the module 12 can generate a report as shown in FIG. 4C.

Figure 5:
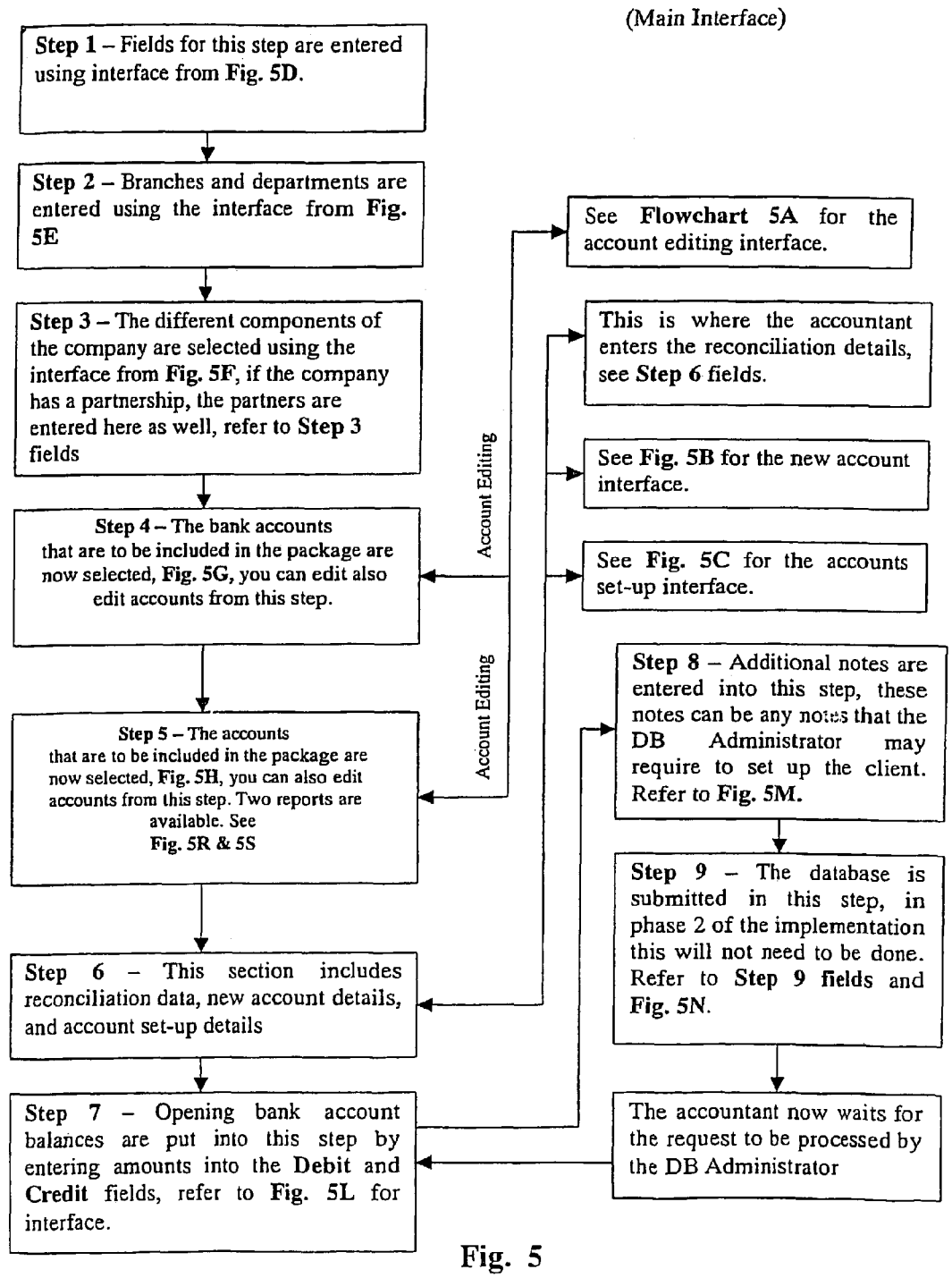
FIGS. 5 to 5C are flow diagrams of steps in creating a client module.

FIG. 5 shows the steps applied in the requester unit 22 for creating a client database of a client module 12 using the relevant fields as shown below.

| Field | Description |
|---|---|
| General Client Information | |
| Full Name | Full Name of Client |
| Trading Name | Trading Name of Client |
| Address | Clients Address |
| Phone Number | Clients Phone Number |
| ABN | ABN of related business |
| Licence Type | This option allows the Accountant to select which version of the program they wish to use, they have the option of Multi Users or Single User. This option determines whether or not they are allowed to have multiple users using their database at a time |
| Reporting Method | Reporting method for client, two option Cash or Accruals |
| Year | The financial year that this database is intended for |
| AS Variables | |
| Company/Fund Deferred Value | ATO provided figure for the client |
| PAYG Commissioner Rate | ATO determined instalment rate |
| Fringe Benefit tax instalment value | Accountant determined fixed fringe benefit amount |
| GST Free Rate | Small business GST Free concession |
| Modules to Include In Package | |
| Cashbook (base system) | General Cashbook/General Ledger system - this must be included |
| Accruals | Accrual accounting system including inventory |
| Achievement Model | Business management model |
| Assets | Resource Management |
| Budget | Financial Forecasting |
| Manufacturing Process | Standard and Variance Analysis |
| Point Of Sale | Point of Sale Incorporating both Retail and Wholesale |
| Provisions | Accrued Expenses |
| Payroll/Personnel System | Personnel Management |
| Step 3 Fields | |
| Entity Components | |
| Club or Association | (self explanatory) |
| Company | (self explanatory) |
| Consolidation Adjustment | (self explanatory) |
| Manufacturing Account | Includes accounts used for manufacturing purposes |
| Partnership | (self explanatory) |
| Sole Trader | (self explanatory) |
| Superannuation Fund | (self explanatory) |
| Trading Account | Includes accounts used for trading purposes |
| Trust Discretionary | (self explanatory) |
| Trust Unit | (self explanatory) |
| Partner Fields | |
| ID | A unique identifier for the partner, this field is automatically |
| User Name | A user name for this partner |
| Name | The full name of this partner |
| Share | The shared percentage of profits that this partner is distributed |
| Comments | Any comments associated with this partner |
| Step 6 Fields (Section 1) | |
| Reconciliation Details | |
| Account | Selected bank accounts for this reconciliation entry |
| Description | Type of item |
| Amount | The amount for the reconciliation entry |
| Reference | Reference point for this reconciliation entry |
| Step 9 Fields (Submission) | |
| Email Settings | |
| Username | The clients Username for their SMTP server authentication |
| Password | The clients password for their SMTP server authentication |
| SMTP | The clients SMTP server for their ISP |
| SMTP Port | The clients SMTP port number for their ISP |
| Email Address | The clients full reply email address |

Appendix E—Account Editing Fields

| Account Editing Fields | | |
|---|---|---|
| Field | Description | Editable |
| Branch | The branch number for which this account belongs | No |
| Department | The department number for which this account belongs | No |
| Account ID | The account ID number of this account | No |
| Acc Descript | The description that the client will see for this account | Yes |
| Private % | The private portion allocated to other accounts - double click the row to change this field | Yes |
| Comments | Any comments associated with this account | Yes |

| Field | Description |
|---|---|
| Step 6 Fields (Section 2) | |
| New Account Details - Header Information | |
| Type | The type of the new account from the list |
| Name | A descriptive name for the new account |
| Header Account | The header account for which this new account should belong |
| Debit | The opening debit amount on the account[1] |
| Credit | The opening credit amount on the account[2] |
| New Account Details - Private Portions | |
| Description | A description for the reason of the private percentage |
| Percentage | The percentage that should be allocated to the destination account |
| Destination Account | The destination account for which this private portion should be allocated |
| Account Setup Fields | |
| Account Selection Fields | |
| Setup | Has this account been set up yet, the user cannot submit until all accounts have been set up. |
| Branch | The branch number of this account |
| Department | The department number of this account |
| Account ID | The account id for this account |
| Description | The name of this account |
| Account Type | The type of set up that is required for this account |
| Account Codes Used In Setup Form | |
| E07 | Hire Purchase (Accruals) |
| E08 | Hire Purchase (Cash) |
| E03 | Non Reportable Expense |
| I15 | Predominant LTCA (Input Taxed) |
| I10 | Predominant LTCA (5.5%) |

Figure 5A:
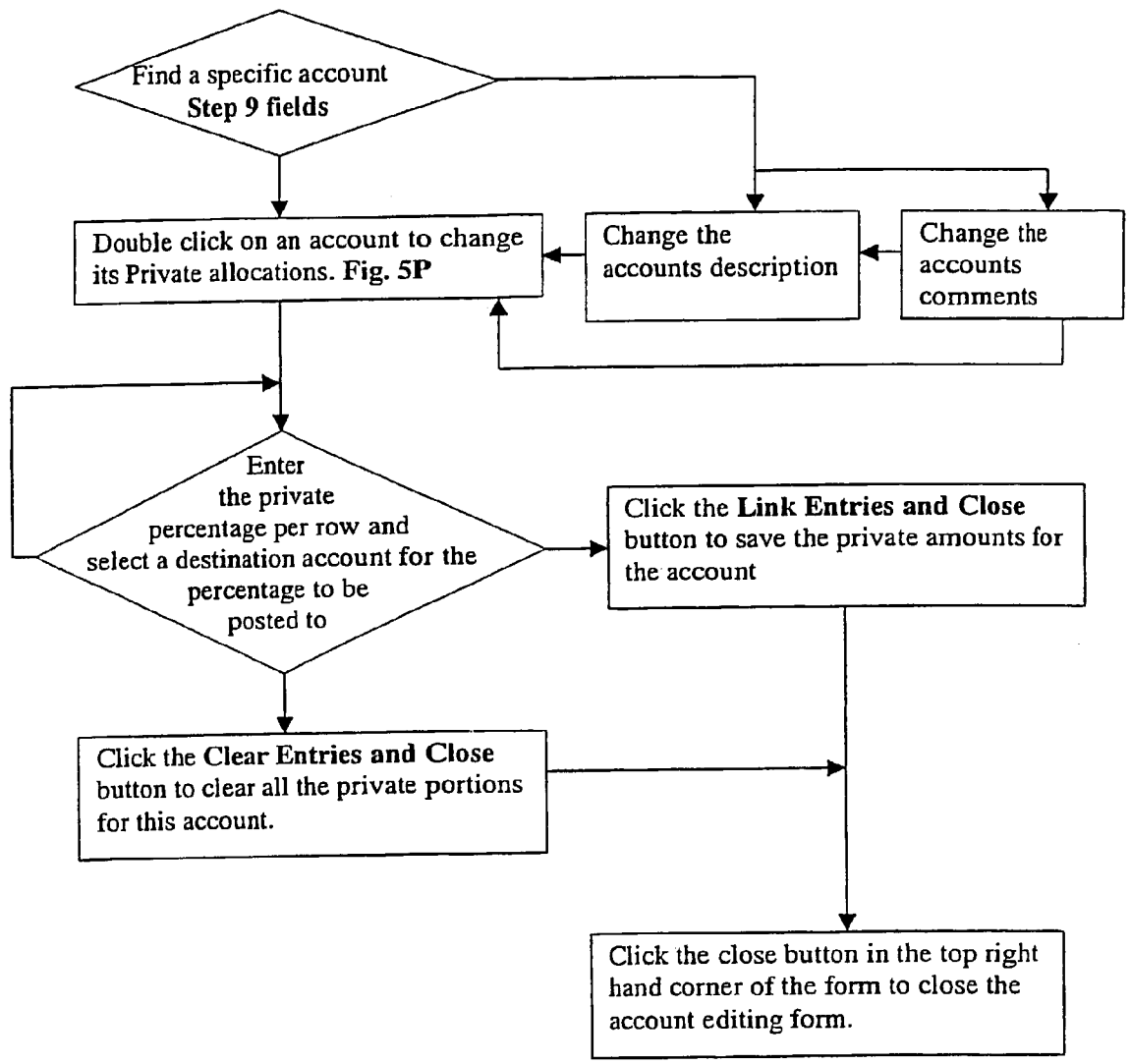
FIGS. 5D to 5Q are interface forms for creating and maintaining client modules.
FIG. 5R is report listing available headers for accounts.
FIG. 5S is a report of selected accounts.
Figure 5B:
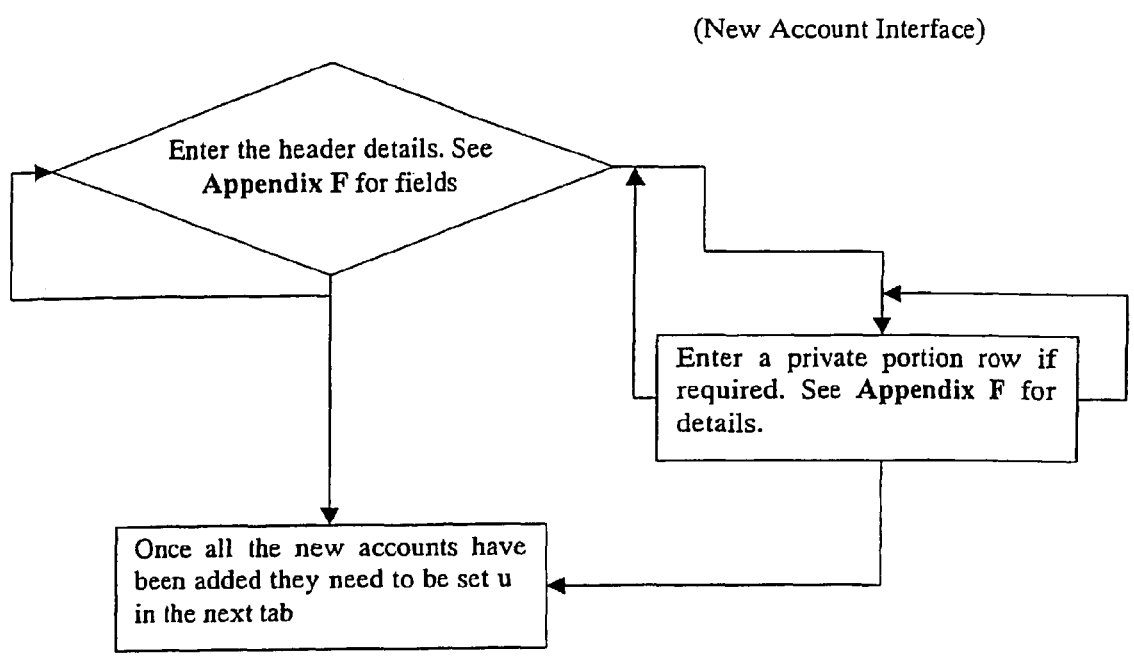
Figure 5C:
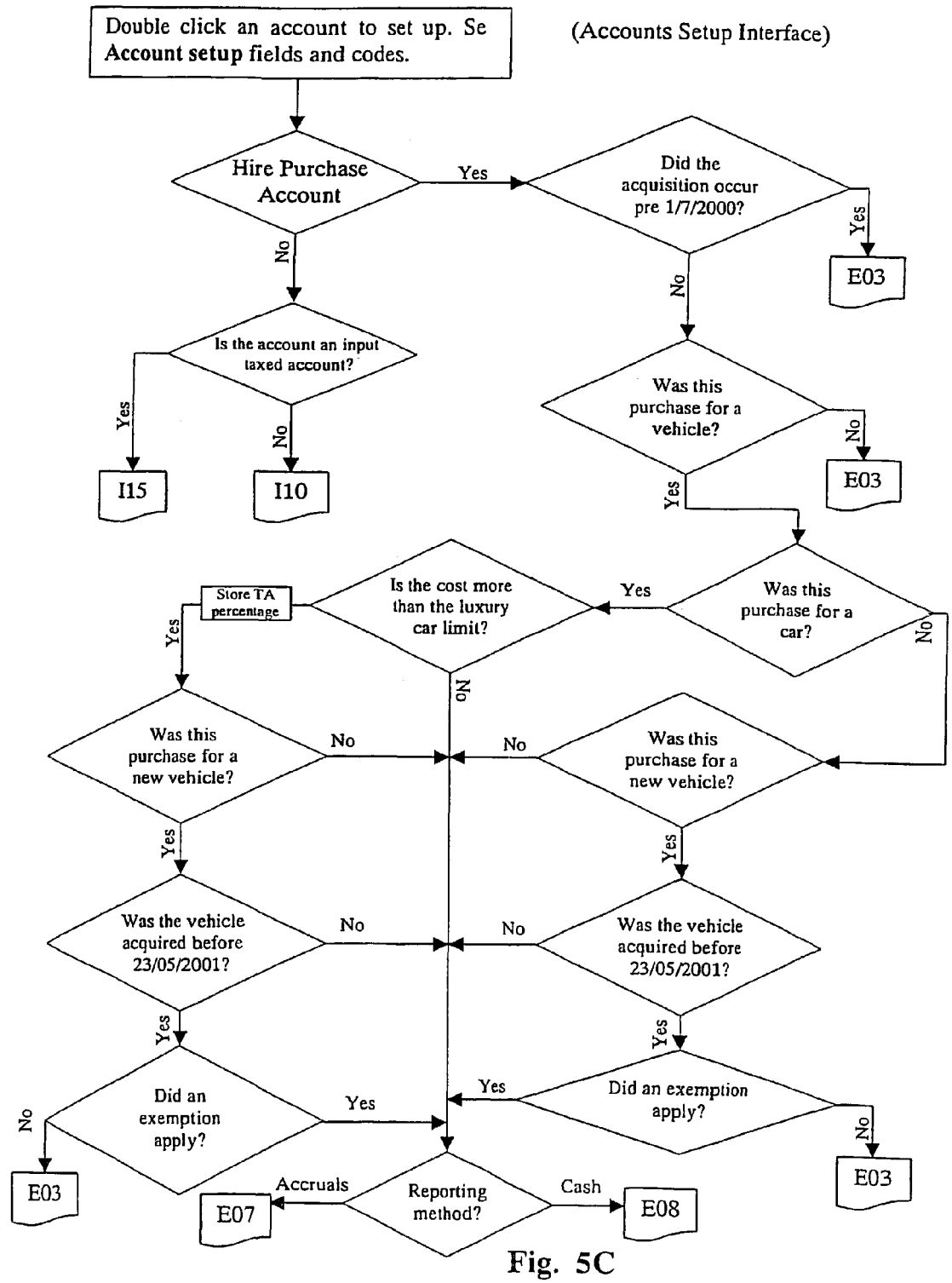
Figures 5D, 5E:
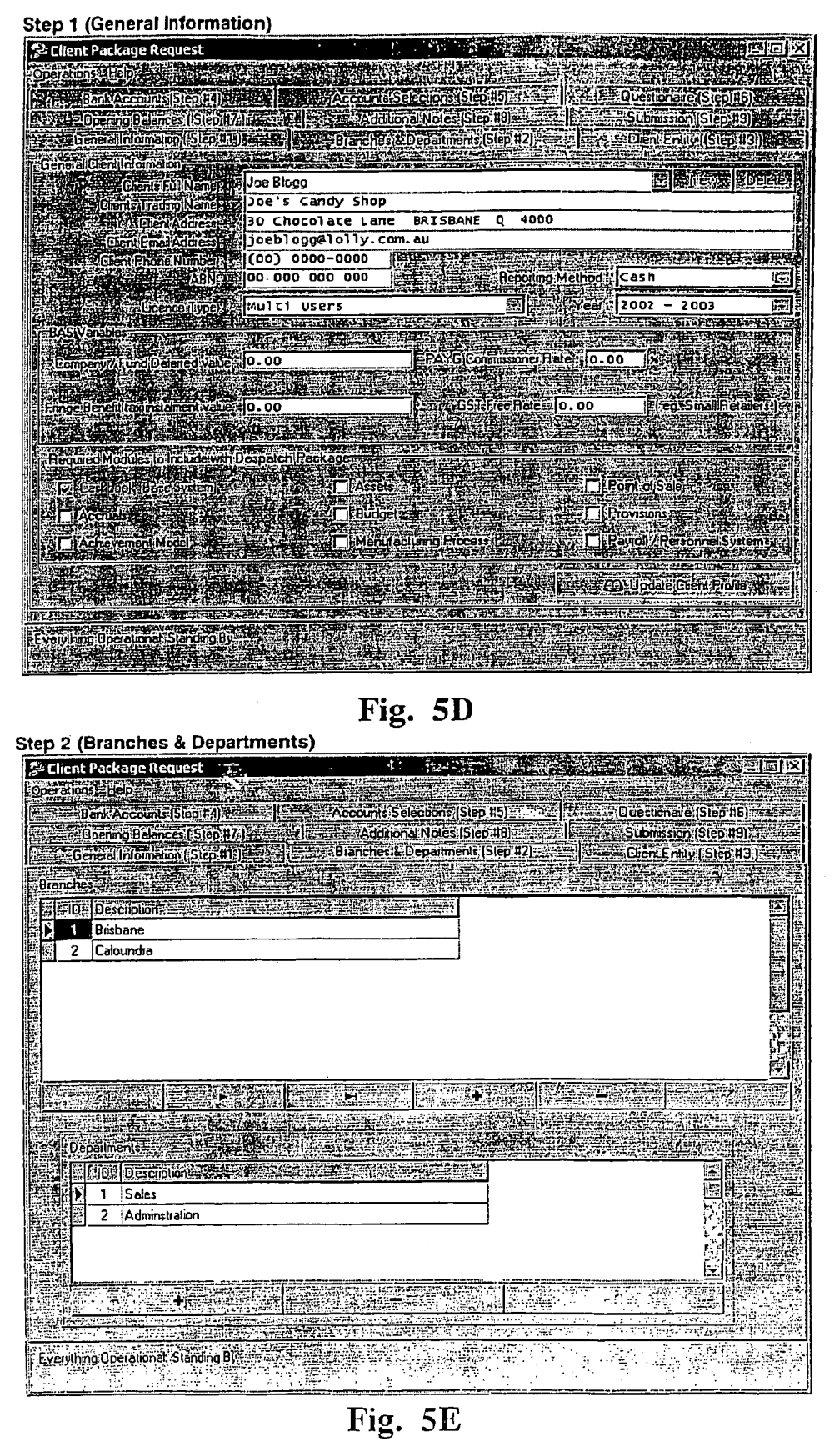
Figures 5J, 5K:
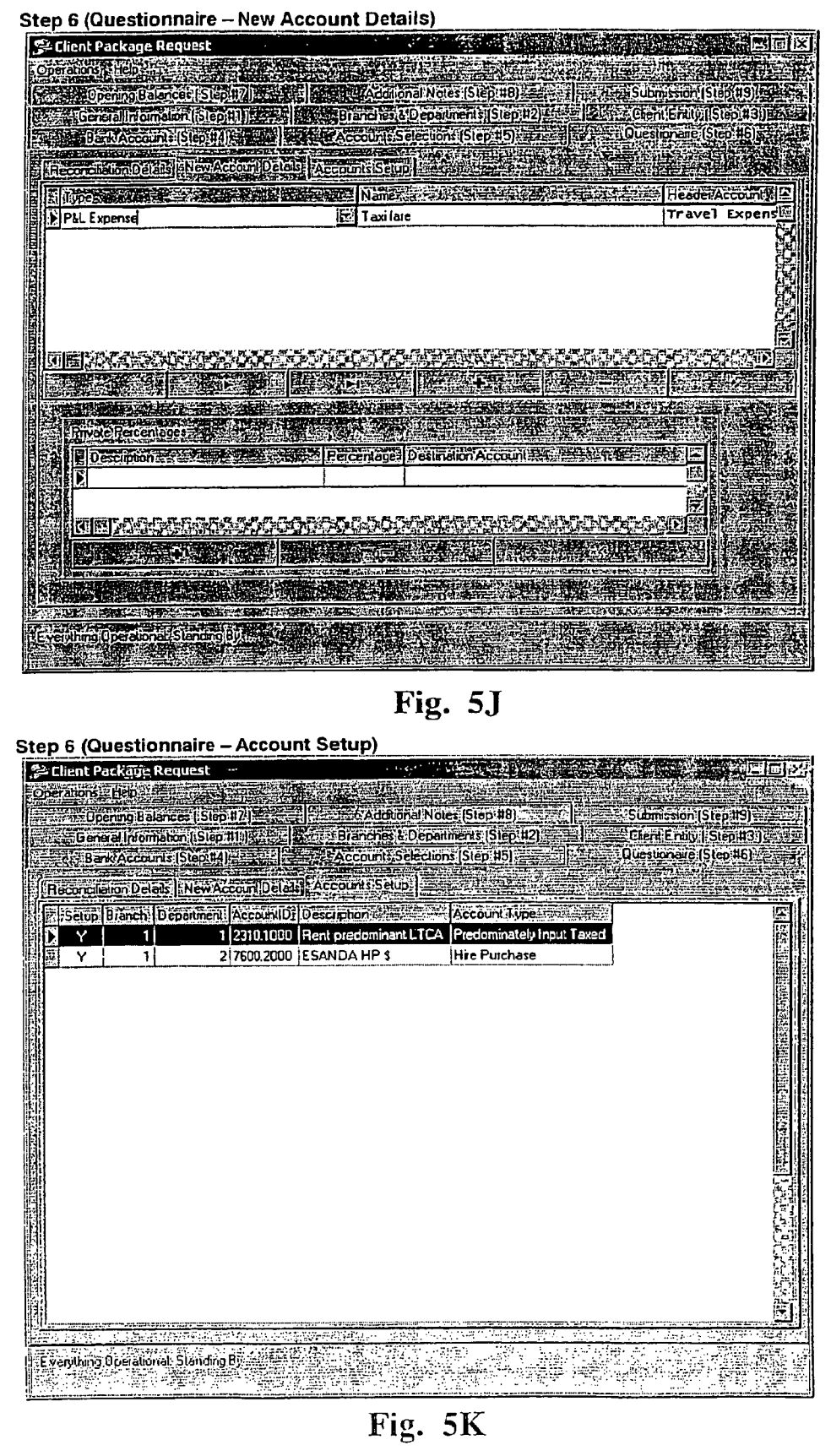
Figures 5N, 5O:
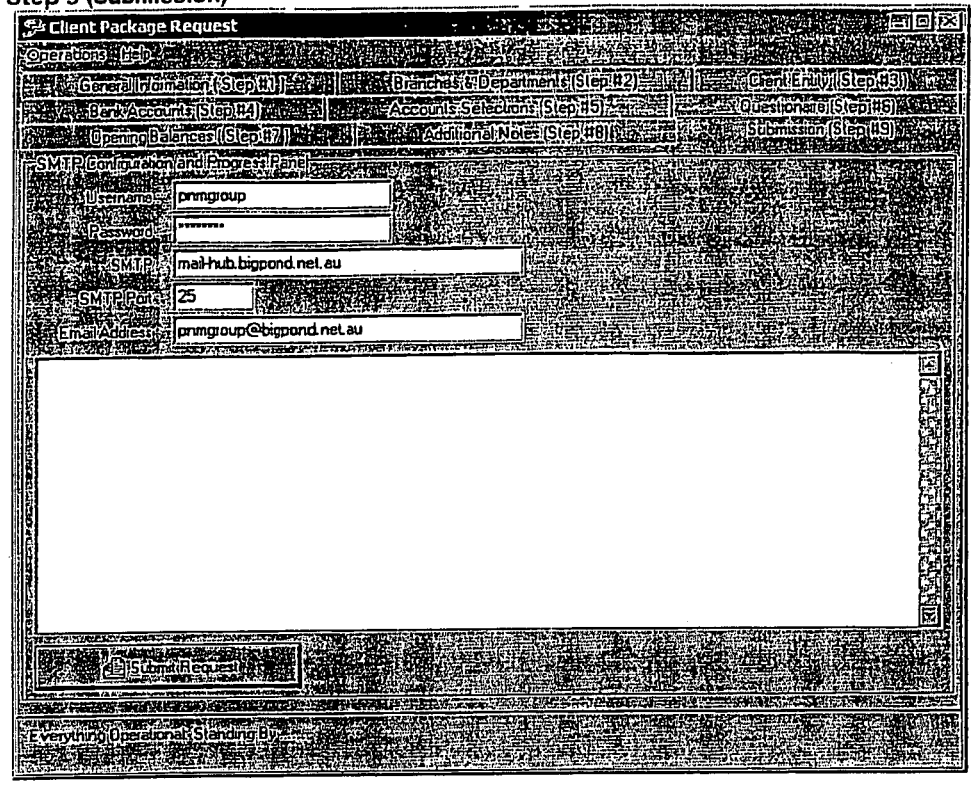

The steps of the requester unit 22 are described in more details in FIGS. 5A to 5Q. FIG. 5R shows parts of an example of the Available Accounts report, and FIG. 5S shows parts of an example of the Selected Accounts report.

Figure 6:
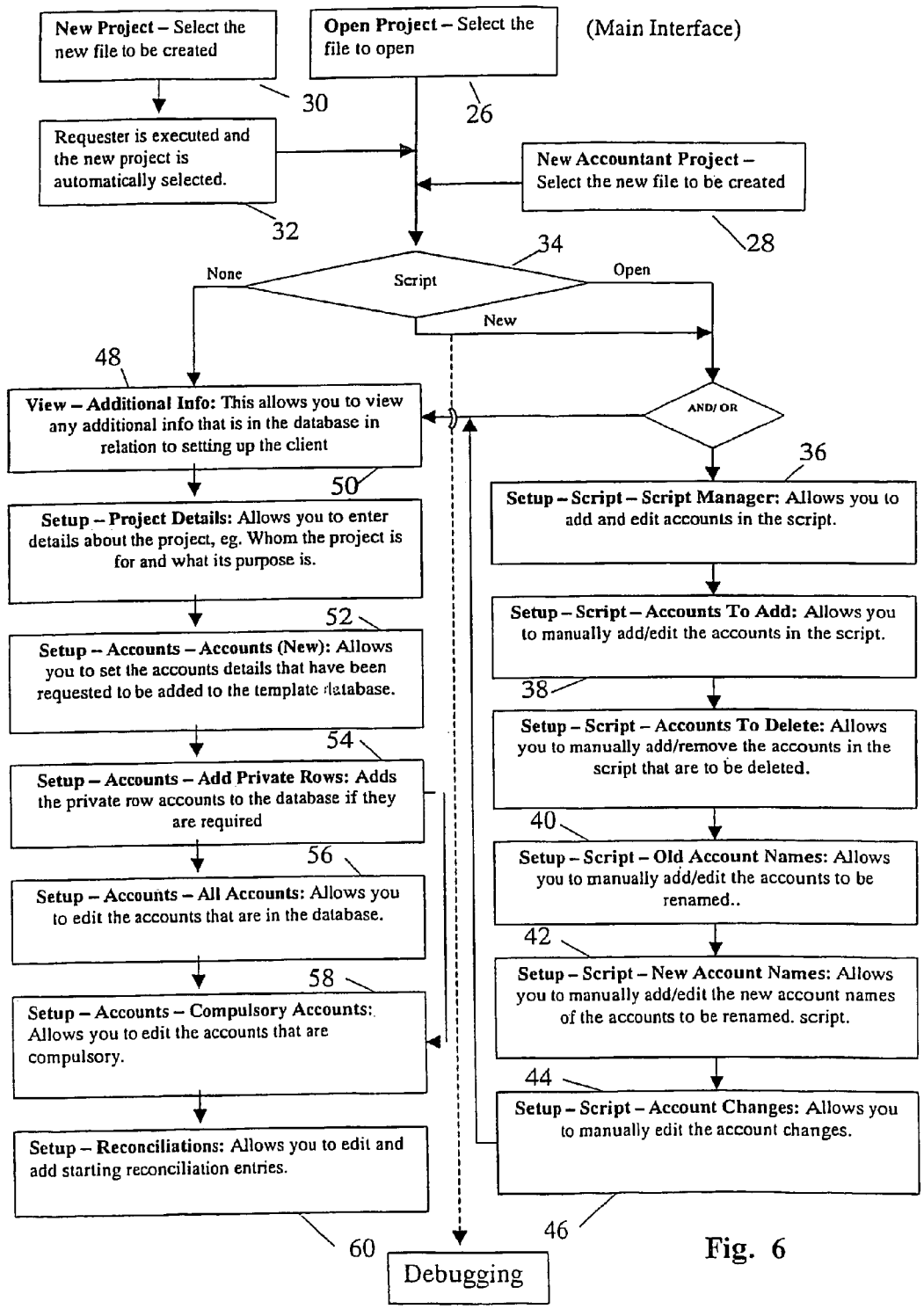
FIG. 6 shows operational steps in creating and maintaining accounts files.

FIG. 6 shows the steps taken by the administration module 14 in creating and maintaining client databases, and in responding to the requests from the requester unit 22. The administration module 14 thus provides the option of opening an existing client database for viewing or maintaining through step 26, the option for a registered advisor (accountant) to create new client modules and to maintain client account databases through step 28, and the option of creating a new client module 12 in responding to a request from the requester unit 22 though steps 30 and 32. In all options, a script step 34 is entered in which the administration module 14 will perform the tasks of opening the existing accounts file named in the step 26, or to create a new client accounts file as requested by the requester unit 22 in the steps 30 and 32.

When creating a new client accounts file, the administration module 14 checks for whether accounts details for the new file are provided in the request and if not, whether there is a specified trading type in the request. If accounts details are present, the module 14 extracts the relevant information from the provided accounts details for incorporation into the new file. If the accounts details have not been provided and there is a specified trading type, the module 14 selects default accounts details for the trading type for incorporation into the new file. Where neither accounts-details nor a trading type are provide, the module 14 prompts the requester for the required information.

Figure 6A:
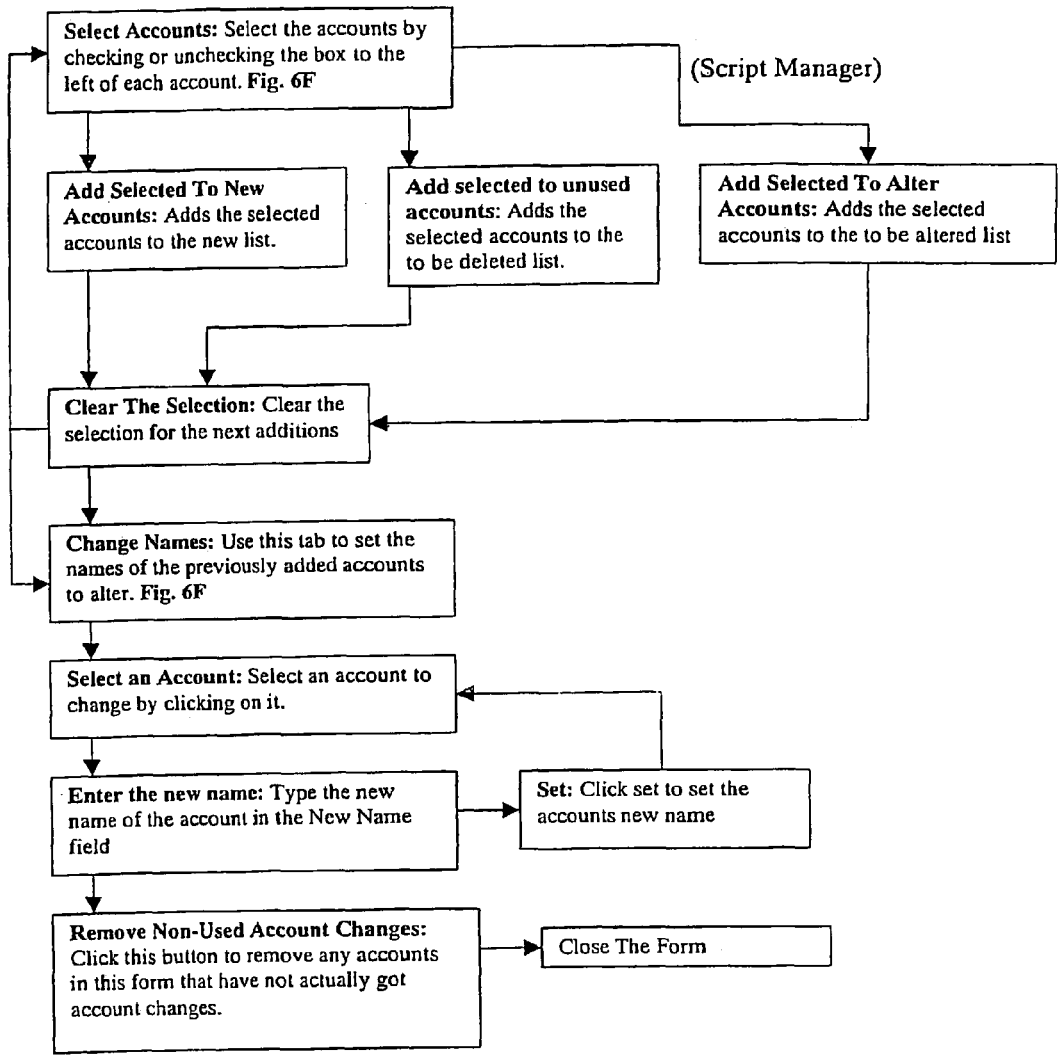
FIG. 6A shows the operational steps of the script manager.

A script maintenance step 36 is entered for performing accounts file maintenance tasks as illustrated in FIG. 6A. Any of the following accounts fields can be added, edited or deleted as illustrated in steps 38 to 46.

| Field | Description |
|---|---|
| | Account Fields |
| Branch | The branch ID number for which this account belongs |
| Department | The department ID number for which this account belongs |
| COY | The company number for this account (reserved) |
| Account ID | The account identification number, the sub account number of this number will default to XXXX, clicking the ( . . . ) button inside this field will allocate it with the next available number for that header account. |
| Acc Descript | A short (1-40 chars) description of the account |
| DR_CR | This field should be DEBIT or CREDIT |
| Post | Does this account get included in the financial reports |
| EOY | There are four options for this field: RETAIN - Will carry the closing balance to the Retention account at the end of the financial year HOLD - This account will hold its closing balance at the end of the financial year ZERO - This account must have a balance of 0 at the end of the financial year, eg. Don't Know Or Not Listed accounts CLEAR - This account will automatically clear its balance at the end of the financial year |
| Comments | Any comments relevant to this account |
| GST Split | The Private Portion for this account expressed as a percentage |
| Group ID | What entity this account belongs to, see Appendix C |
| SP Status | Is this account a source account |
| Retention | The account where the closing balance is to be retained. See EOY above |
| Code | A code which determines how the information is stored for the transaction that occur when this account is used as a destination account, see Appendix D for a complete listing. |
| Code Ex | A code which determines any extended properties of this account, see Appendix E for a complete listing. |
| Open Status | Does this account require an opening balance |
| CR Total | Opening credits on this account |
| DR Total | Opening debits on this account |
| Saved Total | This field is used internally for reports to store a temporary balance for the account |
| Must Select | Does this account have to be included if its relevant entity is included as part of the project |

| Field | Description |
|---|---|
| Selected | Is this account selected to be included in the project |
| TA Percentage | This stores the Taxed Acquisition Percentage |
| Source | Determines if the account CAN be a source account, i.e. should it be listed in requester as part of the source account listing |
| Acc ID | A number that determines a unique identifier for this NEW account |
| | Setup - Account Changes Fields |
| New Account Name | The new account name for this accounts |

In step 48, additional information that is relevant to an account detail is presented in order to alert the user of the appropriate detail to be entered. FIG. 6D shows examples of the additional information.

Figure 6B:
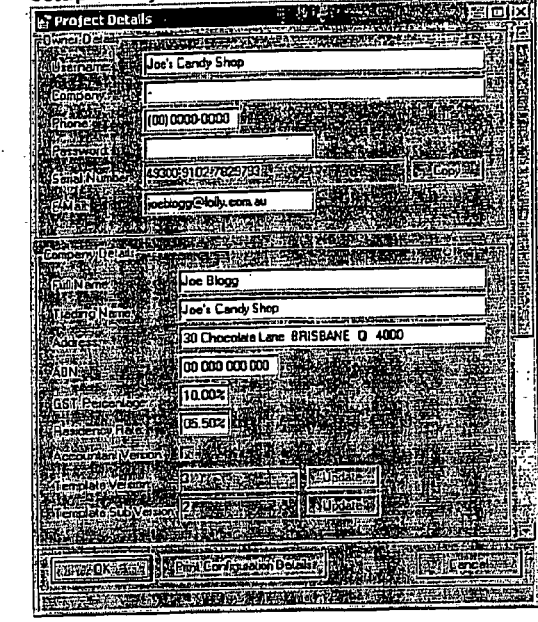
Figure 6B:
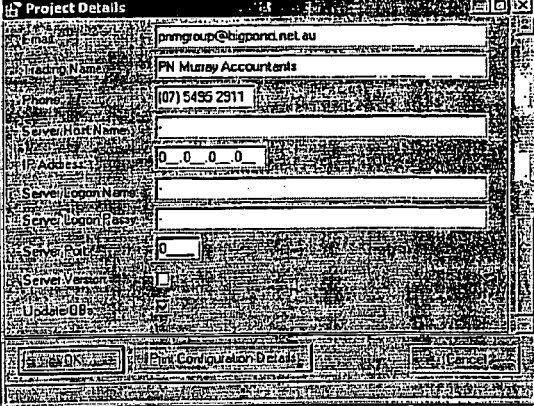
Figure 6C:
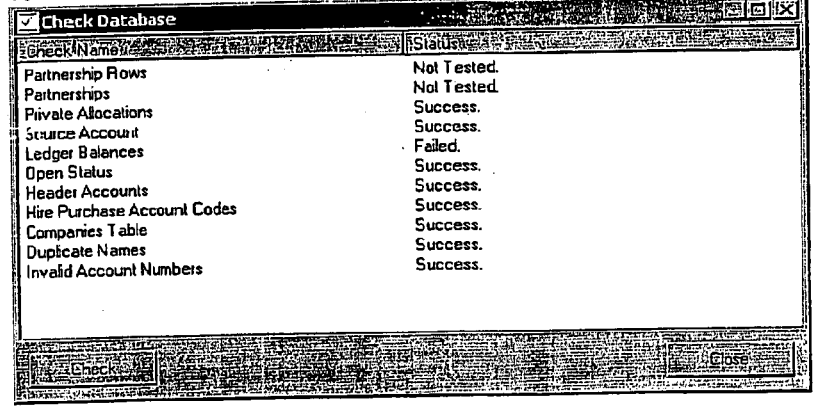
Figure 6D:
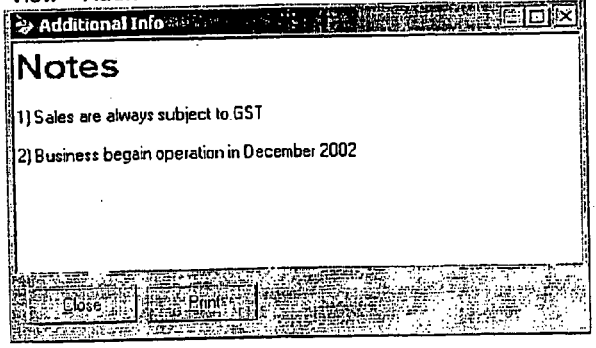
Figure 6F:
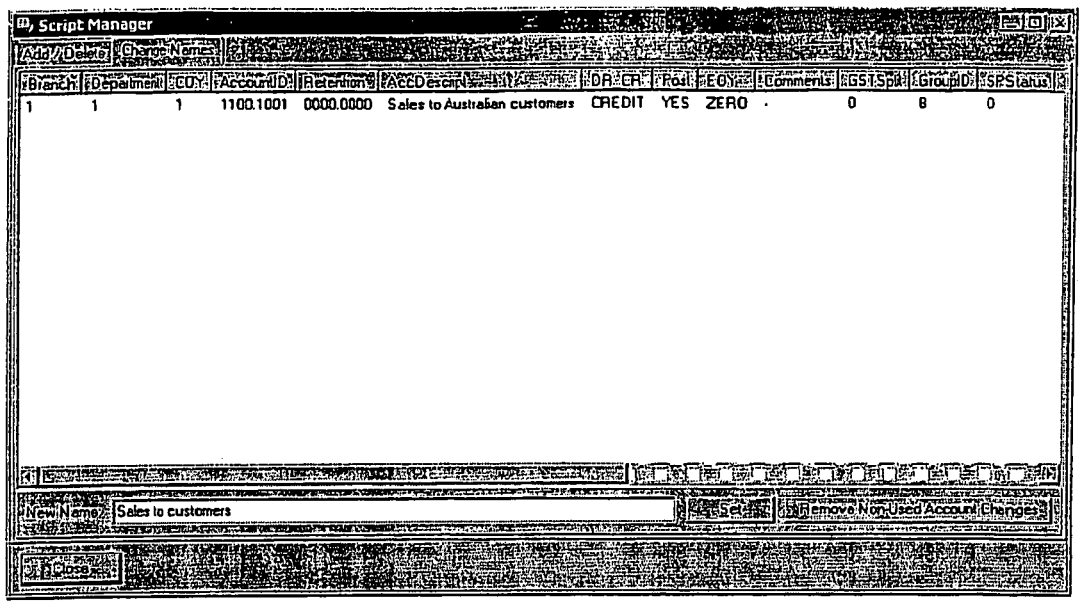

In step 50, the interface as shown in FIG. 6B is used to enter client details for the client module. Below are some of the client details:

| Field | Description |
|---|---|
| | Owner Details Section |
| Username | The clients user name |
| Company | The clients company name |
| Phone | The clients phone number |
| Password | The administration password for the database |
| Serial Number | This generated field is the code needed to install |
| E-Mail | The clients e-mail |
| | Company Details |
| Full Name | The full name of the clients company |
| Trading Name | The trading name of the clients company |
| Address | The address of the clients company |
| ABN | The ABN of the clients company |
| GST Percentage | The GST percentage for the clients business |
| Residency Rate | The long term commercial accommodation rate for the clients business |
| Accountant Version | This option is checked if the database is for an accountant |
| Template Version | The major version number of the database |
| Template Sub Version | The minor version number of the database |
| | Accountant Details |
| E-Mail | The E-Mail address for the accountant to which this client belongs |
| Trading Name | The trading name for the accountant to which this client belongs |
| Phone | The phone number for the accountant to which this client belongs |
| Server Host Name | The name of the server for the live version (Phase 2) |
| IP Address | The IP Address of the server for the live version (Phase 2) |
| Server Logon Name | The initial logon name for the live server (Phase 2) |
| Server Logon Passy | The initial logon password for the live server (Phase 2) |
| Server Port | The port to use when connecting to the server (Phase 2) |
| Server Version | The minimum version number of the server that the database expects |
| Update OBs | This option should be checked if the opening balances need to be updated when the project is first opened in ECLAT |

The step 52 allows the accountant to set up a new client module 12 and to add the account details to a template database, and any of the account details can be declared private and edited as illustrated in steps 54 to 58.

The step 60 is for maintaining reconciliation entries as shown below:

| Field | Description |
| --- | --- |
| Reconciliation - Main Entry | |
| Recon ID | An automatically filled field which represents the ID number for this reconciliation |
| | The company number for this reconciliation (reserved) |
| Recon Start | The starting date for the reconciliation |
| Recon End | The ending date for the reconciliation |
| Recon Acc Name | The account for which this reconciliation is for |
| Closing CR Balance | The closing credit balance for the reconciliation |
| Closing DR Balance | The closing debit balance for the reconciliation |
| OS Balance | The amount outstanding |
| Opening Balance | Opening balance |
| Closing Balance | Closing balance |
| Ledger Balance | Ledger balance |
| Reconciliation - Sub Entry | |
| Payment | Amount of the payment |
| Receipt | Amount of the receipt |
| Date | Date of the balance |
| Reference | Reference information |
| OS | Hidden Field - Is this entry outstanding |
| Entry ID | A unique identifier for this entry |

The group identification field in the account fields may be any of the followings: Group IDs

| ID | Description |
| --- | --- |
| 0 | Always included |
| 1 | Club or Association |
| 2 | Company |
| 3 | Consolidation Adjustment |
| 4 | Manufacturing Account |
| 5 | Partnership |
| 6 | Sole Trader |
| 7 | Superannuation Fund |
| 8 | Trading Account |
| 9 | Trust Discretionary |
| 10 | Trust Unit |

The accounts codes has the following extensions identified as the "Code Ex" field in the accounts fields:

| Account Codes | |
| --- | --- |
| Code | Description |
| CA | Indicates whether the transactions for this account will be capital on the business activity statement |
| CG | Cost of Goods Sold |
| II | Indicates whether the transactions for this account will be instalment income on the business activity statement |
| NA | There is no extended functionality for this account |
| OB | Opening Balance (Private/Journal Use) |
| OI | Performs the same functionality as NA |

A debugging process is used to debug and test the client module 12 before packaging for delivery to the client.

When the client receives the new client module 12 it can be installed on his computer and the module 12 is ready for use without the usual need to set up accounts and to allocate tax liabilities that is common in the prior art. Moreover, he needs not to learn new accounting terms as the account descriptions are the ones he is familiar with.

Figure 7A:
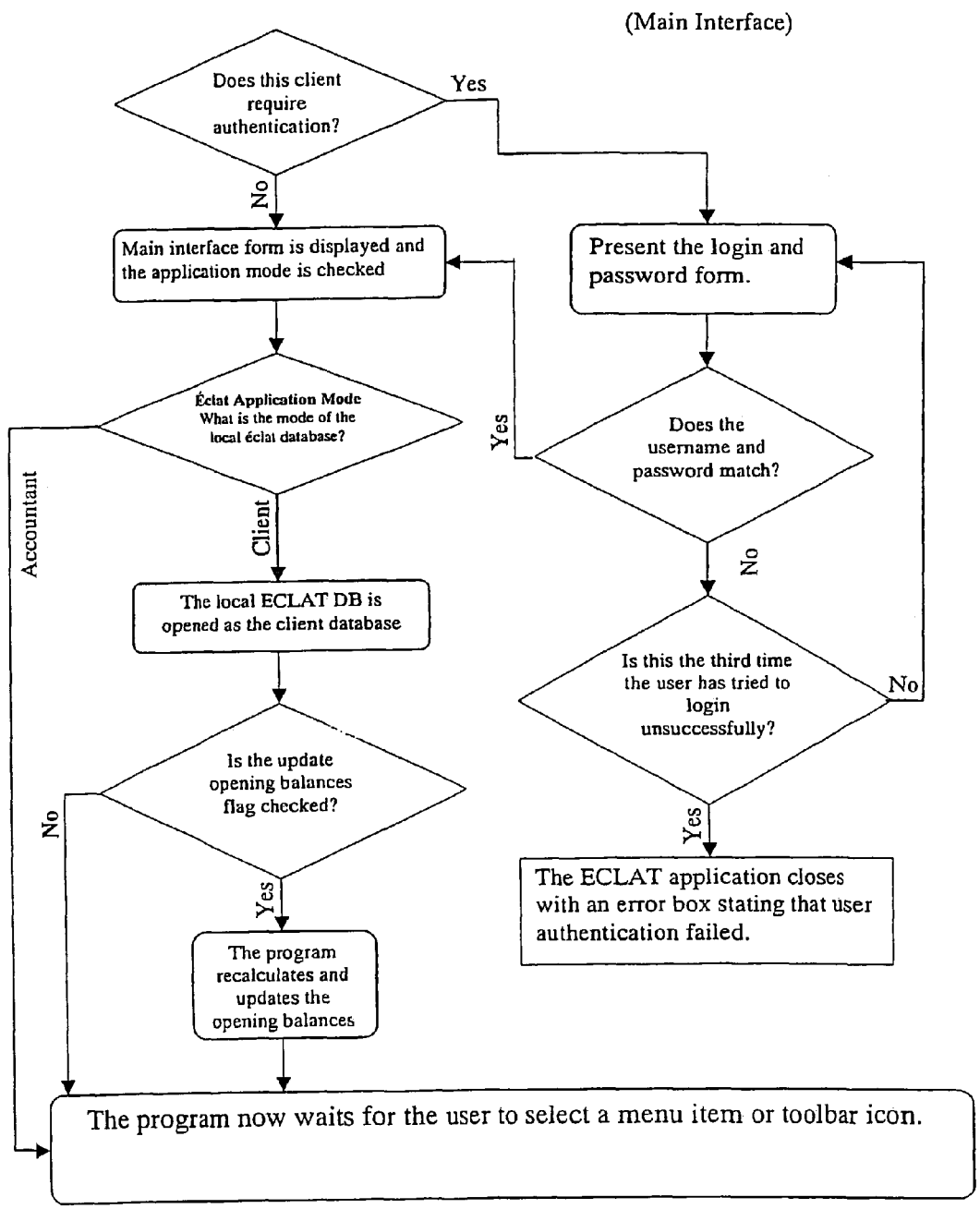
FIG. 7A shows the client verification procedure in the client module.

When the client module 12 such as a cash book module is set to operate, the module 12 performs a security check with the steps as shown in FIG. 7A unless the security check procedure is disabled for this client. If the client is allow to continue, a main interface is presented for selection of any one of the operation options. For examples, the "Receipt Entry" and "Payment Entry" options when selected would present the interfaces as shown respectively in FIGS. 8A and 8B. The module 12 can be operated in either a client mode or an accountant (advisor) mode. If the client mode is operating, When operating in the client mode the module 12 opens a local accounts database file for use and checks for opening balance update flag for performing the update operation when this flag is checked.

Figure 7B:
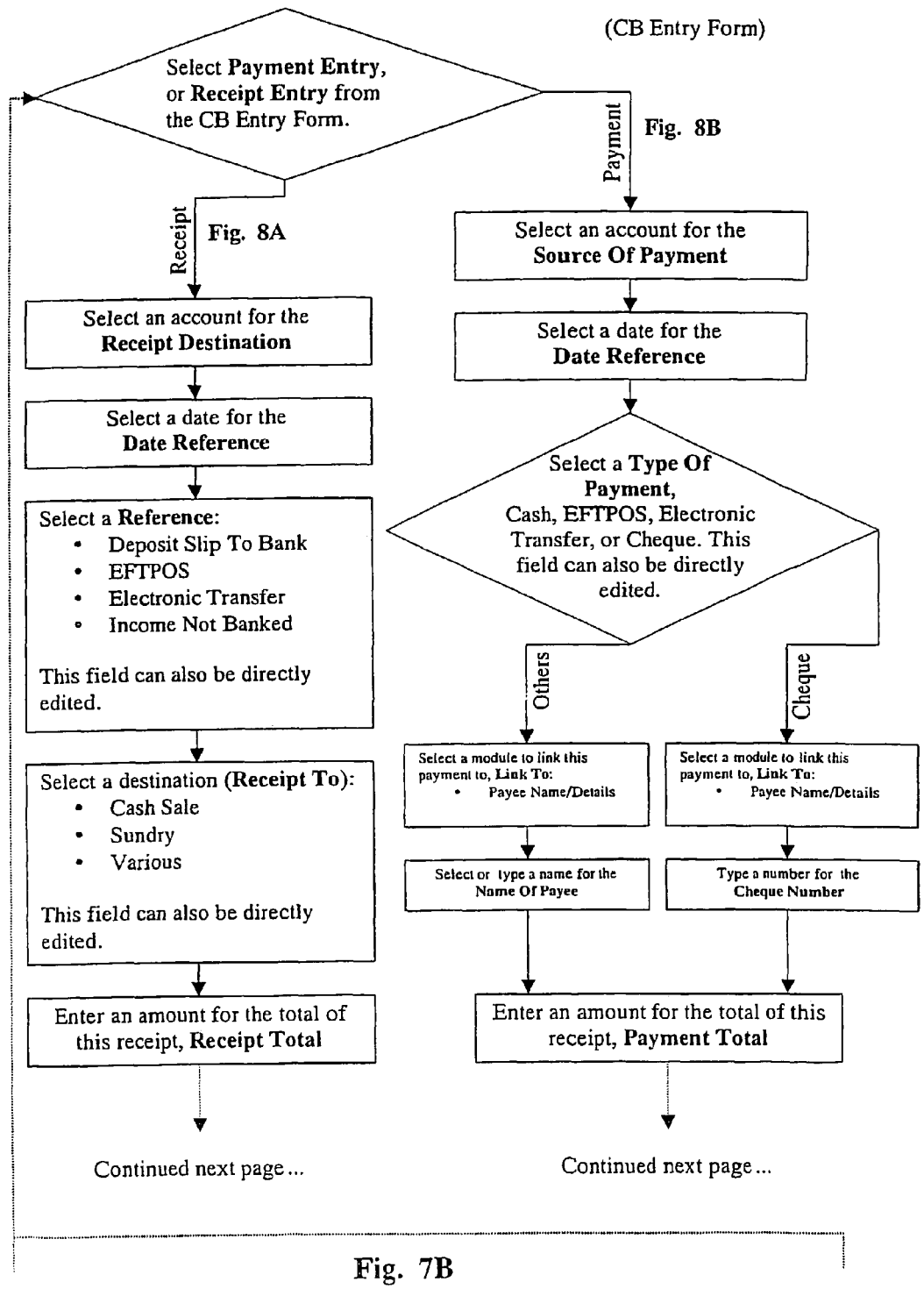
FIG. 7B is a flow diagram of steps in the Payment Entry and Receipt Entry options.
Figure 7B:
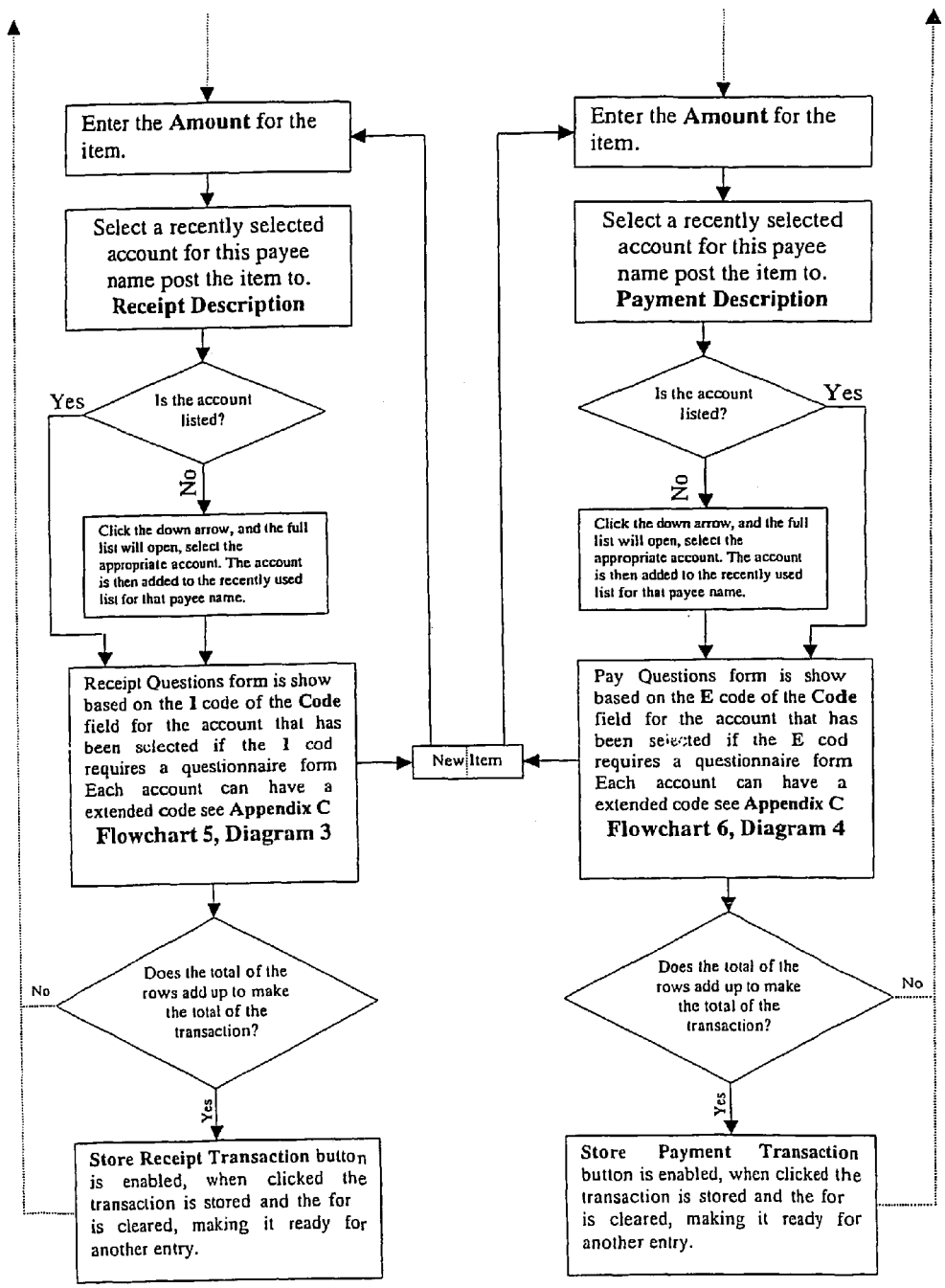
Figure 7C:
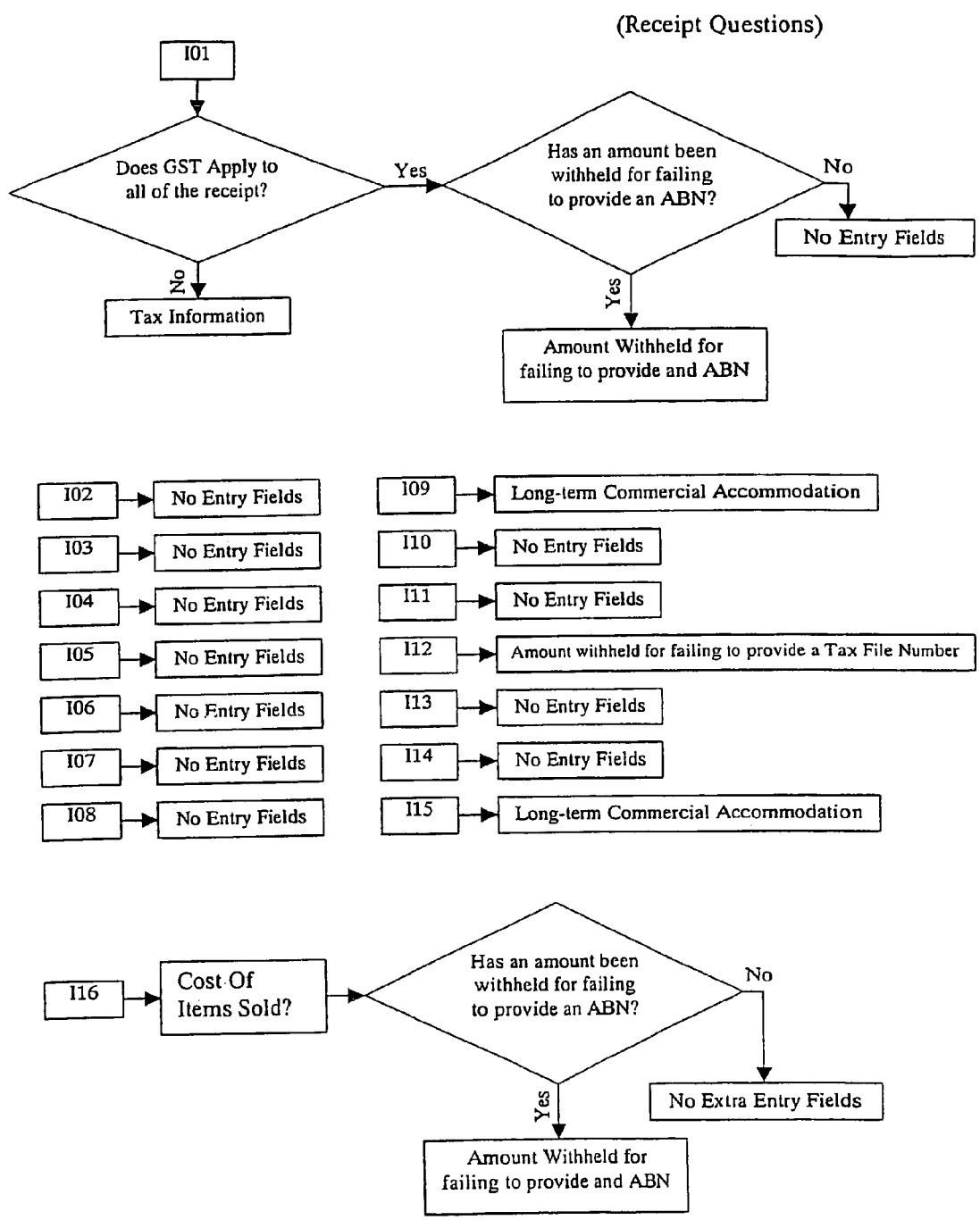
FIG. 7C shows examples of the procedures for prompting the user to provide information for the Receipt Entry option.
Figures 8A, 8B:
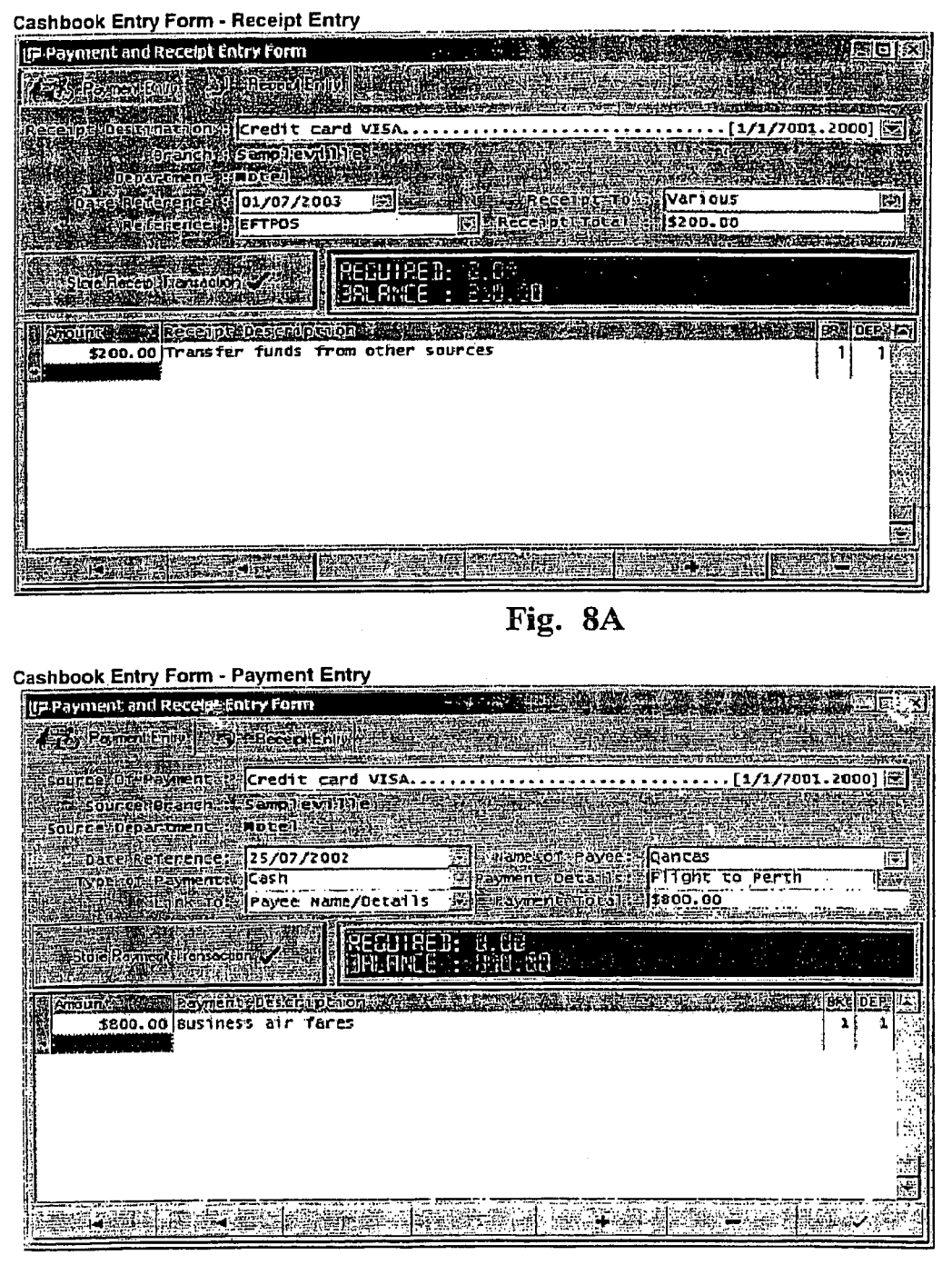
Figure 8C:
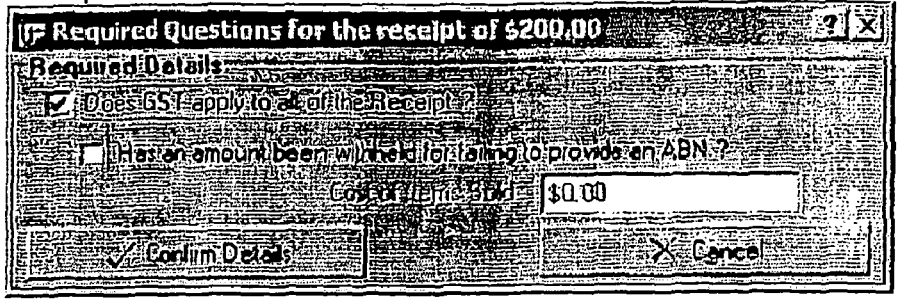
FIGS. 8C to 8S are interface forms with prompts for entering information for Receipt Entry and Payment Entry, and for accounts reconciliation.

FIG. 7B shows the operational steps for both the "Payment Entry" or the "Receipt Entry" options as respectively shown in FIGS. 8A and 8B. When in the "Receipt Entry" operation, a set of prompts appear such as the ones shown in FIG. 8C for the client to provide appropriate information for calculating tax liabilities of the transaction. FIG. 7C shows the steps for some of the prompts. Note that all the codes for the prompts are based on the I codes of the accounts codes. Embodiments of the receipt prompts are as follows:

Receipt Questions

Figure 8D:
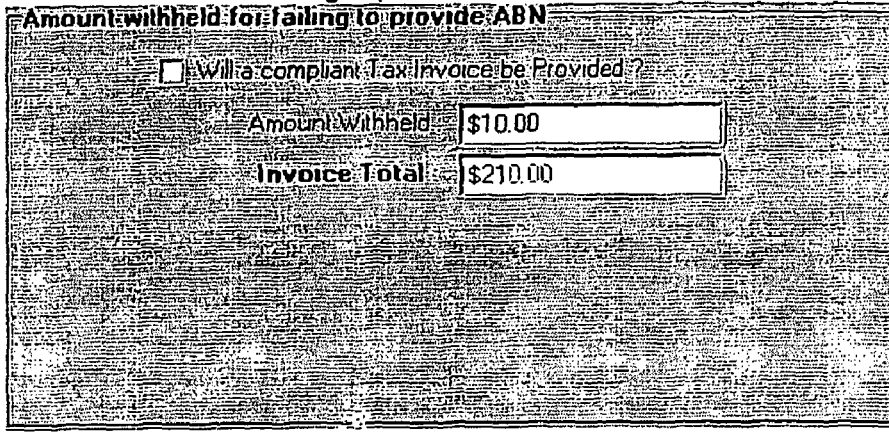
FIG. 8A is an interface form for receipt entry.
FIG. 8B is an interface form for payment entry.
FIGS. 8T to 8Y are some examples of reports that are available.
Figure 8E:
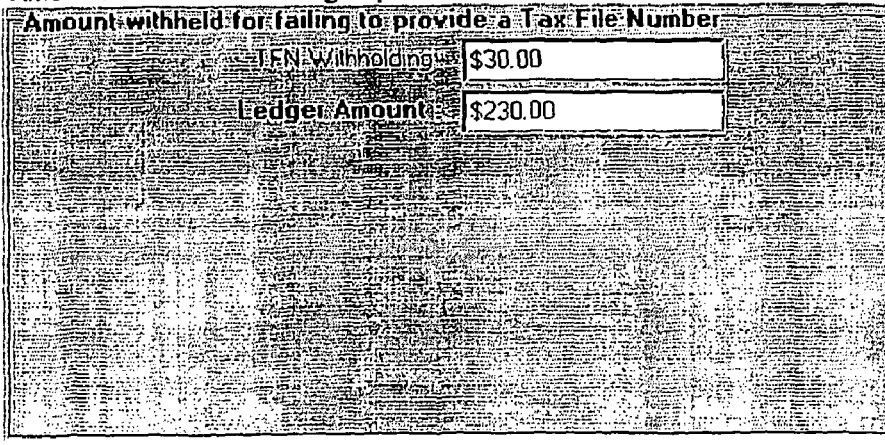

| Field | Description |
| --- | --- |
| Amount withheld for failing to provide ABN (FIG. 8D) | |
| Will a compliant Tax Invoice be Provided? | Check box asking if a tax invoice will be provided, if it is provided you do not need to specify the Amount Withheld |
| Amount Withheld | Entry field for the amount which was withheld |
| Invoice Total | This is the total of the transaction |
| Amount withheld for failing to provide a Tax File Number (FIG. 8E) | |
| TFN Withholding? | Entry field for the amount which is withholding to your TFN |
| Total | This is the total ledger amount of the transaction |
| Tax Information (FIG. 8E) | |
| How much is taxable supply? | Entry field for the amount which is taxable supply |
| How much is PRE Jan. 7, 2000? | Entry field for the amount which is pre Jan. 7, 2000 |
| How much is export supply? | Entry field for the amount which is export supply |
| How much is GST Free supply? | Entry field for the amount which is GST free supply |
| How much is input taxed? | Entry field for the amount which is input taxed |
| Amt Withheld for failing to provide ABN? | Entry field for the amount for failing to provide an ABN |
| Calculated Total | This is the total of all other entry fields |
| Original Total | This is the total of the transaction |
| Long-term Commercial Accommodation (FIG. 8F) | |
| How much from guests who have stayed less than 28 days? | Entry field for the amount which was from guests who have stayed less than 28 days |
| Original Total | This is the total of the transaction |

Figure 7D:
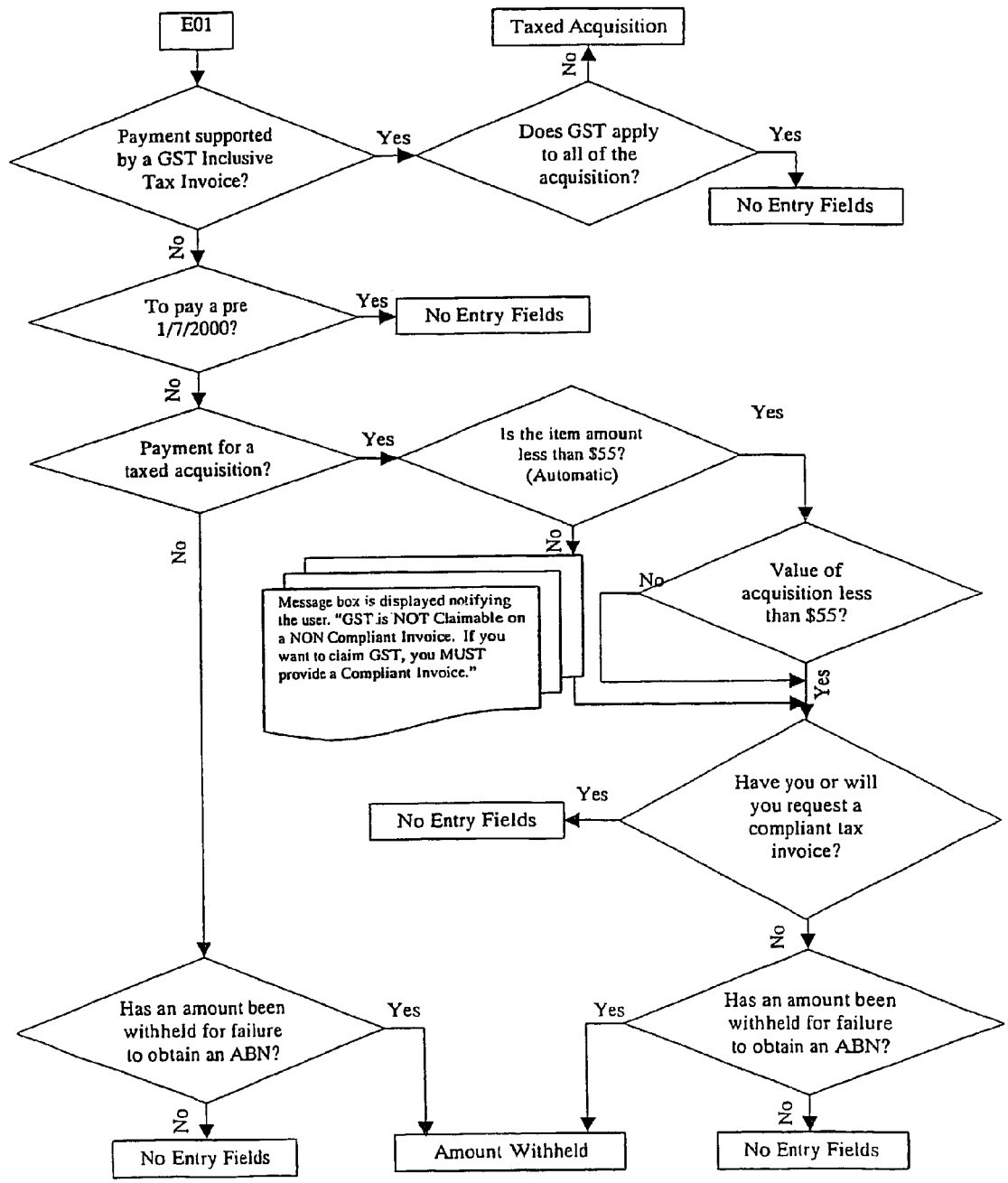
FIG. 7D shows examples of the procedures for prompting the user to provide information for the Payment Entry option.
Figure 7D:
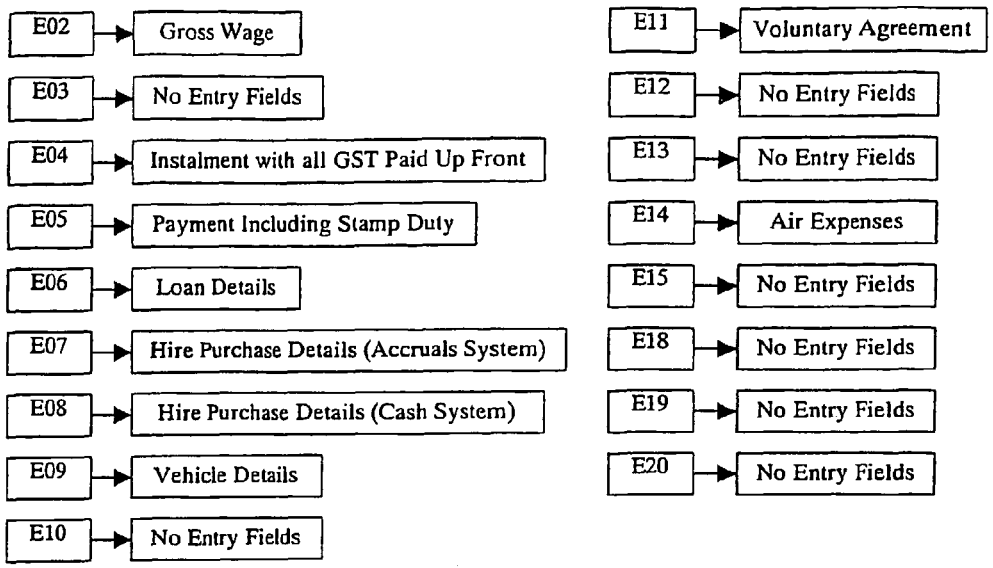

FIG. 7D shows some of the prompts for the "Payment Entry" operation and an example of the interface for the payment prompts is illustrated in FIG. 8G. Note that all the codes for the payment prompts are based on the E codes of the accounts codes. Embodiments of the payment prompts are as follows:

| Pay Questions | |
|---|---|
| Field | Description |
| Amount Withheld (FIG. 8H) | |
| What is the amount withheld? | This is where the user types in the amount withheld |
| Calculated Total | This is the total of the transaction |
| Vehicle Details (FIG. 8I) | |
| How much is third party? | This is where the user types in the amount that was for third party |
| How much is registration? | This is where the user types in the amount that was for registration |
| Calculated Total | This is the total of the transaction |
| Payment Including Stamp Duty (FIG. 8J) | |
| How much is stamp duty? | Entry field for the amount paid that was stamp duty |
| How much is Taxed Acquisition? | Entry field for the amount paid that was taxed acquisition |
| How much is GST Free? | Entry field for the amount paid that was GST free |
| Calculated Total | This is the total of the transaction |
| Airfare Expenses (FIG. 8K) | |
| How much is airfare tax? | Entry field for the amount paid that was airfare |
| How much is Taxed Acquisition? | Entry field for the amount paid that was taxed acquisition |
| How much is GST Free? | Entry field for the amount paid that was GST free |
| Calculated Total | This is the total of the transaction |
| Taxed Acquisition (FIG. 8L) | |
| How much is Taxed Acquisition? | Entry field for the amount paid that was taxed acquisition |
| How much is Non Taxed Acquisition | Entry field for the amount paid that was non taxed acquisition |
| How much is PRE Jan. 7, 2000? | Entry field for the amount paid that was before Jan. 7, 2000 |
| How much is other? | Entry field for the amount paid that does not belong in any other fields |
| Original Amount | This shows the entire amount for the current item |
| Calculated Total | This is the total of the transaction |
| Loan Details (FIG. 8M) | |
| How much is interest? | Entry field for the amount paid that was interest |
| How much is principal? | Entry field for the amount paid that was principal |
| How much is stamp duty? | Entry field for the amount paid that was stamp duty |
| Calculated Total | This is the total of the transaction |
| Hire Purchase Details (FIG. 8N) | |
| How much is interest? | Entry field for the amount paid that was interest |
| How much is principal? | Entry field for the amount paid that was principal |
| How much is stamp duty? | Entry field for the amount paid that was stamp duty |
| Calculated Total | This is the total of the transaction |
| Gross Wage (FIG. 8HO) | |
| What is the amount of tax withheld? | Entry field for the amount paid that was tax withheld |
| What is the amount of other withholdings? | Entry field for the amount paid that was other withholdings |
| Calculated Total | This is the total of the transaction |
| Voluntary Agreement (FIG. 8P) | |
| How max tax withheld? | Entry field for the amount paid that was tax withheld |
| Calculated Total | This is the total of the transaction |
| Instalment with all GST Paid up Front (FIG. 8Q) | |
| How much is stamp duty? | Entry field for the amount paid that was stamp duty |
| How much is GST? | Entry field for the amount of GST on the transaction |
| Instalment amount? | Entry field for the instalment amount |
| Calculated Total | This is the total of the transaction |

Figure 7E:
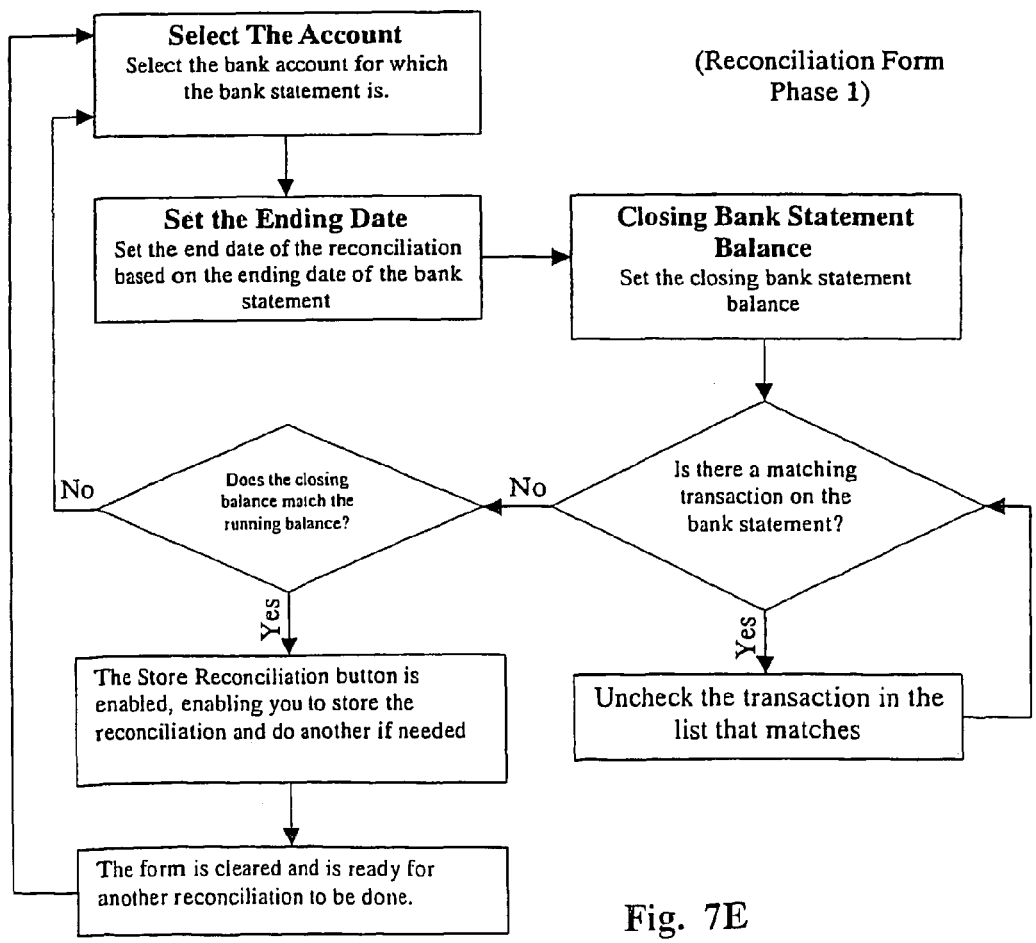
FIGS. 7E and 7F show the steps in accounts reconciliation.
Figure 7F:
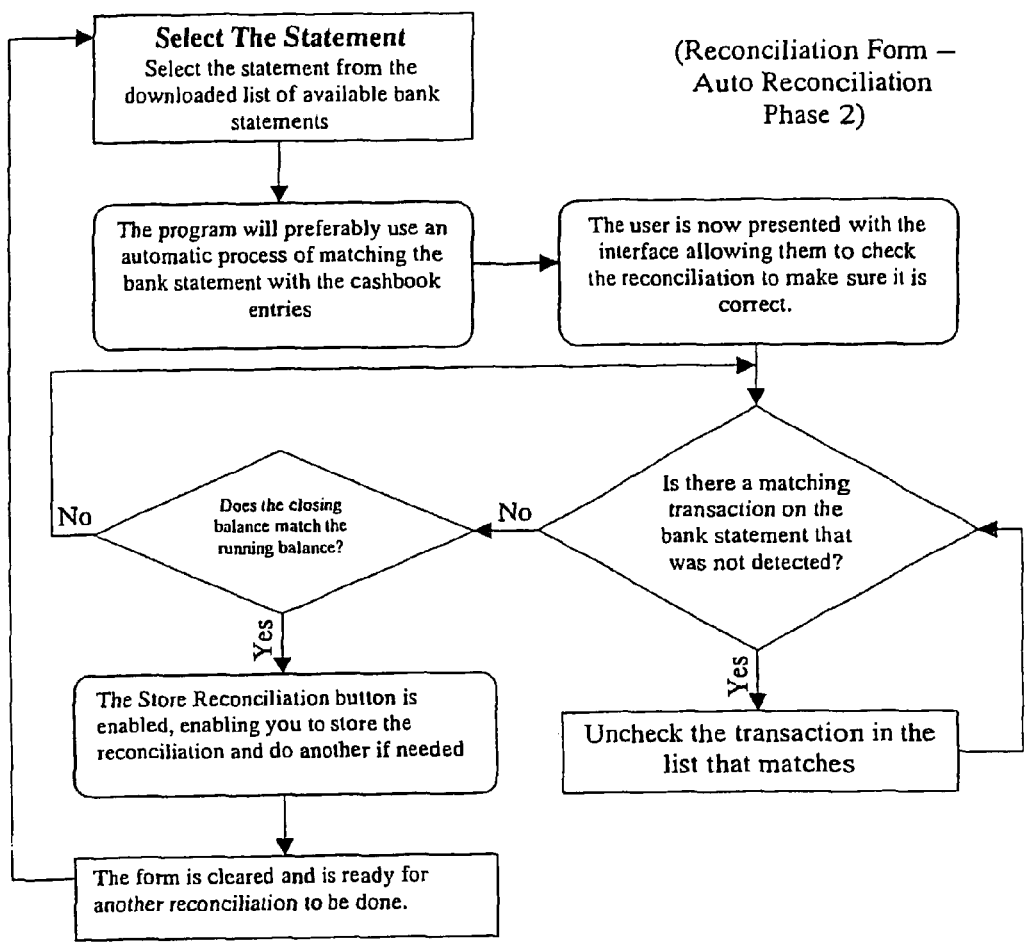

Referring now to FIG. 8R which shows an interface for the bank reconciliation operation. The steps for the reconciliation operation are shown in FIG. 7E and FIG. 7F.

Figures 8S, 8T:
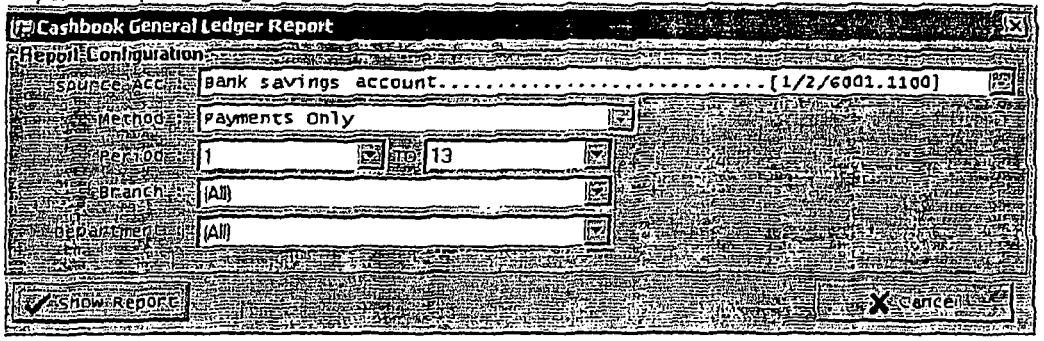

The client module 12 has a report operation wherein the client can select any of a number of reports to be displayed or printed. FIG. 8S shows an embodiment of an interface for configuring the module 12 to display a report for payments. As can be seen, the client can select a source account and nominates the period of weeks for the report. Where applicable, the report can be limited to payment transaction activities of a department or branch. FIG. 8T is an example showing parts of the payment report. Other examples are FIG. 8U for a Pay As You Go (PAYG) report, FIG. 8V for a Summary report, FIG. 8W for a GST audit report, FIG. 8X for a BAS statement report and FIG. 8Y for an accounts balance report.

Figures 9A, 9D:
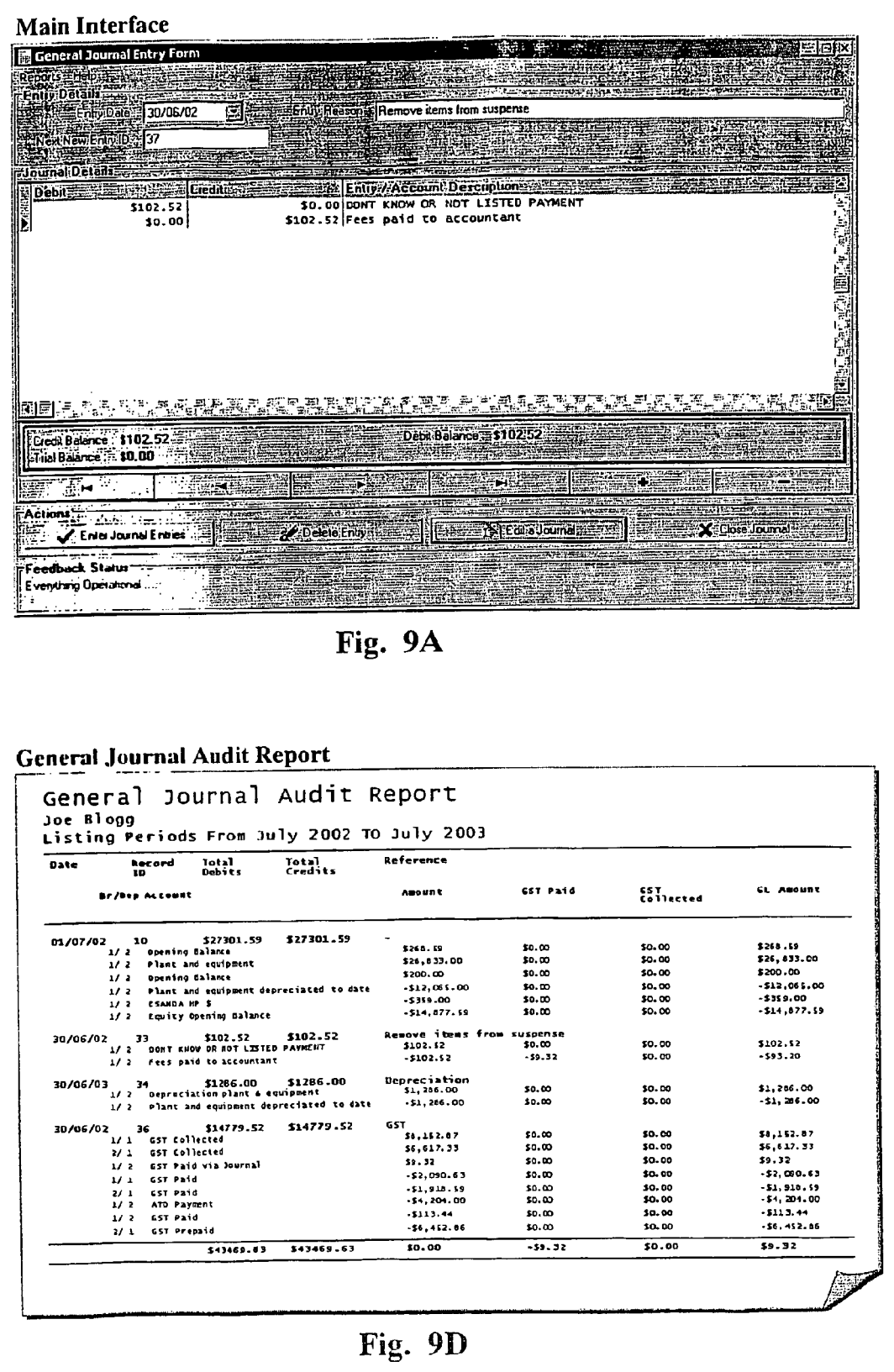
Figure 9B:
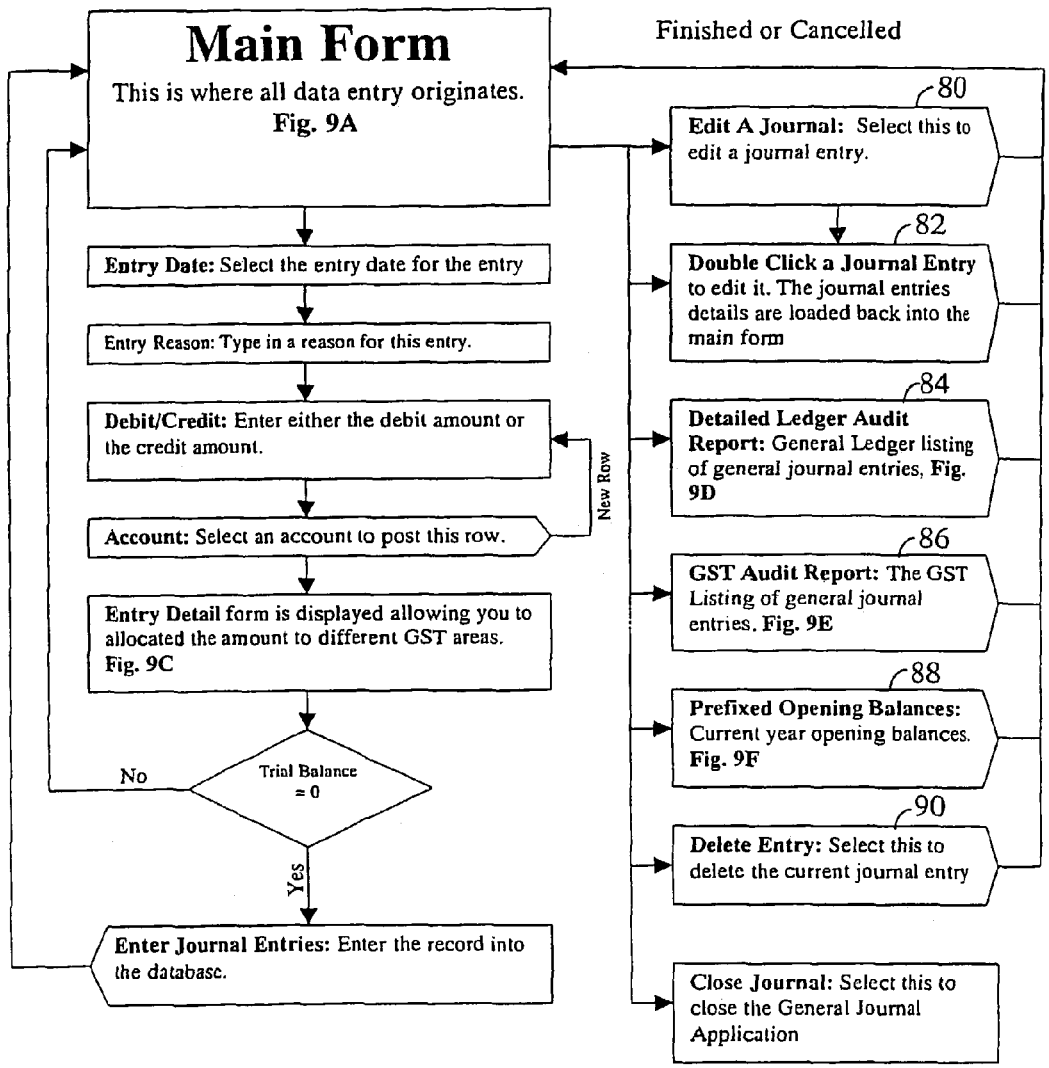
FIG. 9B is a flow diagram of options available in the general ledger.
Figure 9C:
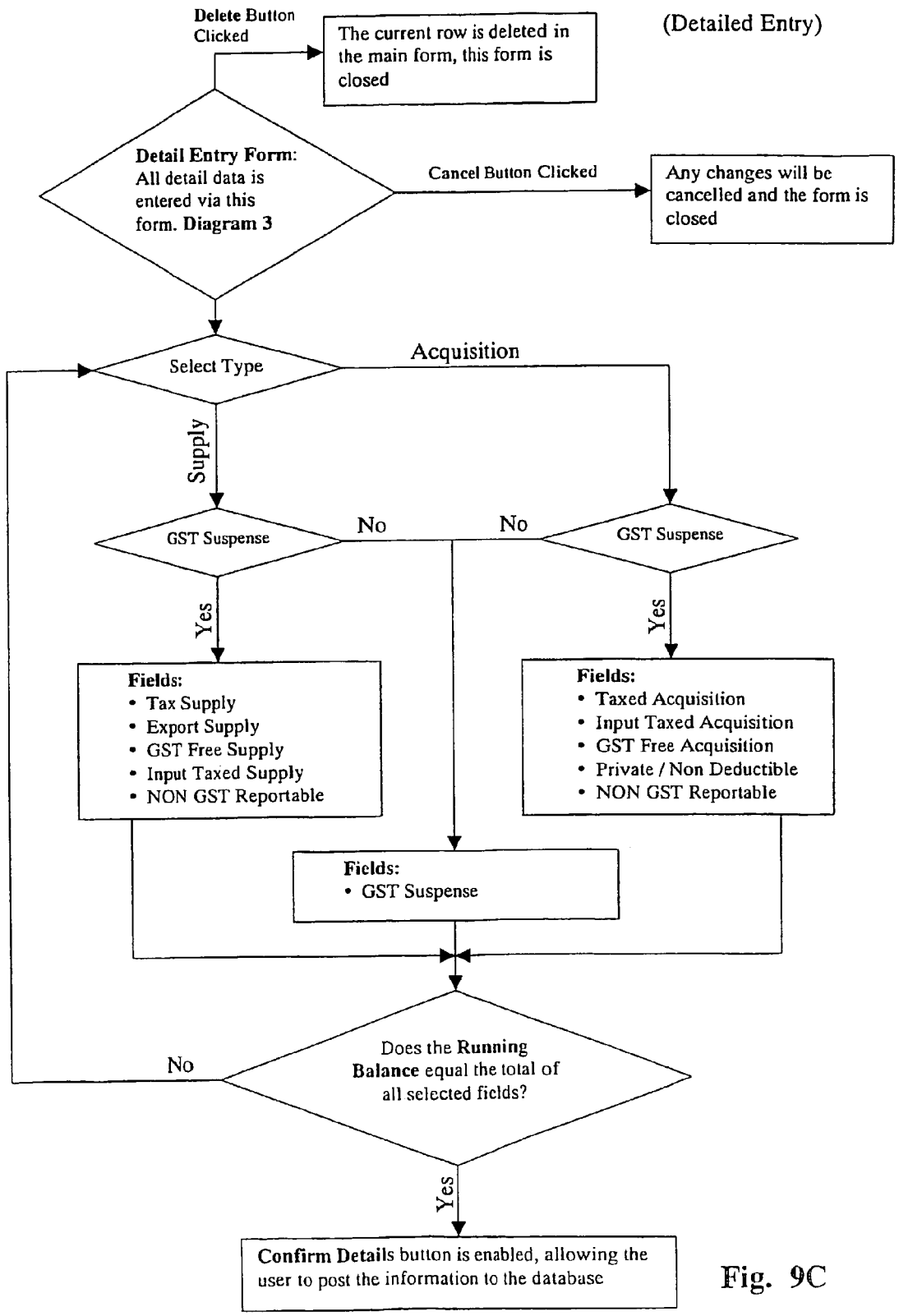
FIG. 9C shows the steps in processing GST components to the general ledger.

The system 10 has a general ledger unit 20 for each advisor accountant module 13. The ledger unit 20 has a main interface as shown in FIG. 9A. The operational steps of the ledger main interface are shown in FIG. 9B. The main interface has a journal edit option for the accountant to edit a selected journal entry as shown in steps 80 and 82. A journal report option in step 84 allows details of the journal entries to be reported as shown in FIG. 9D. FIG. 9E shows a GST audit report generated by selecting the step 86 option. Account opening balance reports as shown in FIG. 9E are produced through step 88. A delete function 90 is provided for deleting the current journal entry.

Figure 10:
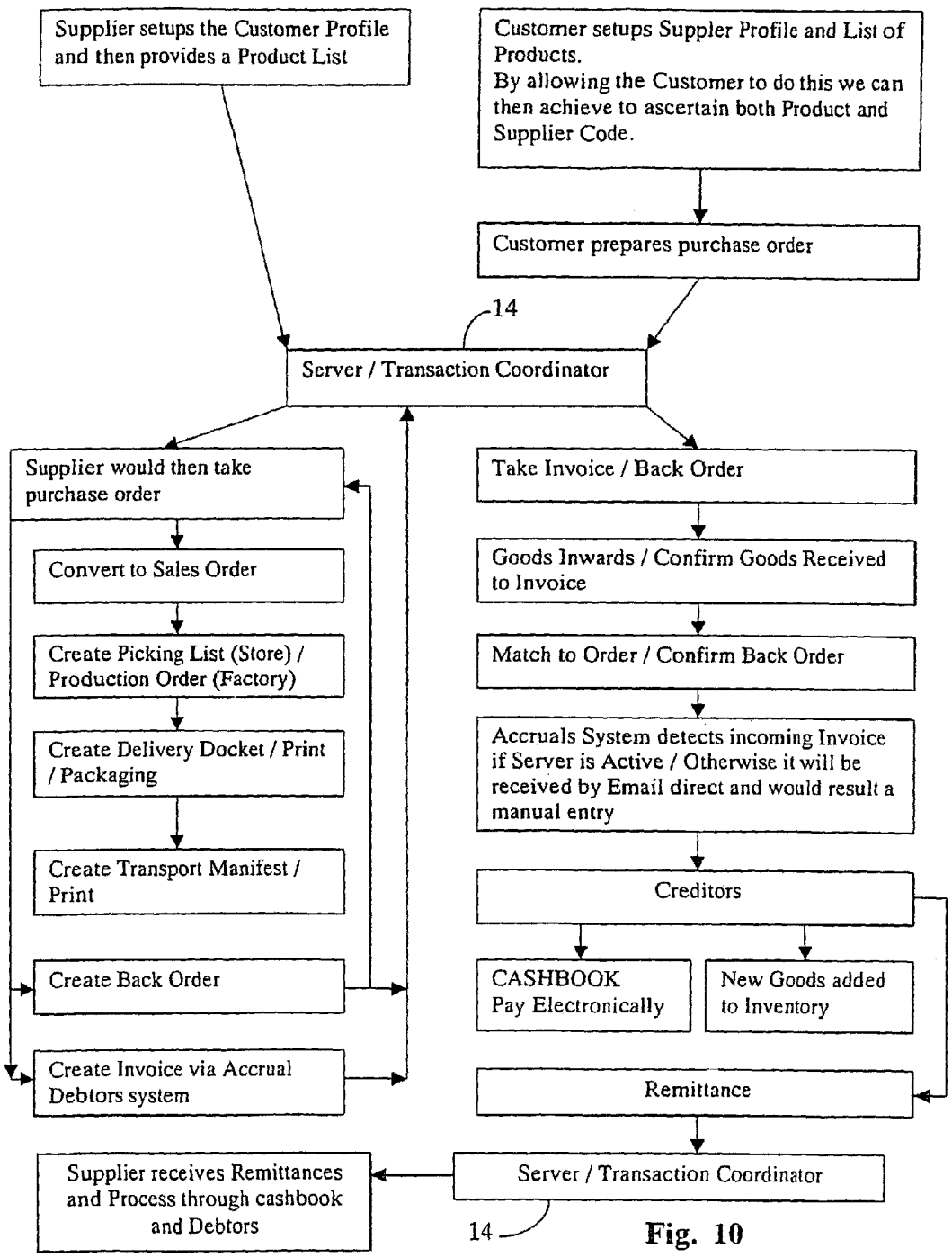
FIG. 10 is a flow diagram showing steps for online transfer of a purchaser order and a supplier invoice through the administration module.

FIG. 10 shows an embodiment of the system 10 where the administration module 14 is also a transaction coordinator, and is arranged to transfer purchase orders from client modules 12 of clients wishing to place orders for products to be supplied from known suppliers who are also using the client modules 12 for transactions. The suppliers on receiving the purchase orders convert them to sales orders and then take steps to obtained the ordered products from warehouses or to place production orders. Delivery and transportation are then arranged for delivery of the products. Invoices are also generated and transferred to the coordinator 14. When the clients ordering the products have finally received them, they will flag that to the coordinator 14 and to add the products to inventory. In time, remittances would be sent to the accrual coordinator 14 for making payments to the suppliers.

Figure 10A:
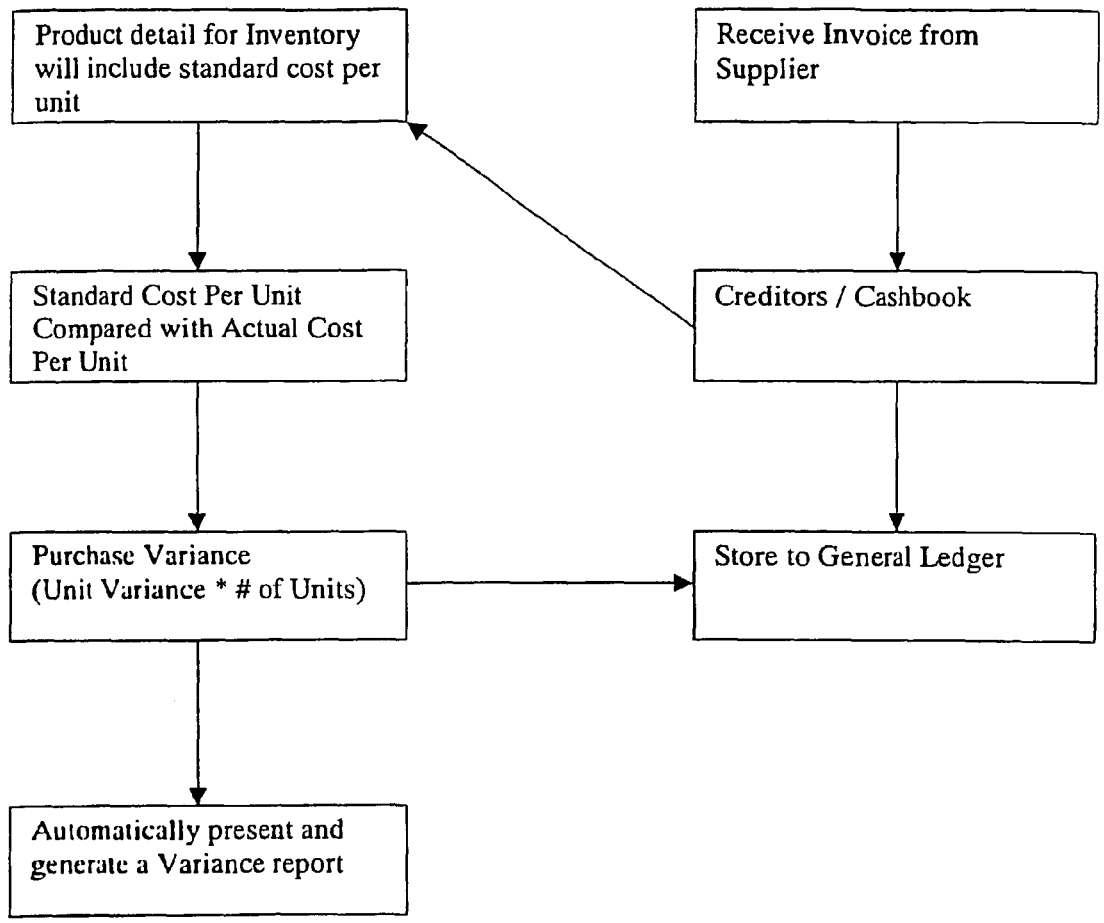
FIG. 10A shows steps in a standard cost process.

FIG. 10A shows a standard cost process which is used by the client (cashbook) modules 12 of the system 10 shown in FIG. 10 for checking variances between standard costs and actual costs of products.

Figure 10B:
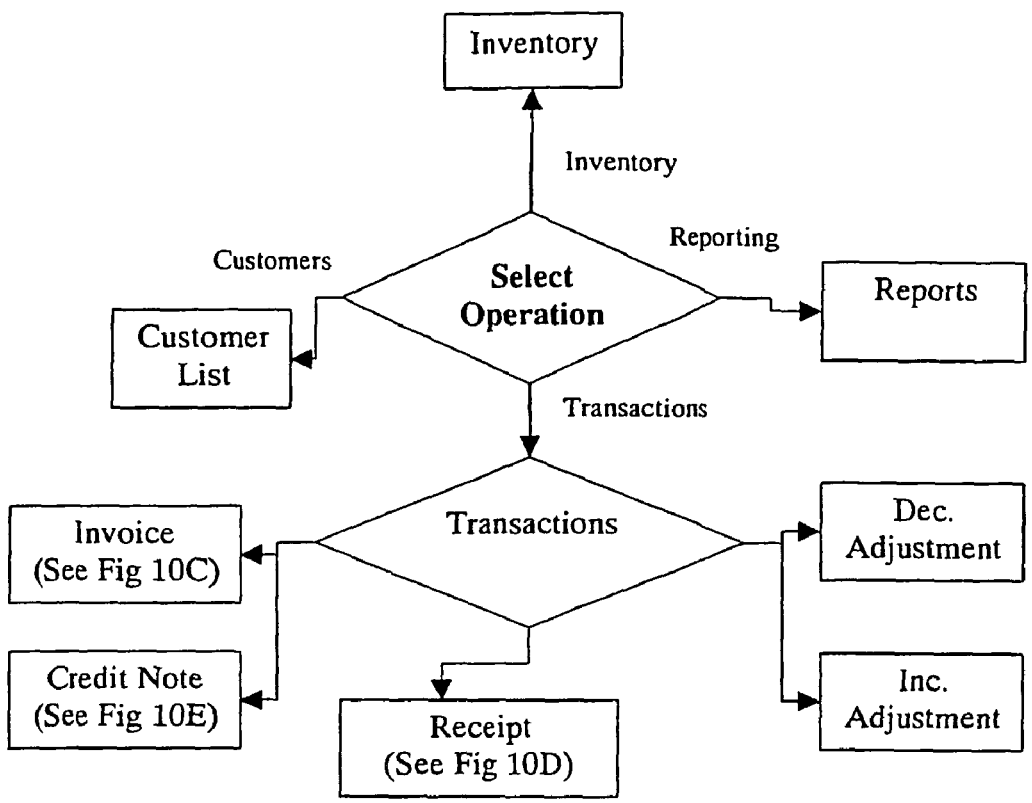
FIG. 10B is an overview of an embodiment of an accounts accrual system.

FIG. 10B is an overview flow diagram of an accrual arrangement of the system 10. As can be seen, a user can select any of the operations connected with a customer list, an inventory, reports and transactions. When the transactions operation is selected, the client mules 12 can perform operations relating to debtors invoice generating, credit note generating and payments. Transaction balance is also calculated by adjustments thereof.

Figure 10C:
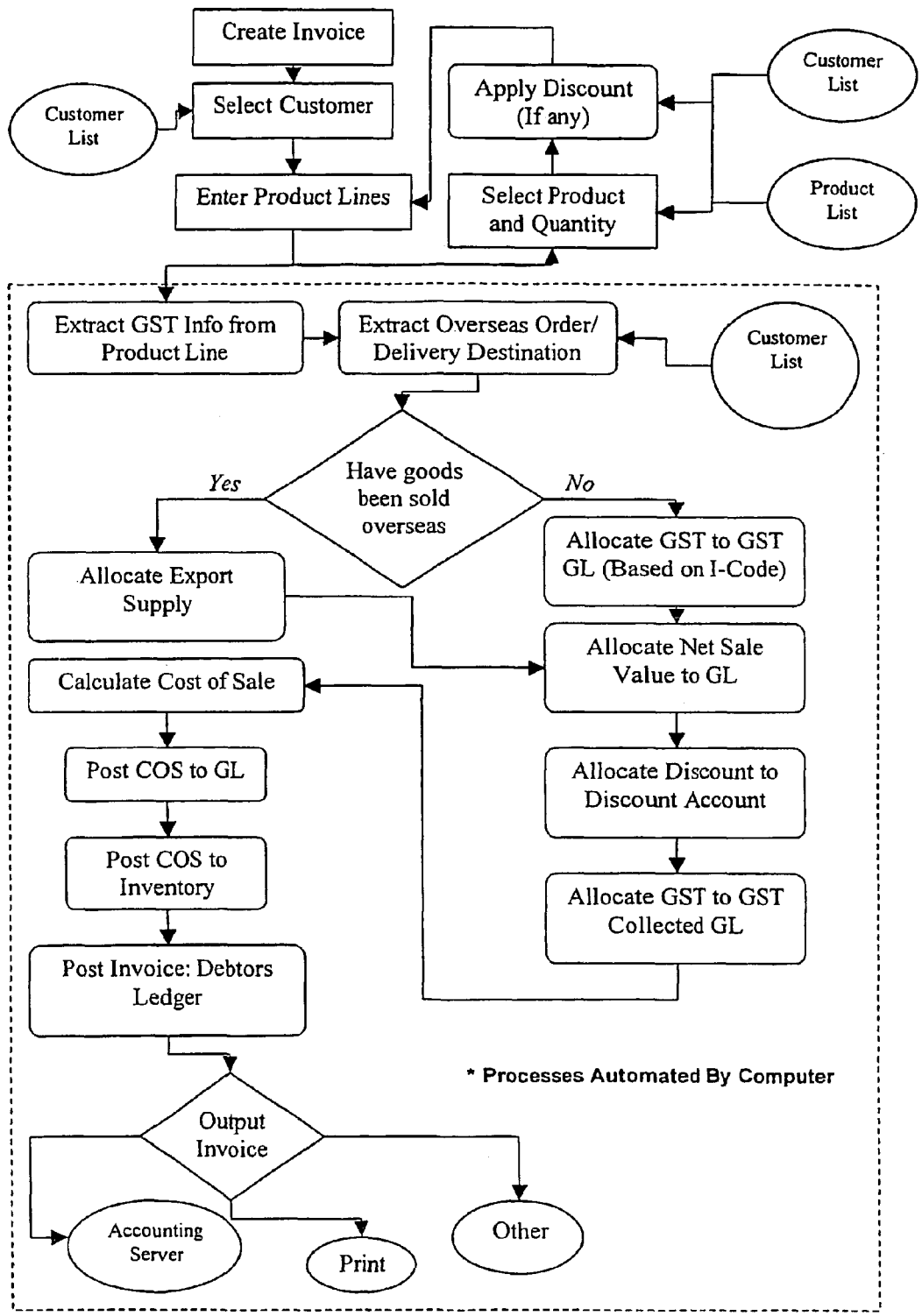
FIGS. 10C to 10F show procedures for the debtor related operations of the accrual system.

FIG. 10C shows the operational steps for the invoice generating operation for ordered products. The invoice generating operation on receiving a "create Invoice" selection displays an interface from which a customer for invoicing can be selected. The products ordered by this customer are then selected from a product list with their unit price. Any discount arrangement for this customer is also retrieved. The module 12 then extracts GST payable for the products and determines the delivery address from the customer list. If the ordered products are for an overseas destination, GST is not applied. The general ledger is then updated with the net sale value and where applicable allocated with the discount and the GST.

Costs of sale are then posted to the general ledger and the inventory before saving the invoiced values to the module 12.

Figure 10D:
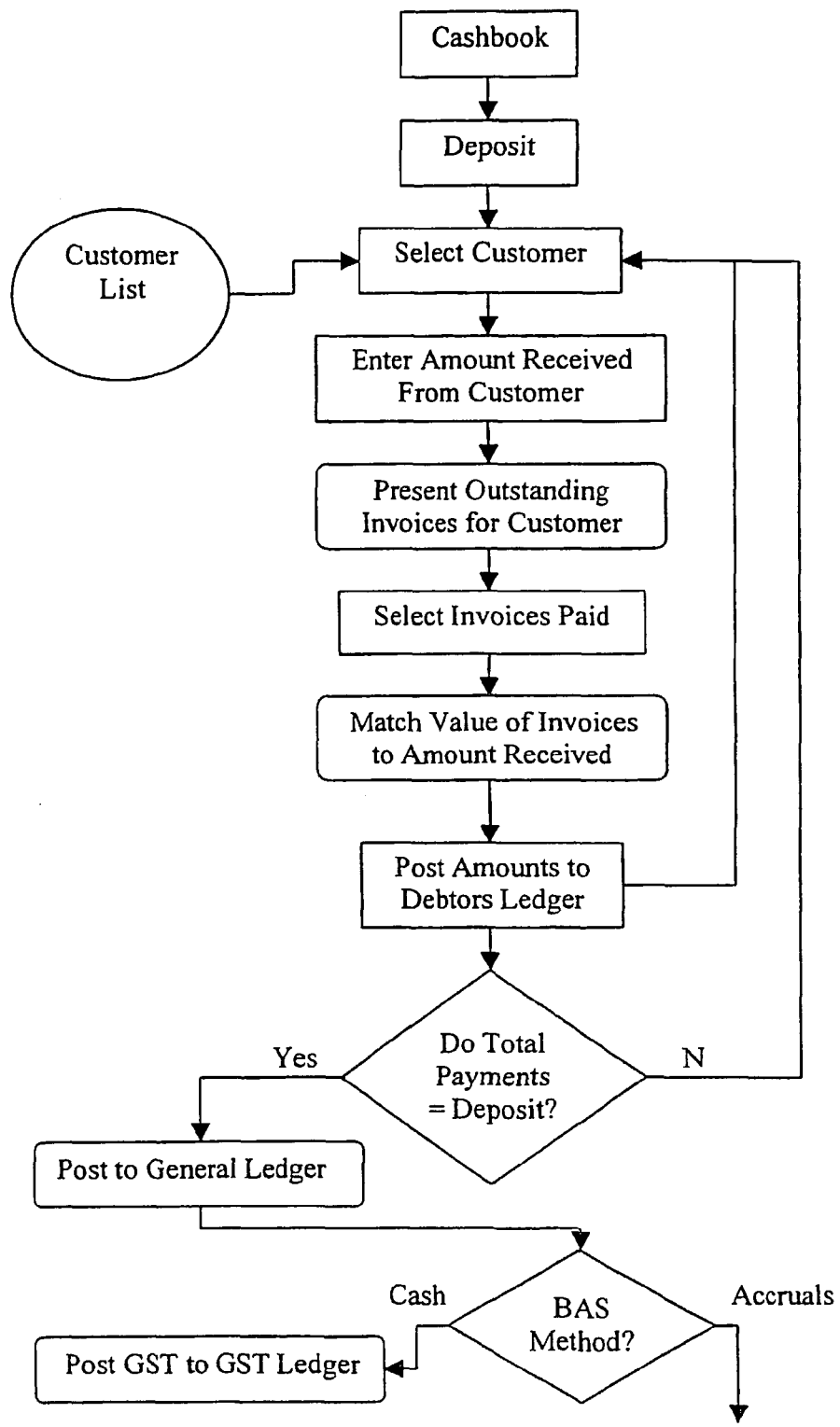

FIG. 10D shows the steps of an debtor payment operation.

Figure 10E:
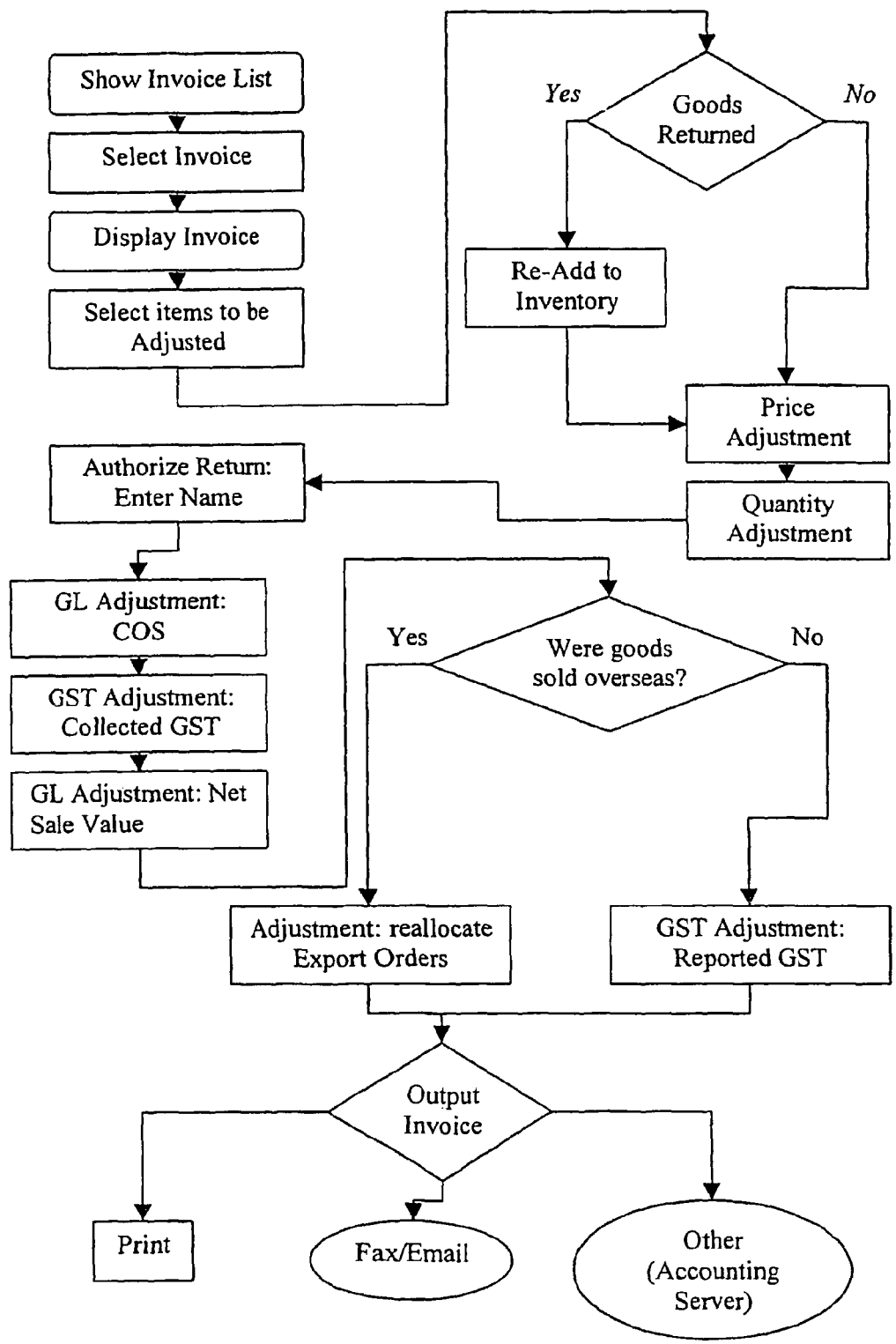

FIG. 10E shows the steps of a debtor credit note operation. The steps include selecting and displaying the invoice for making adjustment, updating the inventory if the product is returned, and adjusting prices and quantity. The general ledger is also adjusted in respect of costs of sale, GST and net sale value. For overseas destinations, the export orders are reallocated. If the goods are for local delivery then the GST is readjusted before ouputting a debit note.

Figure 10F:
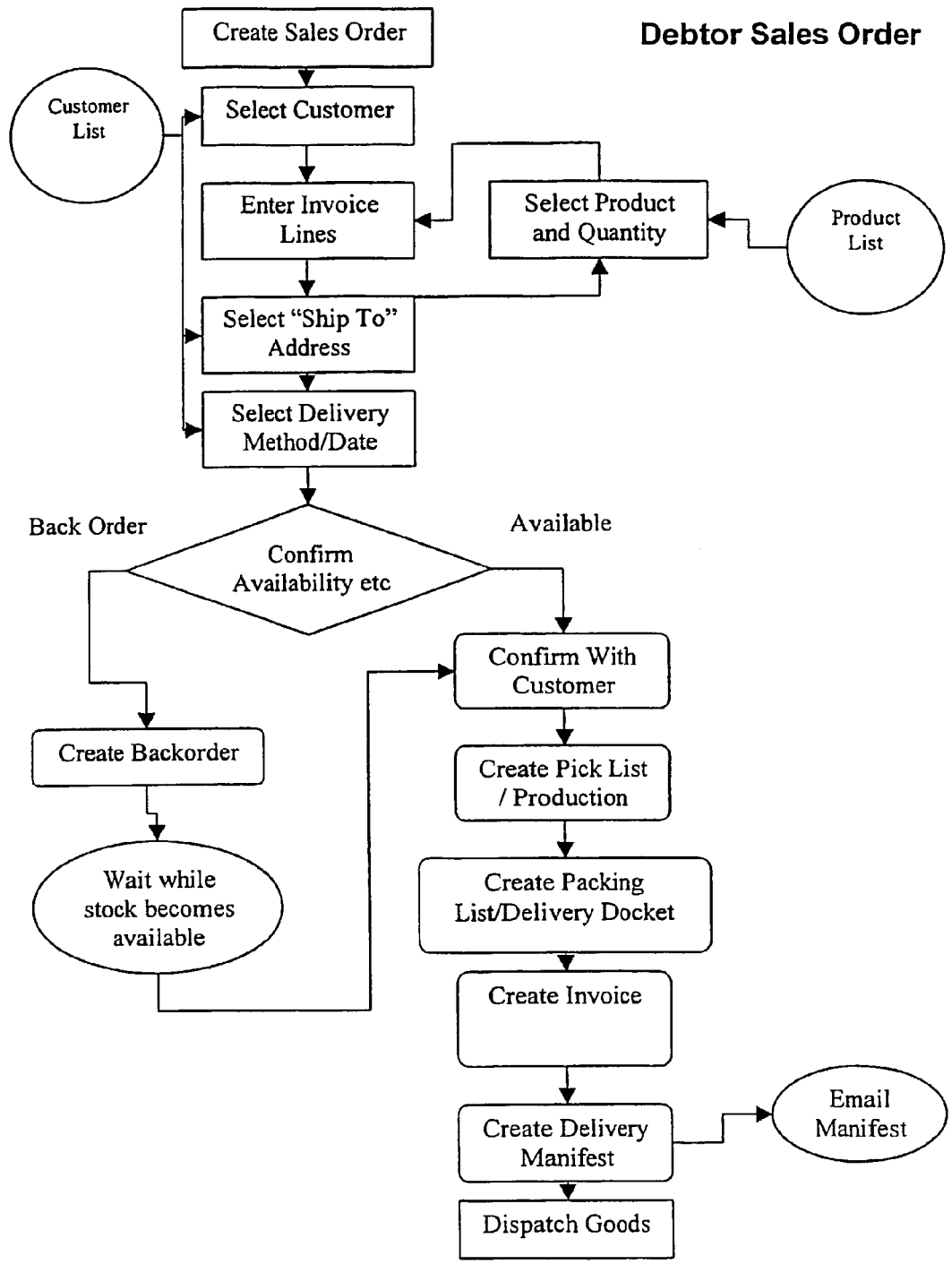

FIG. 10F shows the steps in a debtor sales order operation. This operation allows an operator to select a customer making the order and to select the products and quantity thereof for delivery by a specified method and date. The system checks for availability of the ordered products. If available, a products pick list is created followed by a delivery docket for dispatch. If the ordered products are not available then a back order is created.

Figure 10G:
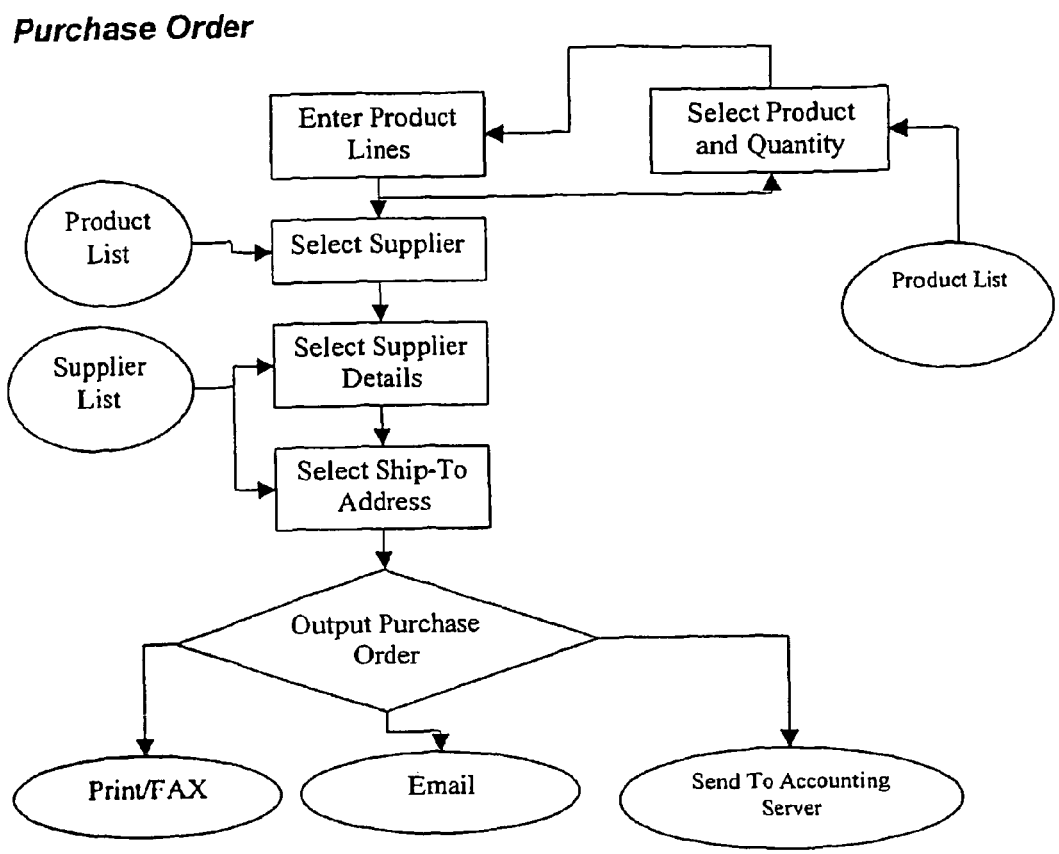
FIG. 10G shows the procedure for a purchase order.

FIG. 10G shows the steps of a purchase order operation.

Figure 10H:
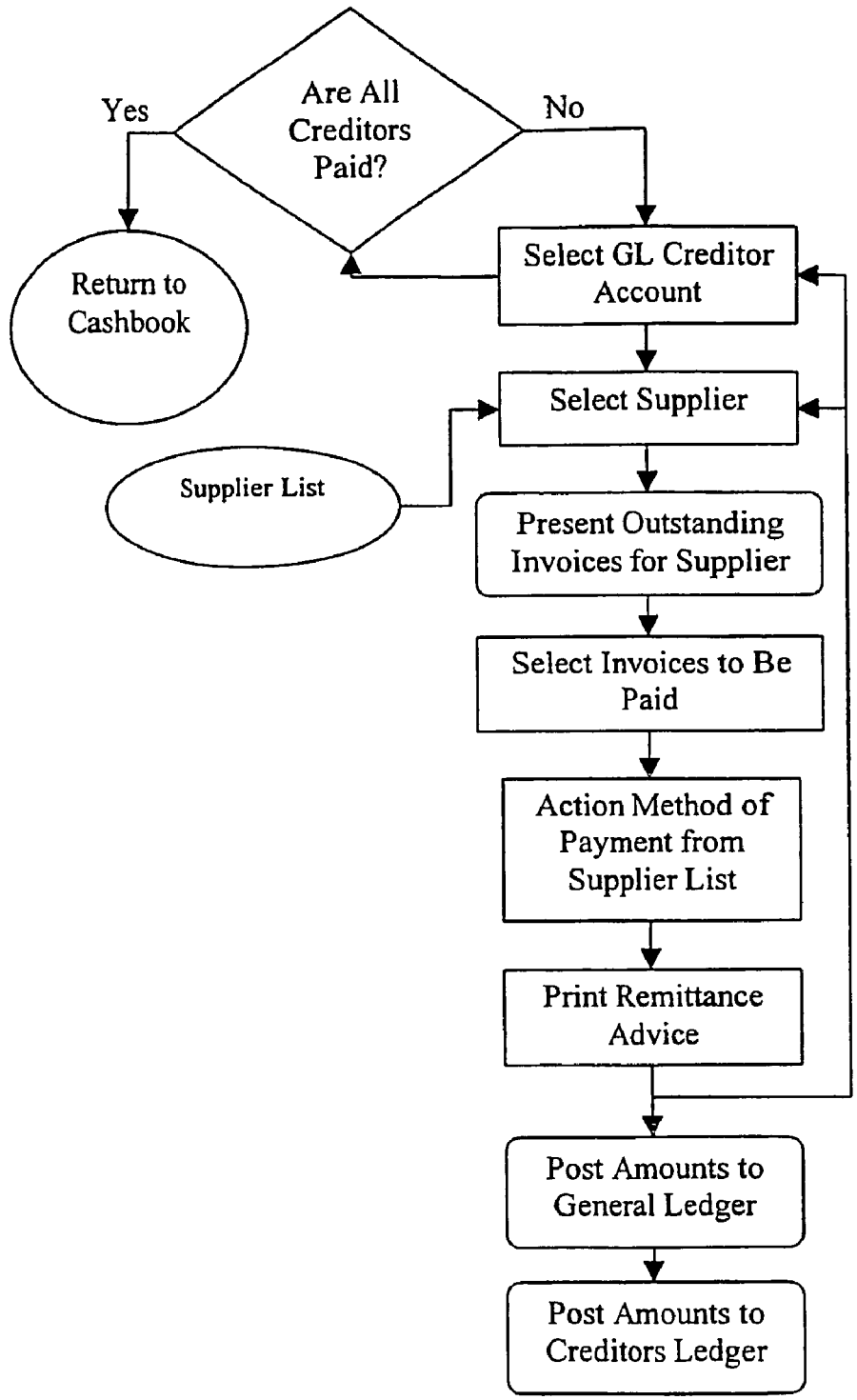
FIG. 10H shows a procedure for credit payment.

FIG. 10H shows the steps of a creditor payment operation.

Figure 10I:
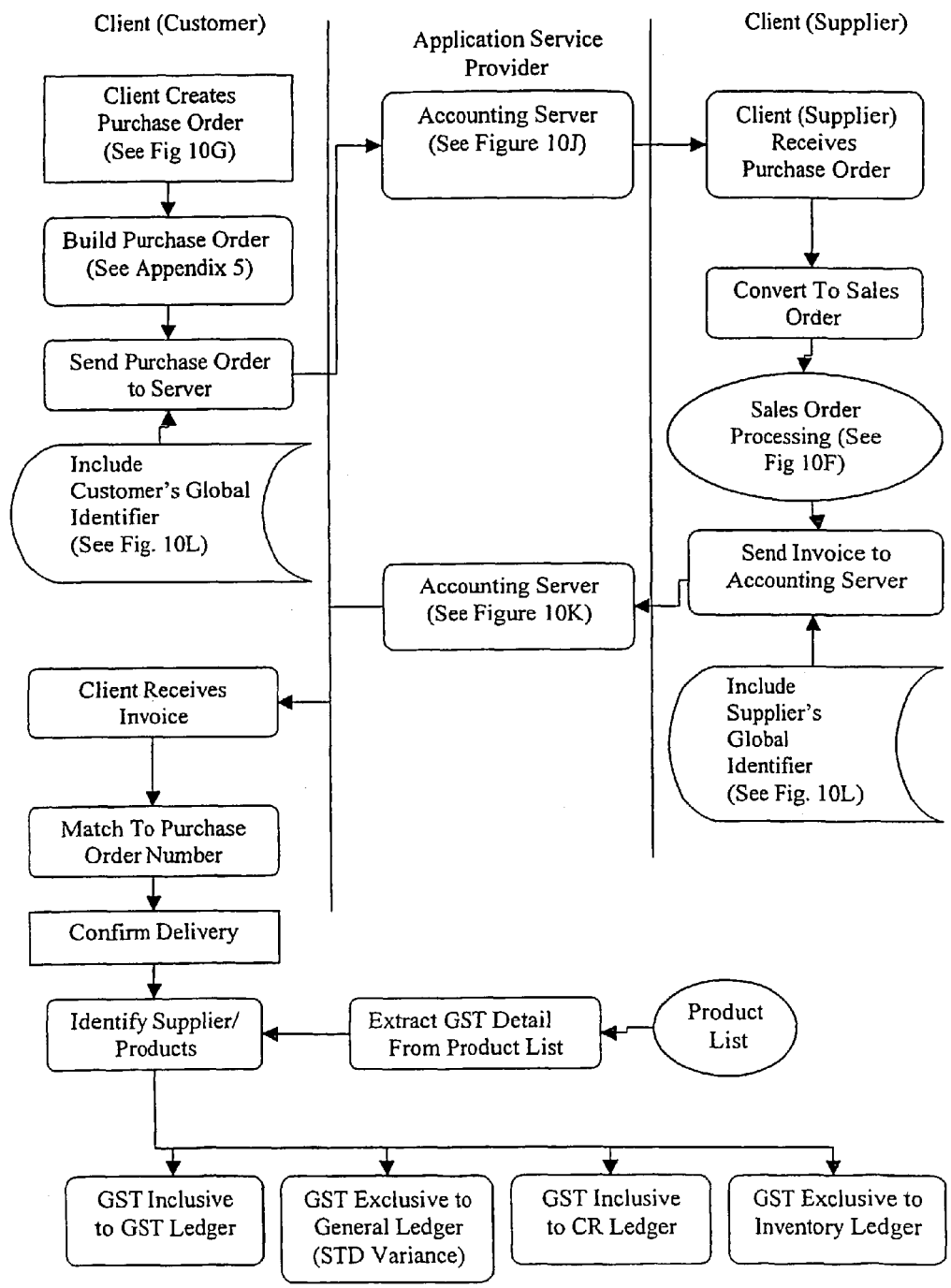
FIGS. 10I to 10N show the procedures for an extended point of sale system.
Figure 10J:
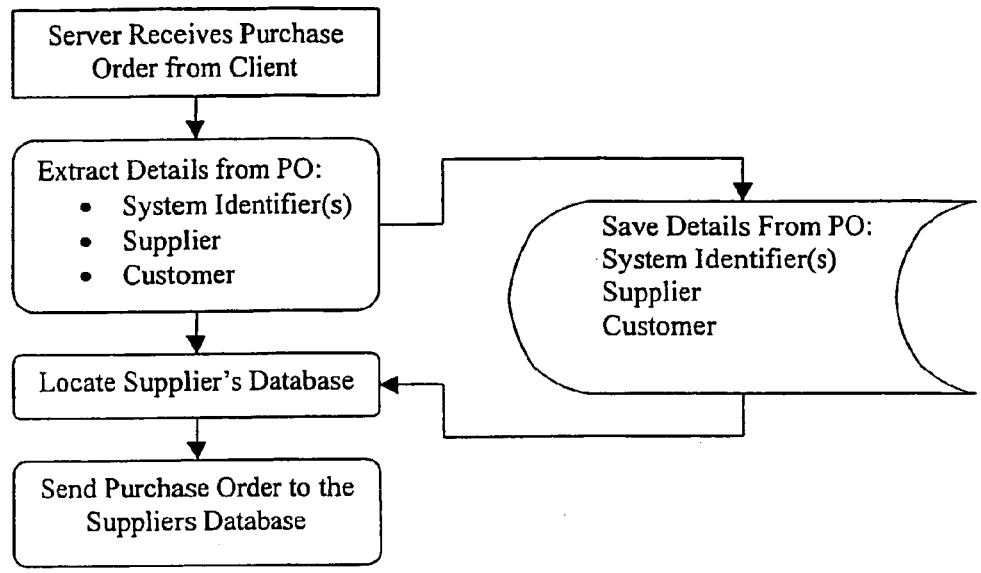
Figure 10K:
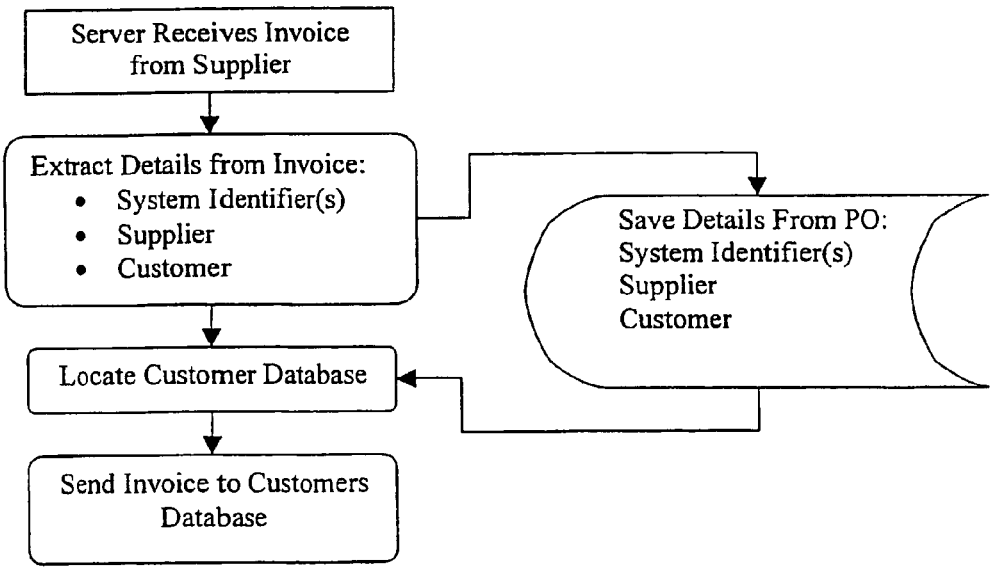
Figure 10L:
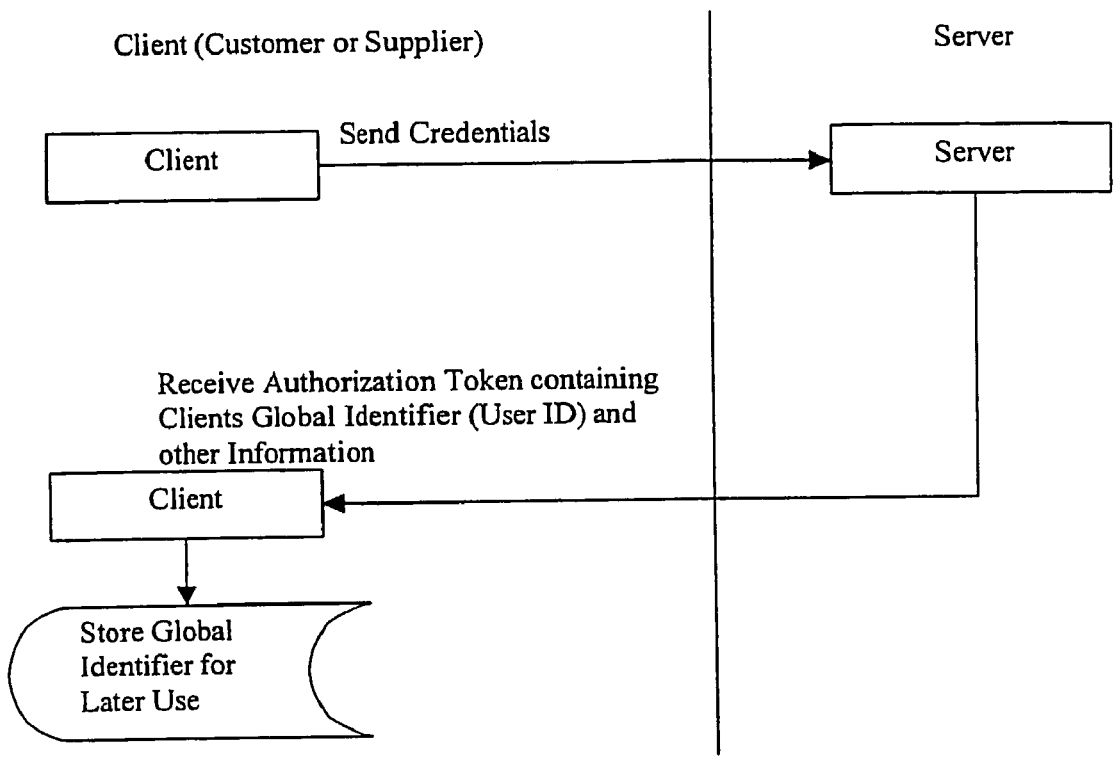

FIG. 10I shows an embodiment of the system 10 arranged for use as an extended point of sale. As can be seen the system 10 has some client module 12 functioning as customers and some functioning as suppliers. When a customer module 12 is used to make a purchase, the client selects products for the order as shown in FIG. 10G. The customer module processes the selected products to build a purchase order with the customer's global identifier created as shown by the steps in FIG. 10L. The purchase order is sent to the administration module 14 for processing as shown in FIG. 10J. The module 14 extracts relevant information from the purchase order and forwards the order to the supplier module 12 identified in the order. The supplier module 12 on receiving the order coverts it into a sales order and processes it as shown in FIG. 10F. A tax invoice is then raised and sent to the administration module 14. The invoice includes the supplier's global identity.

The administration module 14 extracts relevant details from the invoice and locate the customer module 12 for sending it to the customer. See FIG. 10K.

When the customer module 12 receives the invoice, it performs a checking step for a match with the purchase order. GST details of the purchased products are extracted from a product list for updating the general ledger.

Figure 10M:
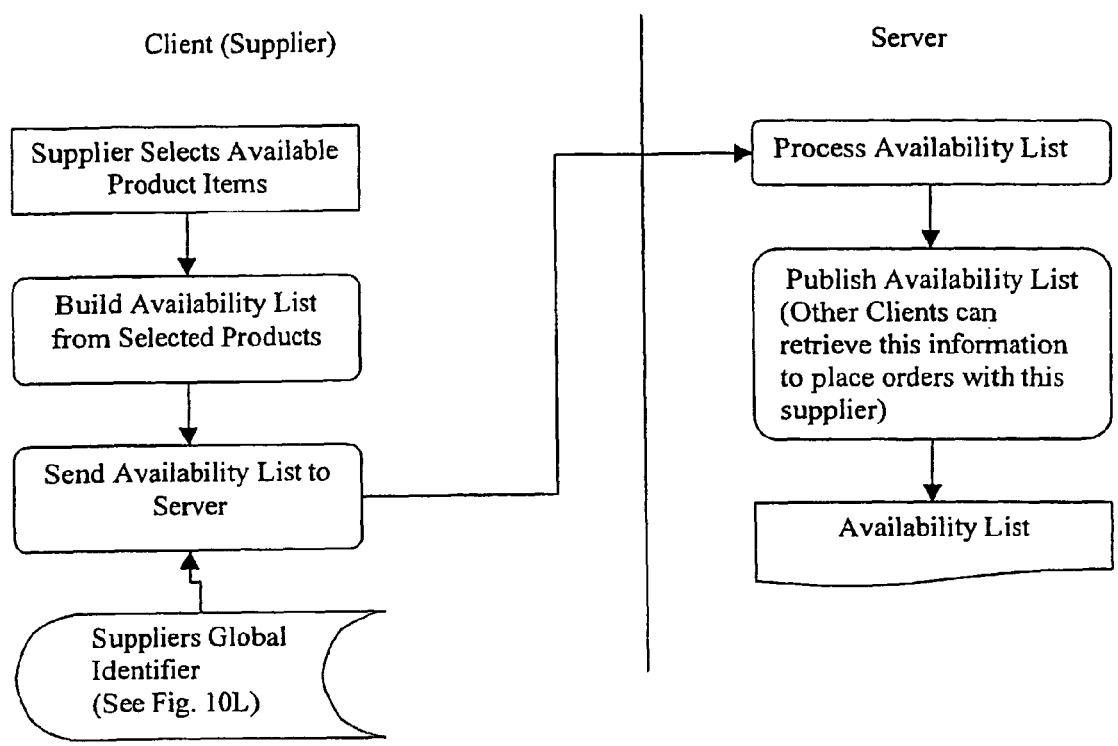
Figure 10N:
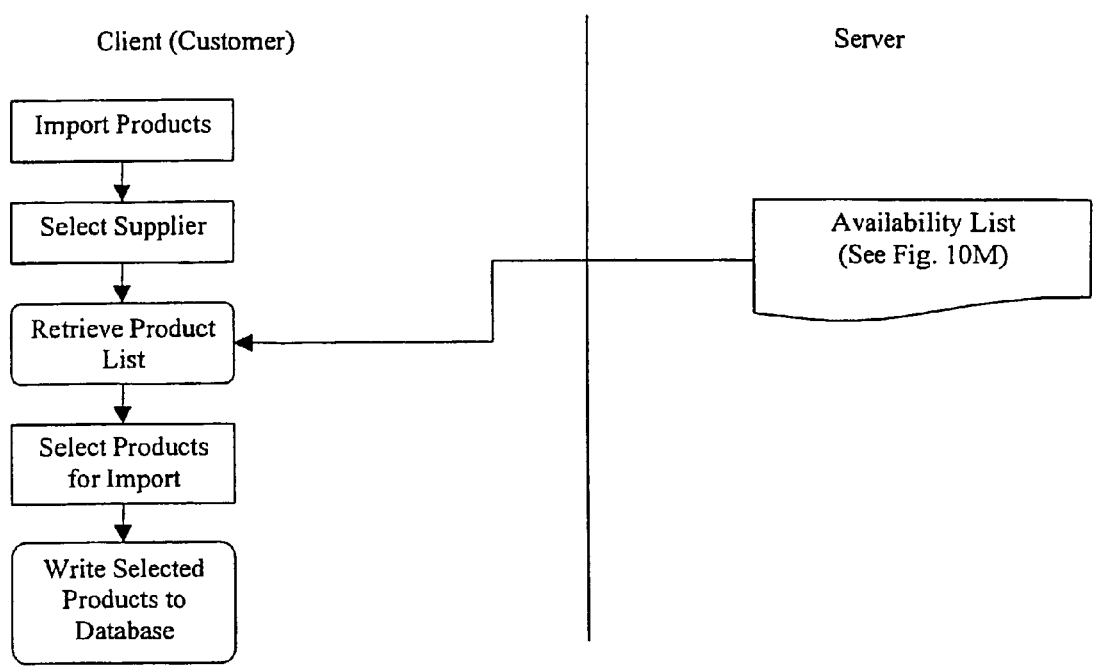

As shown in FIG. 10M, any of the supplier modules 12 can build a product availability list and send it to the administration module 14 for processing it in a manner for access by the customer modules 12 as shown in FIG. 10N.

Whilst the above has been given by way of illustrative example of the present invention many variations and modifications thereto will be apparent to those skilled in the art without departing from the broad ambit and scope of the invention as herein set forth in the following claims.

The invention claimed is:

1. An accounting system, comprising:
a plurality of client modules;
an administration module for administering said plurality of client modules; and
at least one adviser module associated with at least one of said plurality of client modules,
the administration module being adapted for installation on an administration computer server and each client module being configured by the administration module to operate according to configuration information and generated for installation on a client computer unit(s) remote from the administrator computer server,
the administration module, the plurality of client modules and the at least one adviser module being arranged for communication over a communications network,
the administration module having
i) requesting means arranged to receive from at least one of the at least one adviser module and a user, accounts configuration information for configuring a requested client module and, where nominated, to associate an adviser module with the requested client module,
ii) scripting means arranged for the user and adviser module to script and edit an account description for association with a nominated account and a description for association with an accounts item within said nominated account,
iii) information obtaining means arranged to present on the requesting adviser module and a requesting client computer unit prompt messages relevant to an entity type category and a business type category nominated by at least one of the requesting adviser module and the user and to extract information provided to the prompt messages for inclusion into the configuration information,
iv) a master chart of accounts from which client accounts with matching entity type category and business type category contained in the configuration information are extracted, and
v) accounts generating means for generating the requested client module configured with at least one client chart of accounts in accordance with the extracted accounts;
each one of the plurality of client modules having transaction entry means for entering transaction records, pre-assigned transaction category codes being stored on a storage medium, means for selecting a pre-assigned category code to associate with a transaction record to be entered through the transaction entry means, and at least one client chart of accounts for selection of an account to which the transaction record is to be associated,
the accounts being predetermined by the information provided to the prompt messages in consideration of at least one of tax liability options for transactions and in accordance with accounts of the entity type category and the business type category prenominated in the configuration information,
each of said accounts including a pre-allocated unique account identification and an account description which is prescribed by at least one of the adviser module, the user, and generally adopted by traders with matching entity type category and business type category, and each of said category codes being pre-specified in the configuration information as one of a taxed and non-taxed category, and as one of an expenditure and income transaction type,
the administration module having a suppliers database containing client modules nominated as suppliers of certain product types and arranged for any client module to access the suppliers database for selecting a supplier of a product type and being arranged to present, upon selection of a supplier client module, a list of products of the selected supplier client module, and a coordination unit arranged for coordinating transaction activities between a purchasing client module and a supplier client module,
each client module being allocated with a unique client reference and each product of a supplier client module having a product reference associated with the client reference of the supplier client module, and each client module being adapted to access the suppliers database at the administration module and select at least one product of a selected supplier client module and to transfer a purchase order for the selected product(s) through the coordination unit to the selected supplier client module, the purchase order including the client reference of the purchasing client module, the client reference of the supplier client module and the product reference(s) of the selected product(s), the supplier client module being adapted to extract the client and product references in the purchase order for incorporation into a sales order.

2. The system according to claim 1, wherein said business type category including trading activities involving the provision of goods and services relating to any class of business.

3. The system according to claim 1, wherein each client module having means for obtaining information relevant to tax liabilities of the transaction records, said information obtaining means having at least one prompt associated with each of a plurality transaction category codes that have tax liabilities, and being arranged to present the associated at least one prompt for entering information relevant to tax liabilities when one of said category code is nominated for a transaction to be entered, and to extract the entered information for allocating tax liabilities of the transaction.

4. The system according to claim 3, wherein said at least one prompt is in the form of at least one leading question for prompting the client to enter said relevant tax liability information in a designated location(s), and the client module being arranged to extract the entered information at said designated location(s) and apply a tax liability determination procedure which is specific for extracted information from said designated location(s).

5. The system according to claim 1, wherein the client module having report generating means arranged to access the entered transaction records for generating accounting reports.

6. The system according to claim 5, wherein the report generating means including a report selection arrangement for selecting any one of a number of accounting reports for generation.

7. The system according to claim 5, wherein at least one of said taxed category codes is pre-allocated to taxation segments for a taxation report, being one of the accounting reports.

8. The system according to claim 7, wherein said taxation report is a Business Activity Statement (BAS) that complies with the Goods and Services Tax (GST).

9. The system according to claim 1, wherein where a taxed category code having a variable taxation allocation is entered, a window with appropriate prompts for specifying amounts to be allocated is presented for entering the amounts.

10. The system according to claim 9, wherein the category code is associated with a wage account in said client chart of accounts.

11. The system according to claim 1, further having storage means for storing the transaction records and is arranged for accessing bank statement records over the communications network.

12. The system according to claim 11, wherein the client module having reconciliation means for reconciling said stored transaction records with the bank statement records.

13. The system according to claim 1, wherein said at least one adviser module having report generating means being arranged to access transaction records transferred from an associated client module for generating accounting reports and management reports.

14. The system according to claim 13, wherein the report generating means including a report selection arrangement for selecting any one of a number of accounting and management reports for generation.

15. The system according to claim 1, wherein the client chart of accounts is locked so that the account identifications and the account descriptions therein cannot be altered by the user.

16. The system according to claim 1, wherein the administration module having a transaction code generating means for generating the transaction codes as specified by the adviser.

17. The system according to claim 1, wherein the coordination unit is arranged to use the client references to transfer a subsequently received invoice for the sales order from the supplier client module to the purchasing client module.

18. The system according to claim 17, wherein record of payment of the invoice is transfer through the administration module so that the coordination unit communicates to the supplier client module a record that the invoice has been settled.

19. The system according to claim 18, wherein storage means being arranged to store transaction information between suppliers and purchasers, and the coordination unit being arranged to automate purchase orders when stocks for transactions are below predetermined levels.

20. The system according to claim 1, wherein each said plurality of client modules is associated with said at least one adviser module so that the transaction records stored in the client module of the associated client(s) can be accessed remotely.

21. The system according to claim 1, wherein the client module is one of a cash book module, an accrual module, a combined cash book and accrual module, a payroll module, a point of sale module, and any combination of two or more of said modules.

* * * * *